(12) United States Patent
Kondo et al.

(10) Patent No.: US 7,881,539 B2
(45) Date of Patent: Feb. 1, 2011

(54) IMAGE PROCESSING APPARATUS AND METHOD, PROGRAM RECORDING MEDIUM, AND PROGRAM

(75) Inventors: Tetsujiro Kondo, Tokyo (JP); Masashi Uchida, Tokyo (JP); Yasuhiko Suga, Kanagawa (JP); Kenichiro Hosokawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 915 days.

(21) Appl. No.: 11/686,017

(22) Filed: Mar. 14, 2007

(65) Prior Publication Data

US 2008/0013835 A1   Jan. 17, 2008

(30) Foreign Application Priority Data

Mar. 16, 2006   (JP)   ............................. 2006-073557

(51) Int. Cl.
*G06K 9/48* (2006.01)
(52) U.S. Cl. ..................................................... 382/199
(58) Field of Classification Search ........................ None
See application file for complete search history.

(56) References Cited

FOREIGN PATENT DOCUMENTS

JP        9-167240       6/1997

*Primary Examiner*—Vikkram Bali
*Assistant Examiner*—Elisa M Rice
(74) *Attorney, Agent, or Firm*—Oblon, Spivak, McClelland, Maier & Neustadt, L.L.P.

(57) ABSTRACT

An image processing apparatus includes the following elements. A broad-range feature extraction unit extracts broad-range features from pixels located in a predetermined area in relation to a subject pixel of a first image. A broad-range degree-of-artificiality calculator calculates, in a multidimensional space represented by the broad-range features, the broad-range degree of artificiality from the positional relationship of the broad-range features to a statistical distribution range of an artificial image of the first image. A narrow-range feature extraction unit extracts narrow-range features from pixels located in the predetermined area in relation to the subject pixel of the first image. A narrow-range degree-of-artificiality calculator calculates, in a multidimensional space represented by the narrow-range features, the narrow-range degree of artificiality from the positional relationship of the narrow-range features to a statistical distribution range of the artificial image. A degree-of-artificiality calculator calculates the degree of artificiality of the subject pixel.

26 Claims, 52 Drawing Sheets

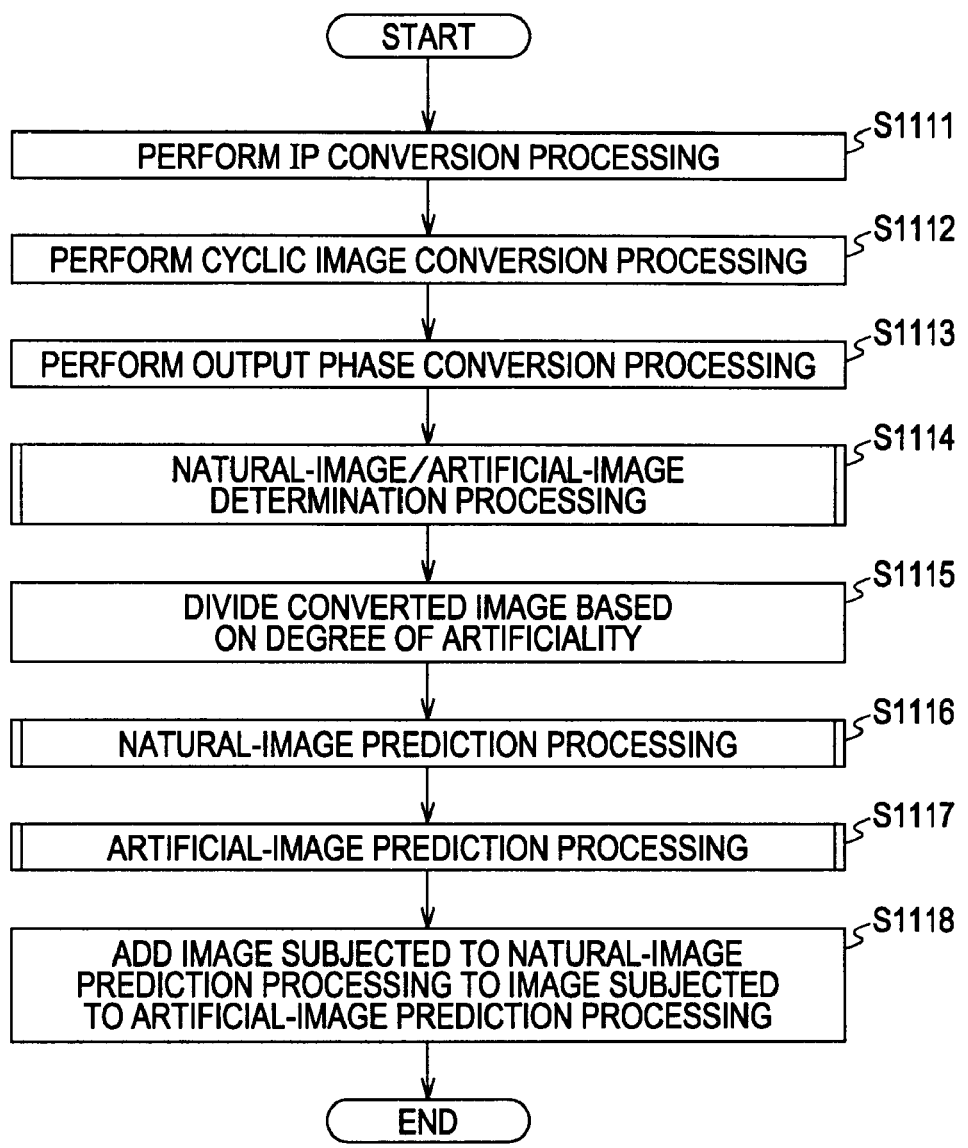

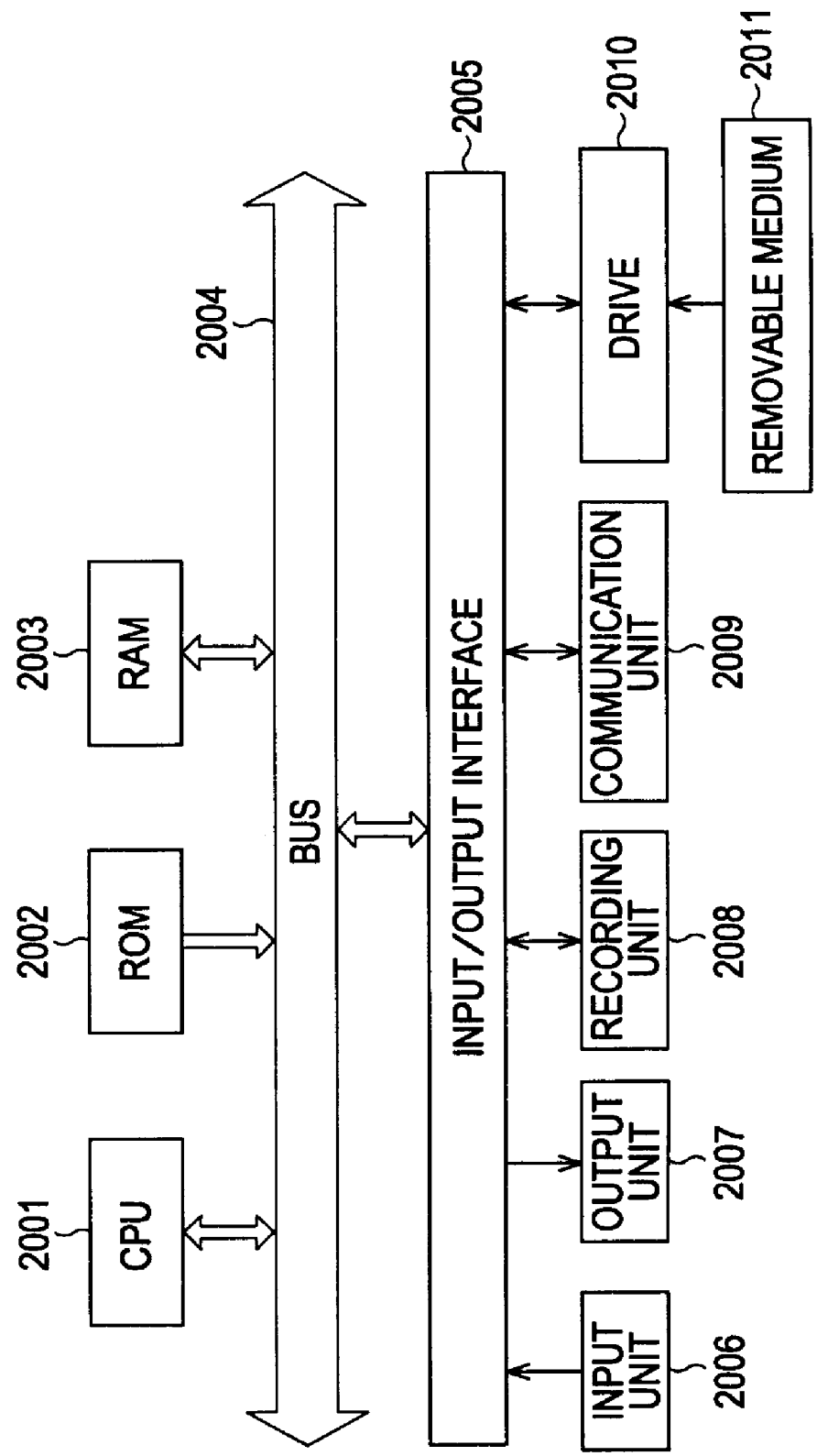

IMAGE PROCESSING APPARATUS AND METHOD, PROGRAM RECORDING MEDIUM, AND PROGRAM

CROSS REFERENCES TO RELATED APPLICATIONS

The present invention contains subject matter related to Japanese Patent Application JP 2006-073557 filed in the Japanese Patent Office on Mar. 16, 2006, the entire contents of which are incorporated herein by reference.

BACKGROUND OF THE INVENTION

1. Field of the Invention

The present invention generally relates to image processing apparatuses and methods, program recording media, and programs. More particularly, the invention relates to an image processing apparatus and method, a program recording medium, and a program that allow the quality of an image to be accurately enhanced by distinguishing artificial image components and natural image components included in an image from each other and by performing optimal processing on each of the artificial image components and natural image components.

2. Description of the Related Art

The assignee of this application previously proposed classification adaptation processing in, for example, Japanese Unexamined Patent Application Publication No. 9-167240. In the classification adaptation processing, from an input first image, a second image is determined. More specifically, according to the pixel values of a plurality of pixels in a predetermined area of the input first image, subject pixels of the second image are allocated into classes, and then, a linear expression of prediction coefficients which have been determined for the individual classes by learning processing, and the pixel values of the plurality of pixels in the predetermined area of the input first image are calculated, so that the second image can be determined from the input first image.

For example, if the first image is an image containing noise and the second image is an image with suppressed noise, the classification adaptation processing serves as noise suppression processing. If the first image is a standard definition (SD) image and the second image is a high definition (HD) image with a level of resolution higher than that of the SD image, the classification adaptation processing serves as resolution conversion processing for converting a low-resolution image into a high-resolution image.

In known learning processing, to enable prediction of general moving pictures typified by broadcasting moving pictures, instead of artificial images, which are discussed in detail below, natural images obtained by directly imaging subjects in nature are used as supervisor images and learner images. Accordingly, if the first image is a natural image, the second image, which is a high-definition, fine image, can be predicted by performing classification adaptation processing using prediction coefficients obtained by learning processing.

SUMMARY OF THE INVENTION

Normally, the first image is formed of a mixture of an area of artificial image components and an area of natural image components. Accordingly, it is possible to predict the second image, which is a high-definition, fine image, by performing classification adaptation processing on the area of the natural image components by using prediction coefficients determined by the above-described learning processing.

If, however, classification adaptation processing is performed on the area of the artificial image components, such as text or simple graphics, of the first image, by using the prediction coefficients determined by the learning processing using natural images, the fineness of edged portions is excessively enhanced, and flat noise is disadvantageously recognized as a correct waveform and the noise is further enhanced. As a result, ringing and noise enhancement occur in part of the image.

Artificial images are images, for example, text or simple graphics, exhibiting a small number of grayscale levels and distinct phase information concerning the positions of edges (outlines), i.e., including many flat portions.

It is thus desirable to enhance the quality of a whole image by distinguishing an area of natural image components and an area of artificial image components contained in the image from each other and by performing optimal processing on each of the areas.

According to an embodiment of the present invention, there is provided an image processing apparatus including broad-range feature extraction means for extracting broad-range features including a plurality of types of broad-range features from pixels located in a predetermined area in relation to a subject pixel of a first image, broad-range degree-of-artificiality calculation means for calculating, in a multi-dimensional space represented by the plurality of types of broad-range features included in the broad-range features extracted by the broad-range feature extraction means, from a positional relationship of the plurality of types of broad-range features according to a statistical distribution range of an artificial image, which exhibits a small number of grayscale levels and distinct edges, of the first image, a broad-range degree of artificiality representing a degree by which the plurality of types of broad-range features belong to the statistical distribution range of the artificial image, narrow-range feature extraction means for extracting narrow-range features including a plurality of types of narrow-range features from pixels located in the predetermined area in relation to the subject pixel of the first image, narrow-range degree-of-artificiality calculation means for calculating, in a multidimensional space represented by the plurality of types of narrow-range features included in the narrow-range features extracted by the narrow-range feature extraction means, from a positional relationship of the plurality of types of narrow-range features according to a statistical distribution range of the artificial image of the first image, a narrow-range degree of artificiality representing a degree by which the plurality of types of narrow-range features belong to the statistical distribution range of the artificial image, and degree-of-artificiality calculation means for calculating a degree of artificiality of the subject pixel by combining the broad-range degree of artificiality and the narrow-range degree of artificiality.

The image processing apparatus may further include first prediction means for predicting, from the first image, a second image which is obtained by increasing the quality of the artificial image, second prediction means for predicting, from the first image, a third image which is obtained by increasing the quality of a natural image exhibiting a large number of grayscale levels and indistinct edges, and synthesizing means for combining the second image and the third image on the basis of the degree of artificiality.

The first prediction means may include first classification means for classifying pixels of the second image into first classes, first storage means for storing a first prediction coefficient for each of the first classes, the first prediction coefficient being obtained by conducting learning by using a plurality of artificial images, and first computation means for determining, from the first image, the second image having a higher quality than the first image by performing computation using the first image and the first prediction coefficients for the first classes into which the pixels of the second image are classified. The second prediction means may include second classification means for classifying pixels of the third image into second classes, second storage means for storing a second prediction coefficient for each of the second classes, the second prediction coefficient being obtained by conducting learning by using a plurality of natural images, and second computation means for determining the third image from the first image by performing computation using the first image and the second prediction coefficients for the second classes into which the pixels of the third image are classified.

The broad-range degree-of-artificiality calculation means may include broad-range artificial-image distribution range storage means for storing the statistical distribution range of the artificial image of the first image in the multidimensional space represented by the plurality of types of broad-range features, and the broad-range degree-of-artificiality calculation means may calculate the broad-range degree of artificiality from the positional relationship of the plurality of types of broad-range features extracted by the broad-range feature extraction means according to the statistical distribution range of the artificial image in the multidimensional space stored in the broad-range artificial-image distribution range storage means.

The narrow-range degree-of-artificiality calculation means may include narrow-range artificial-image distribution range storage means for storing the statistical distribution range of the artificial image of the first image in the multidimensional space represented by the plurality of types of narrow-range features, and the narrow-range degree-of-artificiality calculation means may calculate the narrow-range degree of artificiality from the positional relationship of the plurality of types of narrow-range features extracted by the narrow-range feature extraction means according to the statistical distribution range of the artificial image in the multidimensional space stored in the narrow-range artificial-image distribution range storage means.

The broad-range feature extraction means may include edge feature extraction means for extracting a feature representing the presence of an edge from the pixels located in the predetermined area, and flat feature extraction means for extracting a feature representing the presence of a flat portion from the pixels located in the predetermined area.

The edge feature extraction means may extract, as the feature representing the presence of an edge, a difference dynamic range of the pixels located in the predetermined area by using a difference of pixel values between the subject pixel and each of the pixels located in the predetermined area.

The edge feature extraction means may extract, as the feature representing the presence of an edge, a difference dynamic range of the pixels located in the predetermined area by using a difference of the pixel values between the subject pixel and each of the pixels located in the predetermined area after applying a weight to the difference of the pixel values in accordance with a distance therebetween.

The edge feature extraction means may extract, as the feature representing the presence of an edge, a predetermined order of higher levels of difference absolute values between adjacent pixels of the pixels located in the predetermined area.

The edge feature extraction means may extract, as the feature representing the presence of an edge, the average of higher first through second levels of difference absolute values between adjacent pixels of the pixels located in the predetermined area or the sum of the higher first through second levels of the difference absolute values after applying a weight to each of the difference absolute values.

The flat feature extraction means may extract, as the feature representing the presence of a flat portion, the number of difference absolute values between adjacent pixels of the pixels located in the predetermined area which are smaller than a predetermined threshold.

The predetermined threshold may be set based on the feature representing the presence of an edge.

The flat feature extraction means may extract, as the feature representing the presence of a flat portion, the sum of difference absolute values between adjacent pixels of the pixels located in the predetermined area after transforming the difference absolute values by a predetermined function.

The flat feature extraction means may extract, as the feature representing the presence of a flat portion, the sum of difference absolute values between the adjacent pixels of the pixels located in the predetermined area after transforming the difference absolute values by a predetermined function and after applying a weight to each of the transformed difference absolute values in accordance with a distance from the subject pixel to each of the pixels located in the predetermined area.

The predetermined function may be a function associated with the feature representing the presence of an edge.

The flat feature extraction means may extract, as the feature representing the presence of a flat portion, a predetermined order of lower levels of difference absolute values between adjacent pixels of the pixels located in the predetermined area.

The flat feature extraction means may extract, as the feature representing the presence of a flat portion, the average of lower first through second levels of difference absolute values between adjacent pixels of the pixels located in the predetermined area or the sum of the lower first through second levels of the difference absolute values after applying a weight to each of the difference absolute values.

The narrow-range feature extraction means may extract, from the pixels located in the predetermined area, the narrow-range features including two types of features selected from features representing thin lines, edges, points, flat portions in the vicinity of edges, and gradation.

The narrow-range feature extraction means may include first narrow-range feature extraction means for extracting, as a first feature of the narrow-range features, a pixel-value dynamic range obtained by subtracting a minimum pixel value from a maximum pixel value of pixels located in a first area included in the predetermined area, and second narrow-range feature extraction means for extracting, as a second feature of the narrow-range features, a pixel-value dynamic range obtained by subtracting a minimum pixel value from a maximum pixel value of pixels located in a second area including the subject pixel and included in the first area.

The second narrow-range feature extraction means may extract, as the second feature, a minimum pixel-value dynamic range of pixel-value dynamic ranges obtained from a plurality of the second areas.

The first narrow-range feature extraction means may extract, as the first feature of the narrow-range features, a pixel-value dynamic range of the pixel values of the pixels located in the predetermined area. The second narrow-range feature extraction means may extract, as the second feature of the narrow-range features, the sum of difference absolute values between the subject pixel and the pixels located in the predetermined area after transforming the difference absolute values by a predetermined function and after applying a weight to each of the transformed difference absolute values.

The second narrow-range feature extraction means may include weight calculation means for calculating the weight in accordance with the sum of the difference absolute values between adjacent pixels of all the pixels located on a path from the subject pixel to the pixels located in the first area.

The predetermined function may be a function associated with the first feature.

According to another embodiment of the present invention, there is provided an image processing method including the steps of extracting broad-range features including a plurality of types of broad-range features from pixels located in a predetermined area in relation to a subject pixel of a first image, calculating, in a multidimensional space represented by the plurality of types of broad-range features included in the extracted broad-range features, from a positional relationship of the plurality of types of broad-range features according to a statistical distribution range of an artificial image, which exhibits a small number of grayscale levels and distinct edges, of the first image, a broad-range degree of artificiality representing a degree by which the plurality of types of broad-range features belong to the statistical distribution range of the artificial image, extracting narrow-range features including a plurality of types of narrow-range features from pixels located in the predetermined area in relation to the subject pixel of the first image, calculating, in a multidimensional space represented by the plurality of types of narrow-range features included in the extracted narrow-range features, from a positional relationship of the plurality of types of narrow-range features according to a statistical distribution range of the artificial image of the first image, a narrow-range degree of artificiality representing a degree by which the plurality of types of narrow-range features belong to the statistical distribution range of the artificial image, and calculating a degree of artificiality of the subject pixel by combining the broad-range degree of artificiality and the narrow-range degree of artificiality.

According to another embodiment of the present invention, there is provided a program recording medium recorded thereon a computer-readable program. The computer-readable program includes the steps of extracting broad-range features including a plurality of types of broad-range features from pixels located in a predetermined area in relation to a subject pixel of a first image, calculating, in a multidimensional space represented by the plurality of types of broad-range features included in the extracted broad-range features, from a positional relationship of the plurality of types of broad-range features according to a statistical distribution range of an artificial image, which exhibits a small number of grayscale levels and distinct edges, of the first image, a broad-range degree of artificiality representing a degree by which the plurality of types of broad-range features belong to the statistical distribution range of the artificial image, extracting narrow-range features including a plurality of types of narrow-range features from pixels located in the predetermined area in relation to the subject pixel of the first image, calculating, in a multidimensional space represented by the plurality of types of narrow-range features included in the extracted narrow-range features, from a positional relationship of the plurality of types of narrow-range features according to a statistical distribution range of the artificial image of the first image, a narrow-range degree of artificiality representing a degree by which the plurality of types of narrow-range features belong to the statistical distribution range of the artificial image, and calculating a degree of artificiality of the subject pixel by combining the broad-range degree of artificiality and the narrow-range degree of artificiality.

According to another embodiment of the present invention, there is provided a program allowing a computer to execute processing including the steps of extracting broad-range features including a plurality of types of broad-range features from pixels located in a predetermined area in relation to a subject pixel of a first image, calculating, in a multidimensional space represented by the plurality of types of broad-range features included in the extracted broad-range features, from a positional relationship of the plurality of types of broad-range features according to a statistical distribution range of an artificial image, which exhibits a small number of grayscale levels and distinct edges, of the first image, a broad-range degree of artificiality representing a degree by which the plurality of types of broad-range features belong to the statistical distribution range of the artificial image, extracting narrow-range features including a plurality of types of narrow-range features from pixels located in the predetermined area in relation to the subject pixel of the first image, calculating, in a multidimensional space represented by the plurality of types of narrow-range features included in the extracted narrow-range features, from a positional relationship of the plurality of types of narrow-range features according to a statistical distribution range of the artificial image of the first image, a narrow-range degree of artificiality representing a degree by which the plurality of types of narrow-range features belong to the statistical distribution range of the artificial image, and calculating a degree of artificiality of the subject pixel by combining the broad-range degree of artificiality and the narrow-range degree of artificiality.

In the image processing apparatus and method, and the program according to an embodiment of the present invention, broad-range features including a plurality of types of broad-range features are extracted from pixels located in a predetermined area in relation to a subject pixel of a first image. In a multidimensional space represented by the plurality of types of broad-range features included in the extracted broad-range features, from a positional relationship of the plurality of types of broad-range features according to a statistical distribution range of an artificial image, which exhibits a small number of grayscale levels and distinct edges, of the first image, a broad-range degree of artificiality representing a degree by which the plurality of types of broad-range features belong to the statistical distribution range of the artificial image is calculated. Narrow-range features including a plurality of types of narrow-range features are extracted from pixels located in the predetermined area in relation to the subject pixel of the first image. In a multidimensional space represented by the plurality of types of narrow-range features included in the extracted narrow-range features, from a positional relationship of the plurality of types of narrow-range features according to a statistical distribution range of the artificial image of the first image, a narrow-range degree of artificiality representing a degree by which the plurality of types of narrow-range features belong to the statistical distribution range of the artificial image is calculated. The degree of artificiality of the subject pixel is calculated by combining the broad-range degree of artificiality and the narrow-range degree of artificiality.

The image processing apparatus according to an embodiment of the present invention may be an independent apparatus or a block performing image processing.

According to an embodiment of the present invention, the quality of a whole image can be enhanced.

According to an embodiment of the present invention, it is possible to perform optimal processing on an area of natural image components and an area of artificial image components contained in an image by distinguishing the two areas from each other.

BRIEF DESCRIPTION OF THE DRAWINGS

FIG. 52 is a flowchart illustrating image conversion processing performed by the image conversion device shown in FIG. 51;

FIG. 55 is a block diagram illustrating the configuration of a personal computer implementing the image conversion device.

DESCRIPTION OF THE PREFERRED EMBODIMENTS

Before describing an embodiment of the present invention, the correspondence between the features of the claims and the embodiment disclosed in the present invention is discussed below. This description is intended to assure that the embodiment supporting the claimed invention is described in this specification. Thus, even if an element in the following embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiment are described in the claims. That is, the description does not deny the existence of aspects of the present invention that are described in the embodiment but not claimed in the invention of this application, i.e., the existence of aspects of the present invention that in future may be claimed by a divisional application, or that may be additionally claimed through amendments.

Figure 20:
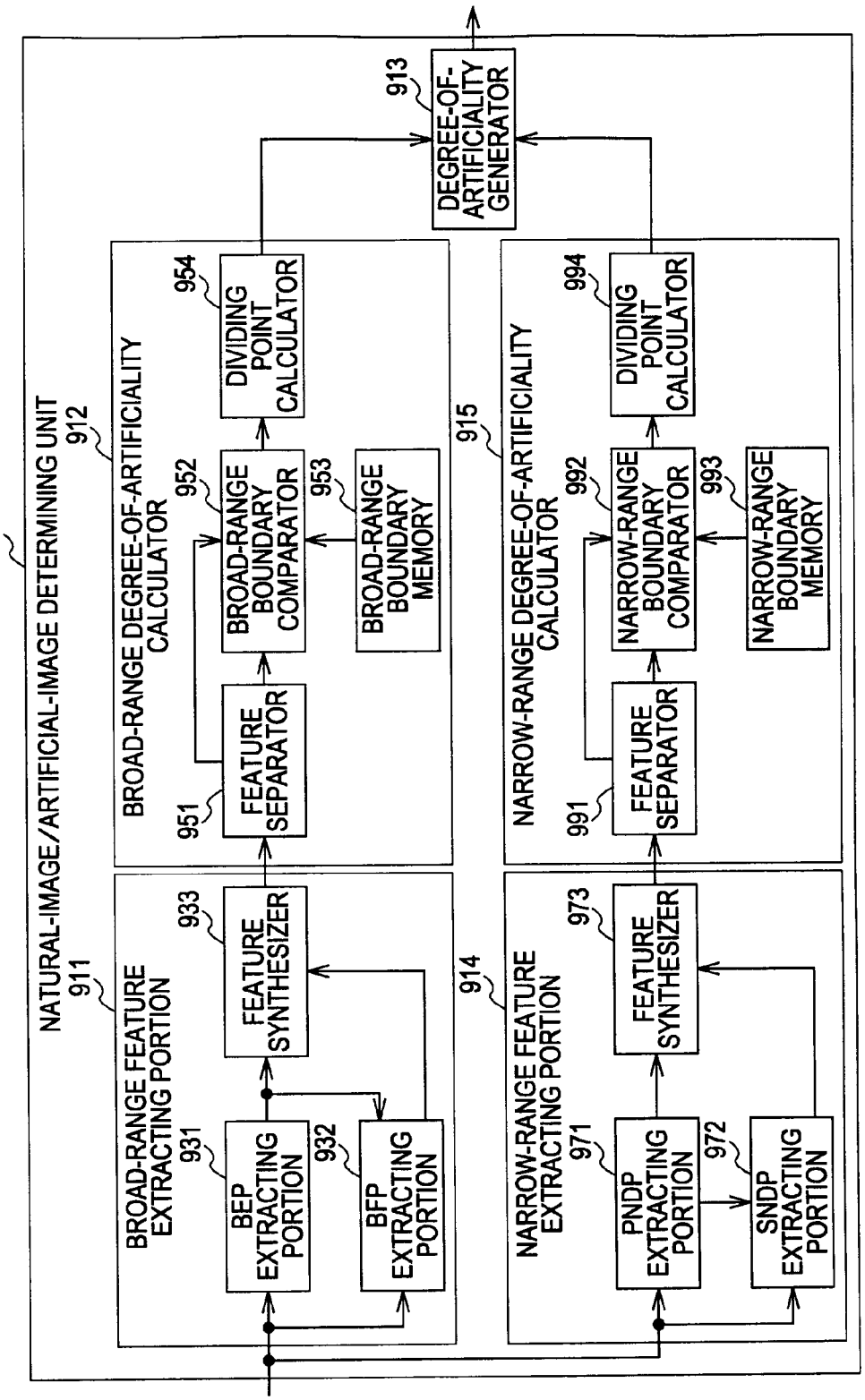
FIG. 20 is a block diagram illustrating the configuration of a natural-image/artificial-image determining unit.

An image processing apparatus according to an embodiment of the present invention includes broad-range feature extraction means (e.g., a broad-range feature extracting portion 911 shown in FIG. 20) for extracting broad-range features including a plurality of types of broad-range features from pixels located in a predetermined area in relation to a subject pixel of a first image, broad-range degree-of-artificiality calculation means (e.g., a broad-range degree-of-artificiality calculator 912 shown in FIG. 20) for calculating, in a multidimensional space represented by the plurality of types of broad-range features included in the broad-range features extracted by the broad-range feature extraction means, from a positional relationship of the plurality of types of broad-range features according to a statistical distribution range of an artificial image, which exhibits a small number of grayscale levels and distinct edges, of the first image, a broad-range degree of artificiality representing a degree by which the plurality of types of broad-range features belong to the statistical distribution range of the artificial image, narrow-range feature extraction means (e.g., a narrow-range feature extracting portion 914 shown in FIG. 20) for extracting narrow-range features including a plurality of types of narrow-range features from pixels located in the predetermined area in relation to the subject pixel of the first image, narrow-range degree-of-artificiality calculation means (e.g., a narrow-range degree-of-artificiality calculator 915 shown in FIG. 20) for calculating, in a multidimensional space represented by the plurality of types of narrow-range features included in the narrow-range features extracted by the narrow-range feature extraction means, from a positional relationship of the plurality of types of narrow-range features according to a statistical distribution range of the artificial image of the first image, a narrow-range degree of artificiality representing a degree by which the plurality of types of narrow-range features belong to the statistical distribution range of the artificial image, and degree-of-artificiality calculation means (e.g., a degree-of-artificiality calculator 913 shown in FIG. 20) for calculating a degree of artificiality of the subject pixel by combining the broad-range degree of artificiality and the narrow-range degree of artificiality.

The image processing apparatus may further include first prediction means (e.g., an artificial-image prediction unit 132 shown in FIG. 1) for predicting, from the first image, a second image which is obtained by increasing the quality of the artificial image, second prediction means (e.g., a natural-image prediction unit 131 shown in FIG. 1) for predicting, from the first image, a third image which is obtained by increasing the quality of a natural image exhibiting a large number of grayscale levels and indistinct edges, and synthesizing means (e.g., a synthesizer 133 shown in FIG. 1) for combining the second image and the third image on the basis of the degree of artificiality.

The first prediction means may include first classification means (e.g., a classification portion 651 shown in FIG. 10) for classifying pixels of the second image into first classes, first storage means (e.g., a prediction coefficient memory 654 shown in FIG. 10) for storing a first prediction coefficient for each of the first classes, the first prediction coefficient being obtained by conducting learning by using a plurality of artificial images, and first computation means (e.g., a prediction portion 655 shown in FIG. 10) for determining, from the first image, the second image having a higher quality than the first image by performing computation using the first image and the first prediction coefficients for the first classes into which the pixels of the second image are classified. The second prediction means may include second classification means (e.g., a class tap extracting portion 551 or an adaptive dynamic range coding (ADRC) processor 552 shown in FIG. 3) for classifying pixels of the third image into second classes, second storage means (e.g., a prediction coefficient memory 555 shown in FIG. 3) for storing a second prediction coefficient for each of the second classes, the second prediction coefficient being obtained by conducting learning by using a plurality of natural images, and second computation means (e.g., a prediction computation portion 557 shown in FIG. 3) for determining the third image from the first image by performing computation using the first image and the second prediction coefficients for the second classes into which the pixels of the third image are classified.

The broad-range degree-of-artificiality calculation means (e.g., the broad-range degree-of-artificiality calculator 912 shown in FIG. 20) may include broad-range artificial-image distribution range storage means (e.g., broad-range boundary memory 953 shown in FIG. 20) for storing the statistical distribution range of the artificial image of the first image in the multidimensional space represented by the plurality of types of broad-range features, and the broad-range degree-of-artificiality calculation means may calculate the broad-range degree of artificiality from the positional relationship of the plurality of types of broad-range features extracted by the broad-range feature extraction means according to the statistical distribution range of the artificial image in the multidimensional space stored in the broad-range artificial-image distribution range storage means.

The narrow-range degree-of-artificiality calculation means (e.g., the narrow-range degree-of-artificiality calculator 915 shown in FIG. 20) may include narrow-range artificial-image distribution range storage means (e.g., a narrow-range boundary memory 993 shown in FIG. 20) for storing the statistical distribution range of the artificial image of the first image in the multidimensional space represented by the plurality of types of narrow-range features, and the narrow-range degree-of-artificiality calculation means may calculate the narrow-range degree of artificiality from the positional relationship of the plurality of types of narrow-range features extracted by the narrow-range feature extraction means according to the statistical distribution range of the artificial image in the multidimensional space stored in the narrow-range artificial-image distribution range storage means.

The broad-range feature extraction means may include edge feature extraction means (e.g., a BEP extracting portion 931 shown in FIG. 20) for extracting a feature representing the presence of an edge from the pixels located in the predetermined area, and flat feature extraction means (e.g., a BFP extracting portion 932 shown in FIG. 20) for extracting a feature representing the presence of a flat portion from the pixels located in the predetermined area.

The edge feature extraction means (e.g., the BEP extracting portion 931 shown in FIG. 21) may extract, as the feature representing the presence of an edge, a difference dynamic range of the pixels located in the predetermined area by using a difference of pixel values between the subject pixel and each of the pixels located in the predetermined area.

The edge feature extraction means (e.g., the BEP extracting portion 931 shown in FIG. 21) may extract, as the feature representing the presence of an edge, a difference dynamic range of the pixels located in the predetermined area by using a difference of the pixel values between the subject pixel and each of the pixels located in the predetermined area after applying a weight to the difference of the pixel values in accordance with a distance therebetween.

The edge feature extraction means (e.g., the BEP extracting portion 931 shown in FIG. 39) may extract, as the feature representing the presence of an edge, a predetermined order of higher levels of difference absolute values between adjacent pixels of the pixels located in the predetermined area.

The edge feature extraction means (e.g., the BEP extracting portion 931 shown in FIG. 39) may extract, as the feature representing the presence of an edge, the average of higher first through second levels of difference absolute values between adjacent pixels of the pixels located in the predetermined area or the sum of the higher first through second levels of the difference absolute values after applying a weight to each of the difference absolute values.

The flat feature extraction means (e.g., the BFP extracting portion 932 shown in FIG. 22) may extract, as the feature representing the presence of a flat portion, the number of difference absolute values between adjacent pixels of the pixels located in the predetermined area which are smaller than a predetermined threshold.

The flat feature extraction means (e.g., the BFP extracting portion 932 shown in FIG. 22) may extract, as the feature representing the presence of a flat portion, the sum of difference absolute values between adjacent pixels of the pixels located in the predetermined area after transforming the difference absolute values by a predetermined function.

The flat feature extraction means (e.g., the BFP extracting portion 932 shown in FIG. 22) may extract, as the feature representing the presence of a flat portion, the sum of difference absolute values between the adjacent pixels of the pixels located in the predetermined area after transforming the difference absolute values by a predetermined function and after applying a weight to each of the transformed difference absolute values in accordance with a distance from the subject pixel to each of the pixels located in the predetermined area.

The flat feature extraction means (e.g., the BFP extracting portion 932 shown in FIG. 42) may extract, as the feature representing the presence of a flat portion, a predetermined order of lower levels of difference absolute values between adjacent pixels of the pixels located in the predetermined area.

The flat feature extraction means (e.g., the BFP extracting portion 932 shown in FIG. 42) may extract, as the feature representing the presence of a flat portion, the average of lower first through second levels of difference absolute values between adjacent pixels of the pixels located in the predetermined area or the sum of the lower first through second levels of the difference absolute values after applying a weight to each of the difference absolute values.

The narrow-range feature extraction (e.g., the narrow-range feature extracting portion 914 shown in FIG. 20) means may extract, from the pixels located in the predetermined area, the narrow-range features including two types of features selected from features representing thin lines, edges, points, flat portions in the vicinity of edges, and gradation.

The narrow-range feature extraction means (e.g., the narrow-range feature extracting portion 914 shown in FIG. 20) may include first narrow-range feature extraction means (e.g., a PNDP extracting portion 971 shown in FIG. 20) for extracting, as a first feature of the narrow-range features, a pixel-value dynamic range obtained by subtracting a minimum pixel value from a maximum pixel value of pixels located in a first area included in the predetermined area, and second narrow-range feature extraction means (e.g., an SNDP extracting portion 972 shown in FIG. 20) for extracting, as a second feature of the narrow-range features, a pixel-value dynamic range obtained by subtracting a minimum pixel value from a maximum pixel value of pixels located in a second area including the subject pixel and included in the first area.

The second narrow-range feature extraction means (e.g., an SNDP extracting portion 972 shown in FIG. 24) may extract, as the second feature, a minimum pixel-value dynamic range of pixel-value dynamic ranges obtained from a plurality of the second areas.

The first narrow-range feature extraction means (e.g., the PNDP extracting portion 971 shown in FIG. 45) may extract, as the first feature of the narrow-range features, a pixel-value dynamic range of the pixel values of the pixels located in the predetermined area. The second narrow-range feature extraction means (e.g., the SNDP extracting portion 972 shown in FIG. 47) may extract, as the second feature of the narrow-range features, the sum of difference absolute values between the subject pixel and the pixels located in the predetermined area after transforming the difference absolute values by a predetermined function and after applying a weight to each of the transformed difference absolute values.

The second narrow-range feature extraction means (e.g., the SNDP extracting portion 972 shown in FIG. 47) may include weight calculation means (e.g., a weight calculator 1165 shown in FIG. 47) for calculating the weight in accordance with the sum of the difference absolute values between adjacent pixels of all the pixels located on a path from the subject pixel to the pixels located in the first area.

Figure 25:
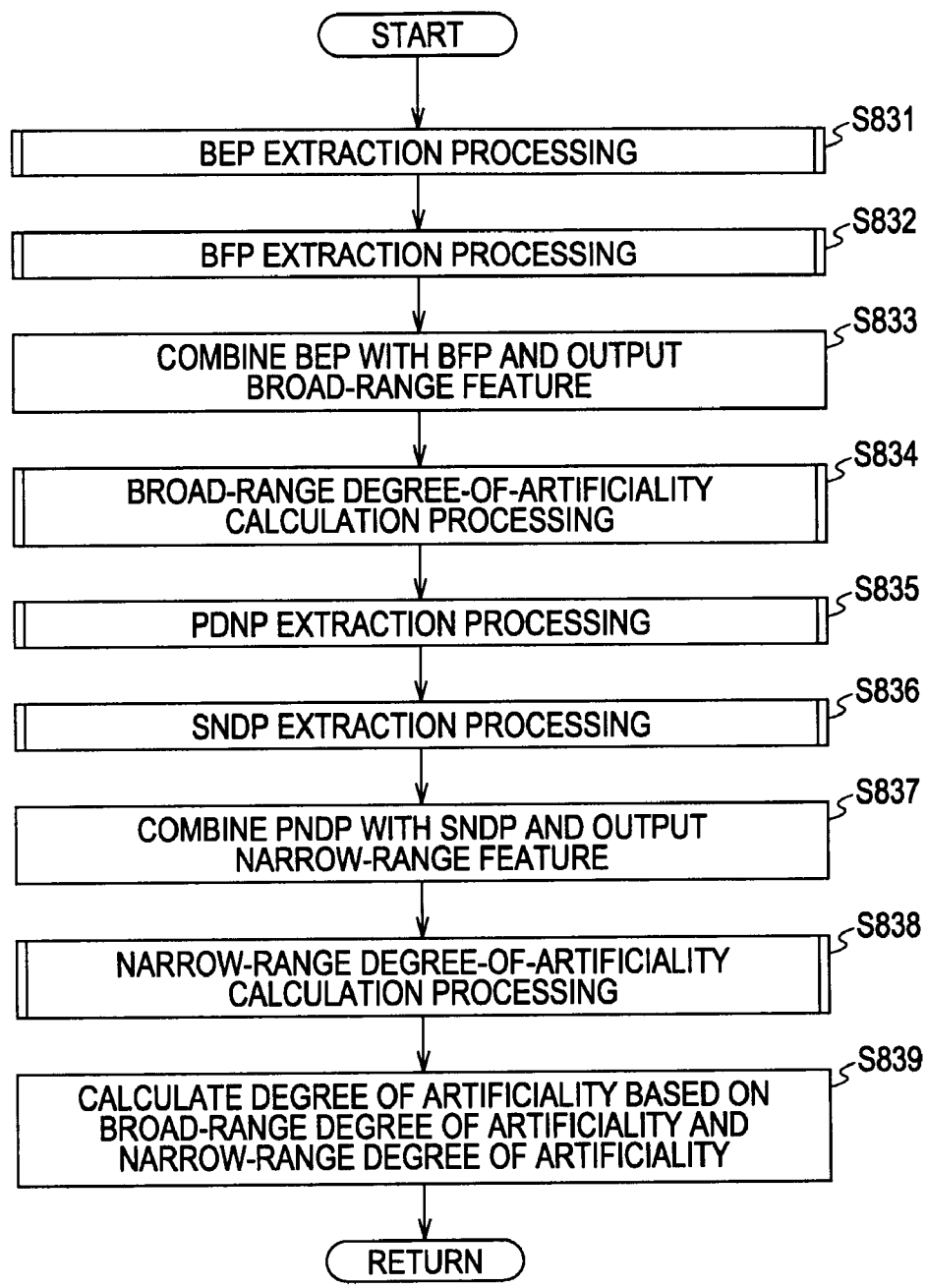
FIG. 25 is a flowchart illustrating natural-image/artificial-image determination processing performed by the natural-image/artificial-image determining unit shown in FIG. 20.

According to another embodiment of the present invention, there is provided an image processing method including the steps of extracting broad-range features including a plurality of types of broad-range features from pixels located in a predetermined area in relation to a subject pixel of a first image (e.g., steps S831 and S832 in the flowchart in FIG. 25), calculating, in a multidimensional space represented by the plurality of types of broad-range features included in the extracted broad-range features, from a positional relationship of the plurality of types of broad-range features according to a statistical distribution range of an artificial image, which exhibits a small number of grayscale levels and distinct edges, of the first image, a broad-range degree of artificiality representing a degree by which the plurality of types of broad-range features belong to the statistical distribution range of the artificial image (e.g., step S834 in the flowchart in FIG. 25), extracting narrow-range features including a plurality of types of narrow-range features from pixels located in the predetermined area in relation to the subject pixel of the first image (e.g., steps S835 and S836 in the flowchart in FIG. 25), calculating, in a multidimensional space represented by the plurality of types of narrow-range features included in the extracted narrow-range features, from a positional relationship of the plurality of types of narrow-range features according to a statistical distribution range of the artificial image of the first image, a narrow-range degree of artificiality representing a degree by which the plurality of types of narrow-range features belong to the statistical distribution range of the artificial image (e.g., step S838 in the flowchart in FIG. 25), and calculating a degree of artificiality of the subject pixel by combining the broad-range degree of artificiality and the narrow-range degree of artificiality (e.g., step S839 in the flowchart in FIG. 25).

Embodiments of the present invention are described in detail below with reference to the accompanying drawings.

Figure 1:
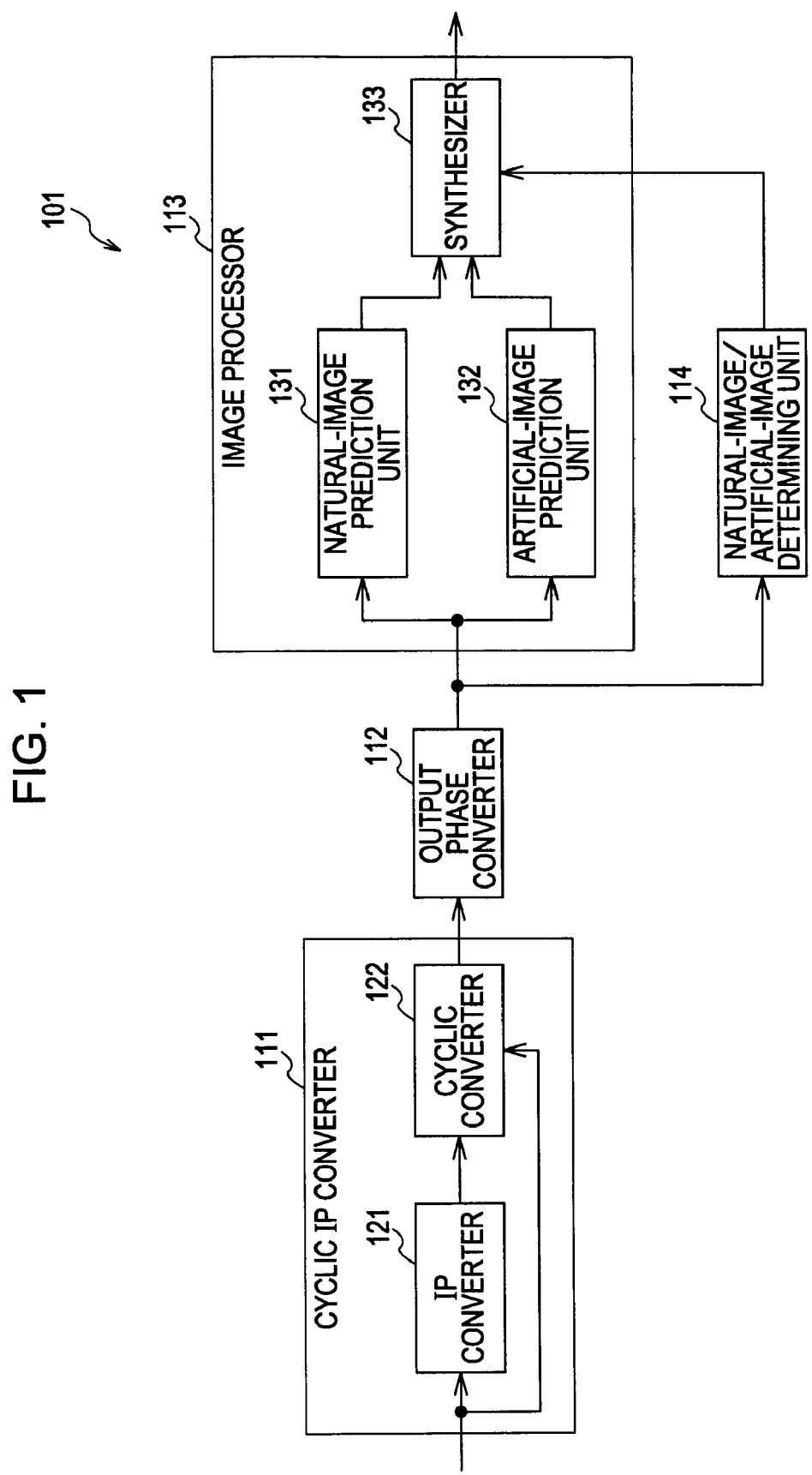
FIG. 1 is a block diagram illustrating an example of the configuration of an image conversion device according to an embodiment of the present invention.

FIG. 1 is a block diagram illustrating an image conversion device 101 according to an embodiment of the present invention. The image conversion device 101 includes a cyclic interlace/progressive (IP) converter 111, an output phase converter 112, an image processor 113, and a natural-image/artificial-image determining unit 114. The cyclic IP converter 111 includes an IP converter 121 and a cyclic converter 122. The image processor 113 includes a natural-image prediction unit 131, an artificial-image prediction unit 132, and a synthesizer 133.

An interlace SD image to be processed is input into the IP converter 121 and the cyclic converter 122 of the cyclic IP converter 111.

The IP converter 121 converts the input interlace SD image (hereinafter also referred to as an "input image") into a progressive SD image (hereinafter also referred to as an "intermediate image") according to a predetermined method, and supplies the converted progressive SD image to the cyclic converter 122.

The cyclic converter 122 determines motion vectors between the input image and the progressive SD image of the previous frame (one frame before) output from the cyclic converter 122 (such an image is also referred to as an "output image"). The cyclic converter 122 then adds the pixel values of the output image motion-compensated based on the determined motion vectors to the pixel values of the input image by using cyclic coefficients as weights, thereby improving the intermediate image. That is, the cyclic converter 122 converts the intermediate image into an output image, which is a progressive SD image of a quality higher than the intermediate image, and supplies the resulting output image to the output phase converter 112. The cyclic coefficients are set based on whether each pixel of the intermediate image exists in the original input image and also based on the magnitudes of the motion vectors in the vertical direction and the reliabilities representing the probabilities of the motion vectors.

The output phase converter 112 interpolates the SD image having a first pixel number supplied from the cyclic converter 122 in the horizontal and vertical directions to generate an HD image having a second pixel number. The second pixel number is greater than the first pixel number. The output phase converter 112 supplies the HD image to the natural-image prediction unit 131, the artificial-image prediction unit 132, and the natural-image/artificial-image determining unit 114.

The image processor 113 performs processing for converting the HD image into a high-quality image based on the degrees of artificiality supplied from the natural-image/artificial-image determining unit 114, and outputs the high-quality HD image.

The natural-image/artificial-image determining unit 114 determines for each pixel of the HD image supplied from the output phase converter 112 whether it belongs to an artificial image area or a natural image area, and outputs determination results to the image processor 113 as the degrees of artificiality. That is, the degree of artificiality represents the ratio of artificial image components to natural image components in an intermediate area, which is between the artificial image area and the natural image area, by a value from 0 to 1.

The natural-image prediction unit 131 predicts, from the HD image supplied from the output phase converter 112, a high-quality HD image which can be obtained by increasing the quality of natural image components contained in the input HD image (such a high-quality HD image is hereafter referred to as a "high-quality natural image"). More specifically, in accordance with the features of the input HD image, the natural-image prediction unit 131 allocates the subject pixels into classes optimal for the features of the natural image. Then, the natural-image prediction unit 131 performs computation by using the input HD image and prediction coefficients corresponding to the classes, which are used for predicting the high-quality natural image, to predict the high-quality natural image from the input HD image. The natural-image prediction unit 131 supplies the computed high-quality natural image to the synthesizer 133.

As in the natural-image prediction unit 131, the artificial-image prediction unit 132 predicts, from the HD image supplied from the output phase converter 112, a high-quality HD image which can be obtained by increasing the quality of artificial image components contained in the input HD image (such a high-quality HD image is hereafter referred to as a "high-quality artificial image"). More specifically, in accordance with the features of the input HD image, the artificial-image prediction unit 132 allocates the pixels forming the high-quality artificial image to be determined from the input HD image into classes optimal for the features of the artificial image. Then, the artificial-image prediction unit 132 performs calculations by using the input HD image and prediction coefficients corresponding to the classes, which are used for predicting the high-quality artificial image, to predict the high-quality artificial image from the input HD image. The artificial-image prediction unit 132 supplies the calculated high-quality artificial image to the synthesizer 133.

The synthesizer 133 combines, based on the determination results supplied from the natural-image/artificial-image determining unit 114, the pixel values of the pixels forming the high-quality natural image supplied from the natural-image prediction unit 131 with the pixel values of the pixels forming the high-quality artificial image supplied from the artificial-image prediction unit 132 in accordance with the degrees of artificiality of the individual pixels. The synthesizer 133 then outputs the synthesized HD image.

The image conversion processing executed by the image conversion device 101 is described below with reference to the flowchart in FIG. 2. This processing is started, for example, when an interlace SD image is input from an external source into the image conversion device 101.

In step S1, the IP converter 121 performs IP conversion. More specifically, the IP converter 121 converts an interlace input image into a progressive intermediate image according to a predetermined method, and supplies the IP-converted intermediate image to the cyclic converter 122.

In step S2, the cyclic converter 122 performs cyclic conversion processing. More specifically, the cyclic converter 122 determines motion vectors between the input image and the output image of the previous frame (one frame before) output from the cyclic converter 122. The cyclic converter 122 then adds the pixel values of the motion-compensated output image based on the determined motion vectors to the pixel values of the input image by using cyclic coefficients as weights, thereby improving the intermediate image. The cyclic converter 122 converts the intermediate image into an output image, which is a progressive SD image of a quality higher than the intermediate image, and supplies the resulting output image to the output phase converter 112.

In step S3, the output phase converter 112 performs output phase conversion processing. More specifically, the output phase converter 112 interpolates the SD image supplied from the cyclic converter 122 in the horizontal and vertical directions to generate an HD image. The output phase converter 112 then supplies the HD image to the natural-image prediction unit 131, the artificial-image prediction unit 132, and the natural-image/artificial-image determining unit 114.

In step S4, the natural-image prediction unit 131 performs natural-image prediction processing. According to this processing, a high-quality natural image is predicted from the HD image and is supplied to the synthesizer 133. Details of the natural-image prediction processing are discussed below with reference to FIG. 6.

In step S5, the artificial-image prediction unit 132 performs artificial-image prediction processing. According to this processing, a high-quality artificial image is predicted from the HD image and is supplied to the synthesizer 133. Details of the artificial-image prediction processing are discussed below with reference to FIG. 15.

In step S6, the natural-image/artificial-image determining unit 114 performs natural-image/artificial-image determination processing. According to this processing, the natural-image/artificial-image determining unit 114 determines whether each pixel of the HD image supplied from the output phase converter 112 belongs to an artificial image area or a natural image area, and outputs determination results to the synthesizer 133 as the degrees of artificiality. Details of the natural-image/artificial-image determination processing are discussed below with reference to FIG. 25.

In step S7, the synthesizer 133 synthesizes an image. More specifically, the synthesizer 133 combines, based on determination results supplied from the natural-image/artificial-image determining unit 114, the pixel values of the pixels forming the high-quality natural image supplied from the natural-image prediction unit 131 with the pixel values of the pixels forming the high-quality artificial image supplied from the artificial-image prediction unit 132 in accordance with the degrees of artificiality of the individual pixels. The synthesizer 133 outputs the synthesized HD image to a subsequent device.

If the image conversion processing is continuously performed on a plurality of images, steps S1 through S7 are repeated.

Figure 3:
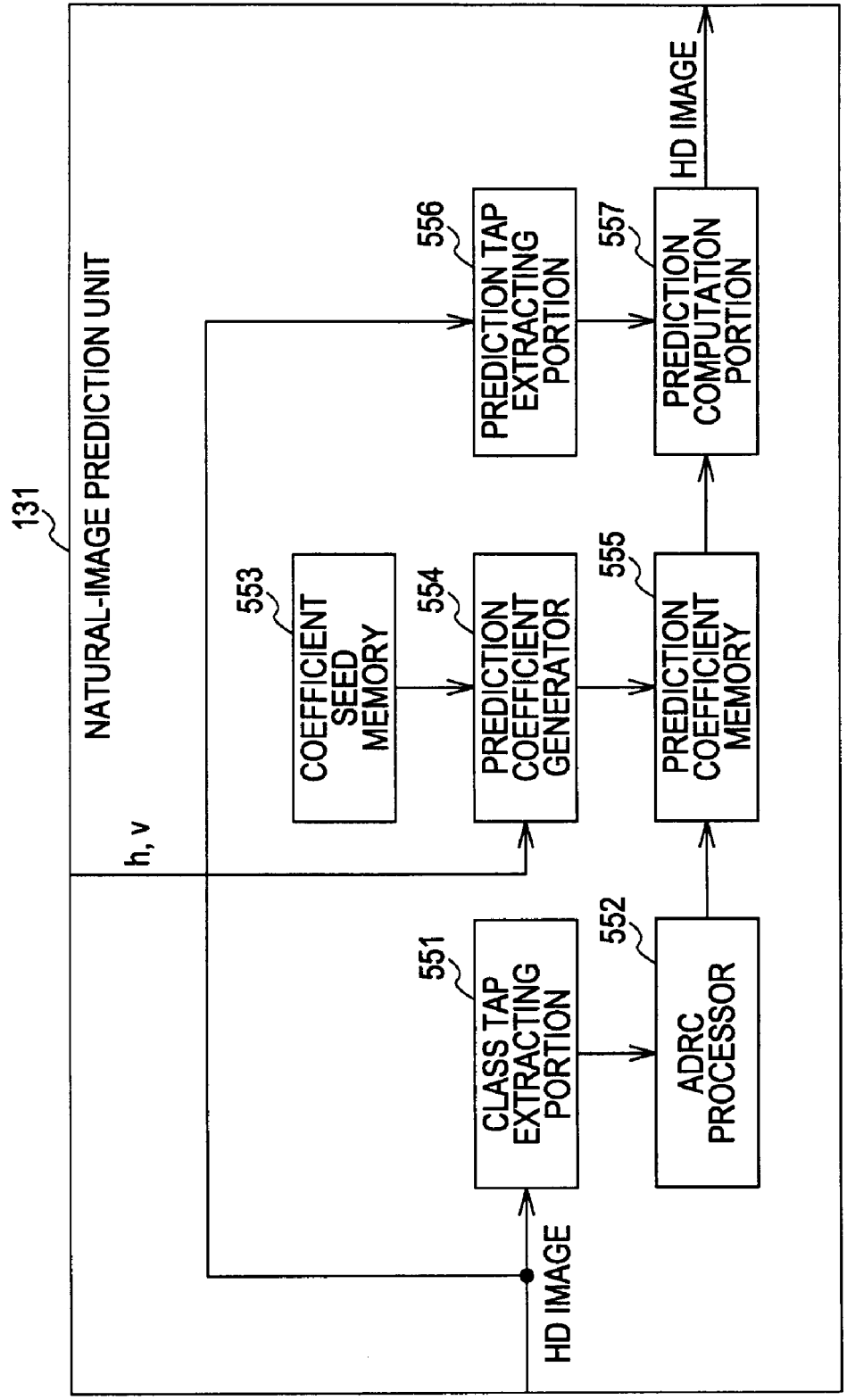
FIG. 3 is a block diagram illustrating the detailed configuration of a natural-image prediction unit.

FIG. 3 is a block diagram illustrating the configuration of the natural-image prediction unit 131 shown in FIG. 1.

The natural-image prediction unit 131 includes a class tap extracting portion 551, an adaptive dynamic range coding (ADRC) processor 552, a coefficient seed memory 553, a prediction coefficient generator 554, a prediction coefficient memory 555, a prediction tap extracting portion 556, and a prediction computation portion 557. The natural-image prediction unit 131 predicts a high-quality natural image from the progressive HD image supplied from the output phase converter 112 shown in FIG. 1 after removing noise from the natural image.

A progressive HD image supplied from the output phase converter 112 shown in FIG. 1 is supplied to the natural-image prediction unit 131, and more specifically, to the class tap extracting portion 551 and the prediction tap extracting portion 556.

The class tap extracting portion 551 sequentially selects the pixels forming the high-quality natural image determined from the input HD image as subject pixels, and extracts some of the pixels forming the HD image as class taps, which are used for classifying the subject pixels. The class tap extracting portion 551 then supplies the extracted class taps to the ADRC processor 552.

The ADRC processor 552 performs ADRC processing on the pixel values of the pixels forming the class taps supplied from the class tap extracting portion 551 to detect the ADRC code as the feature of the waveform of the class taps.

In K-bit ADRC processing, the maximum value MAX and the minimum value MIN of the pixel values of the pixels forming the class taps are detected, and DR=MAX−MIN is set as the local dynamic range of a set, and then, the pixel values of the pixels forming the class taps are re-quantized into K bits based on the dynamic range. That is, the minimum value MIN is subtracted from the pixel value of each pixel forming the class taps and the resulting value is divided by $DR/2^K$.

Then, the K-bit pixel values of the pixels forming the class taps are arranged in a predetermined order, resulting in a bit string, which is then output as the ADRC code. Accordingly, if one-bit ADRC processing is performed on the class taps, the pixel value of each pixel forming the class taps is divided by the average of the maximum value MAX and the minimum value MIN so that it is re-quantized into one bit with the decimal fractions omitted. That is, the pixel value of each pixel is binarized. Then, a bit string of the one-bit pixel values arranged in a predetermined order is output as the ADRC code.

The ADRC processor 552 determines the class based on the detected ADRC code to classify each subject pixel, and then supplies the determined class to the prediction coefficient memory 555. For example, the ADRC processor 552 directly supplies the ADRC code to the prediction coefficient memory 555 as the class.

The coefficient seed memory 553 stores a coefficient seed, which is obtained by learning discussed below with reference to FIGS. 7 through 9, for each class. The prediction coefficient generator 554 reads a coefficient seed from the coefficient seed memory 553. The prediction coefficient generator 554 then generates a prediction coefficient from the read coefficient seed by using a polynomial containing a parameter h and a parameter v, which are input by a user, for determining the horizontal resolution and the vertical resolution, respectively, and supplies the generated prediction coefficient to the prediction coefficient memory 555.

The prediction coefficient memory 555 reads out the prediction coefficient according to the class supplied from ADRC processor 552, and supplies the read prediction coefficient to the prediction computation portion 557.

The prediction taps and the class taps may have the same tap structure or different tap structures.

The prediction tap extracting portion 556 extracts, from the input HD image, as prediction taps, some of the pixels forming the HD image used for predicting the pixel value of a subject pixel. The prediction tap extracting portion 556 supplies the extracted prediction taps to the prediction computation portion 557.

The prediction computation portion 557 performs prediction computation, such as linear expression computation, for determining the prediction value of the true value of the subject pixel by using the prediction taps supplied from the prediction tap extracting portion 556 and the prediction coefficient supplied from the prediction coefficient memory 555. Then, the prediction computation portion 557 predicts the pixel value of the subject pixel, i.e., the pixel value of a pixel forming the high-quality natural image, and outputs the predicted pixel value to the synthesizer 133.

Figure 4:
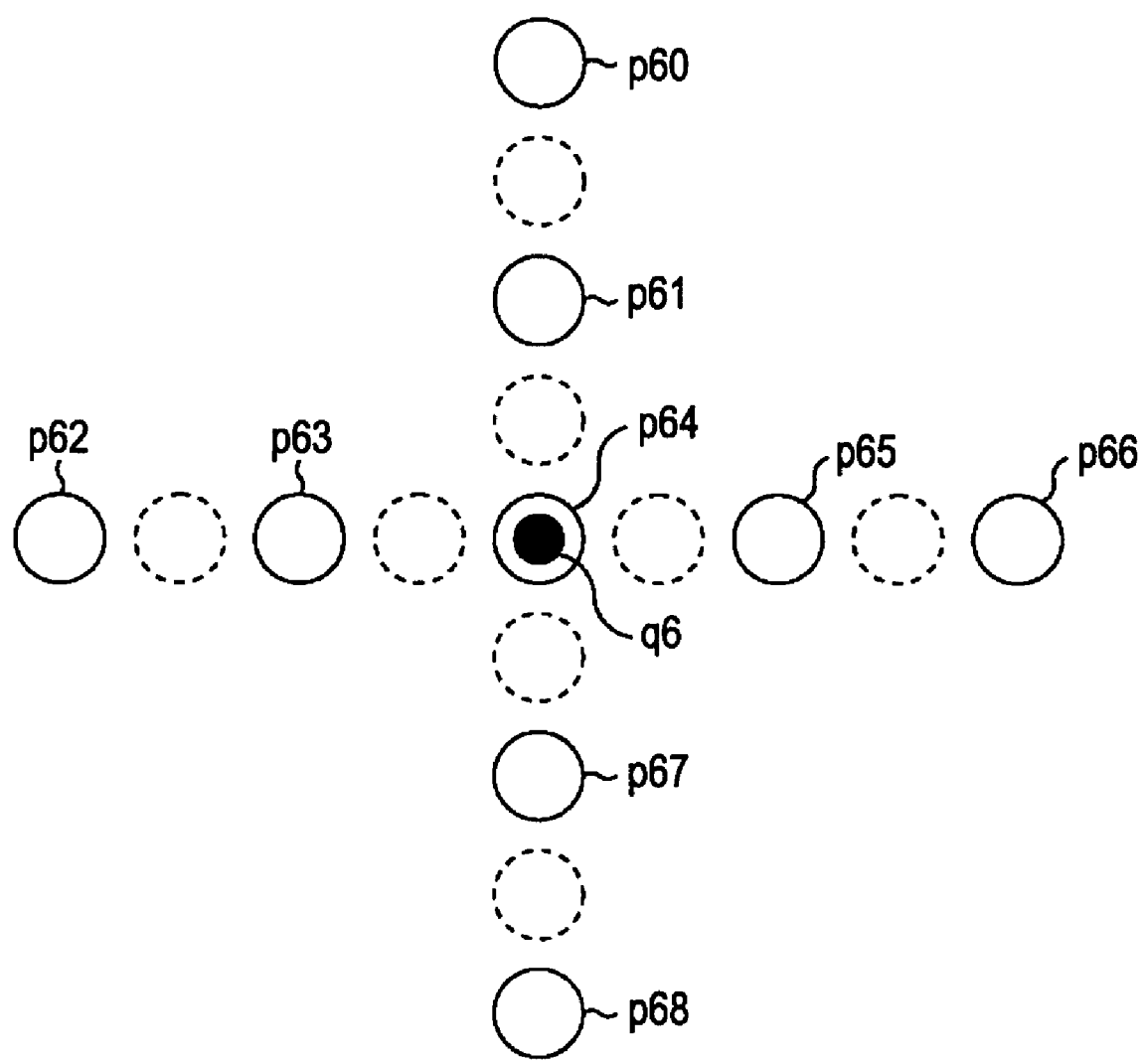
FIG. 4 illustrates an example of the tap structure of class taps.

FIG. 4 illustrates an example of the tap structure of class taps extracted by the class tap extracting portion 551 shown in FIG. 3.

In FIG. 4, among the pixels forming the HD image supplied from the output phase converter 112, the white circles indicate the pixels forming the class taps, the circles represented by broken curves represent the pixels that do not form the class taps, and the black circle designates the subject pixel. The same applies to FIG. 5.

In FIG. 4, nine pixels form the class taps. More specifically, around a pixel p64 forming the HD image corresponding to a subject pixel q6, five pixels p60, p61, p64, p67, and p68 aligned every other pixel in the vertical direction, and four pixels p62, p63, p65, and p66 aligned every other pixel, except for the pixel p64, in the horizontal direction, are disposed as the class taps, i.e., a so-called "cross-shaped" class tap structure is formed.

Figure 5:
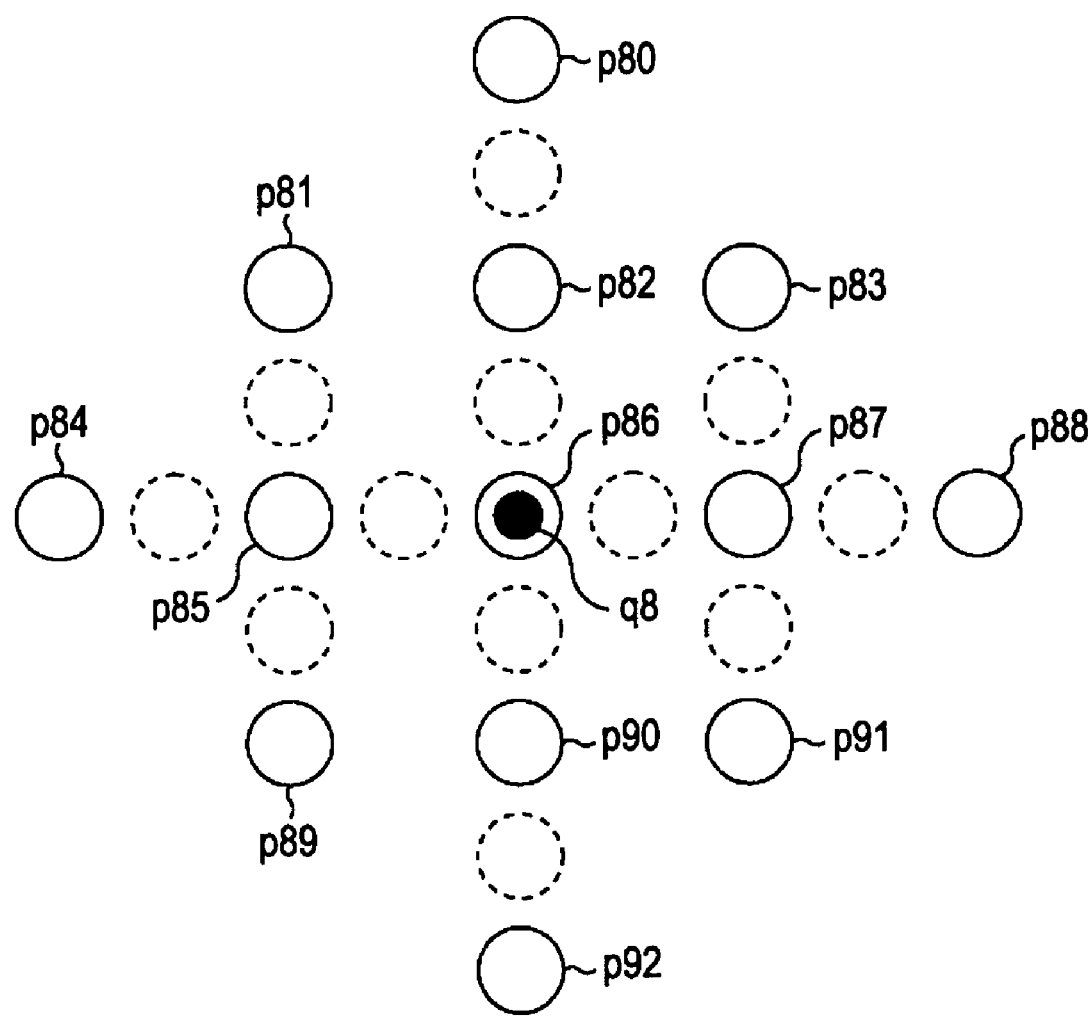
FIG. 5 illustrates an example of the tap structure of prediction taps.

FIG. 5 illustrates an example of the tap structure of prediction taps extracted by the prediction tap extracting portion 556 shown in FIG. 3.

In FIG. 5, 13 pixels form the prediction taps. More specifically, among the pixels forming the HD pixel supplied from the output phase converter 112, around a pixel p86 forming the HD image corresponding to a subject pixel q8, five pixels p80, p82, p86, p90, and p92 aligned every other pixel in the vertical direction, four pixels p84, p85, p87, and p88 aligned every other pixel, except for the pixel p86, in the vertical direction, two pixels p81 and p89 aligned every other pixel, except for the pixel p85, in the vertical direction around the pixel p85, and two pixels p83 and p91 aligned every other pixel, except for the pixel p87, in the vertical direction around the pixel p87, are disposed as the prediction taps, i.e., a generally rhomboid prediction tap structure is formed.

In FIGS. 4 and 5, the nine pixels p60 through p68 forming the class taps and the 13 pixels p80 through p92 forming the prediction taps, respectively, are arranged in the vertical direction or in the horizontal direction every other pixel, i.e., at regular intervals of two pixels. However, the intervals of the pixels forming the class taps or the prediction taps are not restricted to two pixels, and may be changed in accordance with the ratio of the number of pixels of the converted HD image to the number of pixels of the SD image before conversion, i.e., the interpolation factor, employed in the output phase converter 112.

It is now assumed, for example, that the output phase converter 112 converts the SD image so that the numbers of pixels in the horizontal and vertical directions are doubled. In this case, if class taps or prediction taps are formed of the pixels arranged at intervals of two pixels in the horizontal or vertical direction, as shown in FIG. 4 or 5, either of the interpolated pixels or the pixels that are not interpolated can form the class taps or the prediction taps. Thus, the precision of the prediction processing performed by the natural-image prediction unit 131 can be improved compared to that, for example, in the case where both the interpolated pixels and the pixels that are not interpolated form class taps or prediction taps, i.e., the class taps or the prediction taps could be arranged adjacent to each other.

Figure 6:
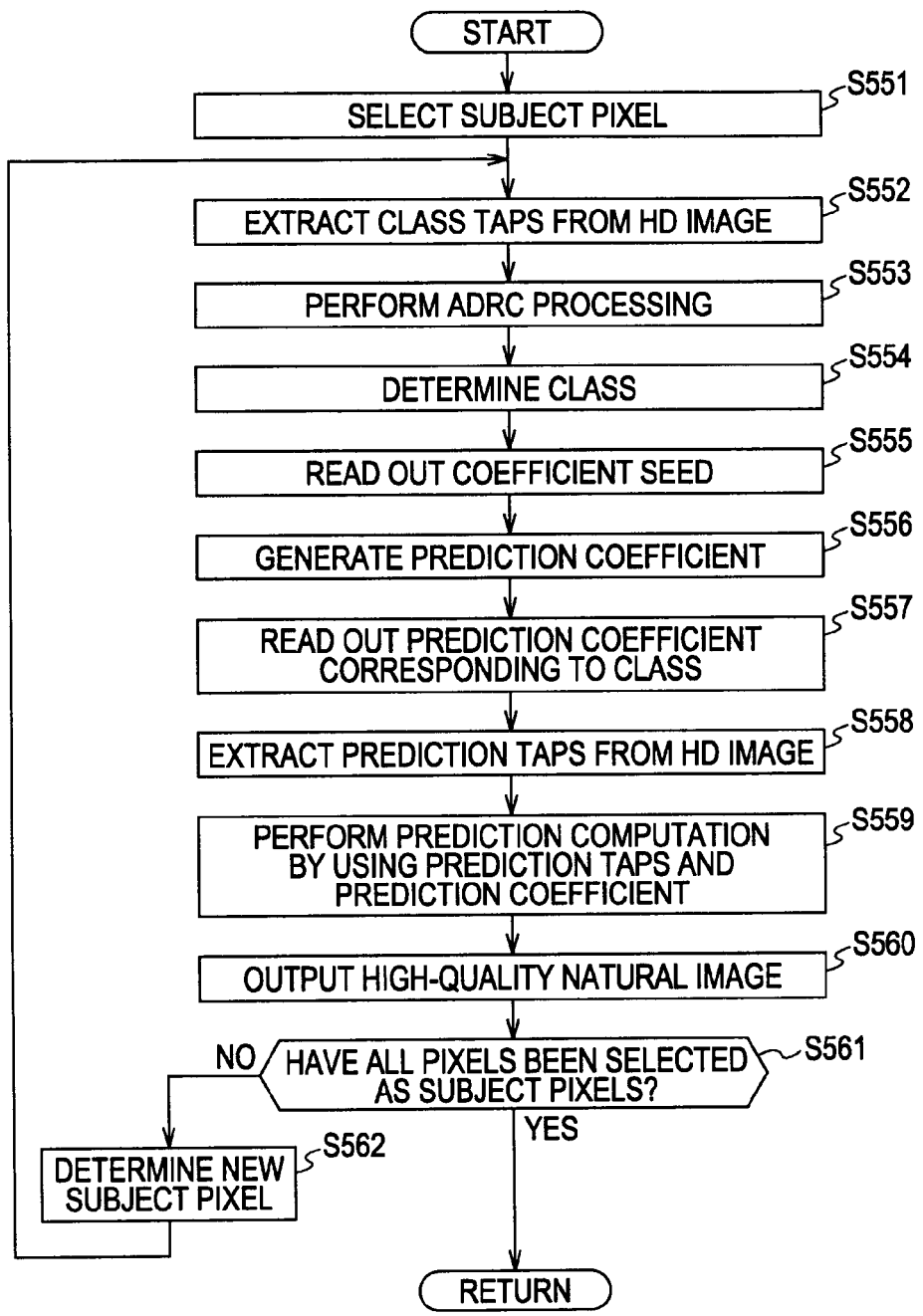
FIG. 6 is a flowchart illustrating details of natural-image prediction processing.

Details of the natural-image prediction processing in step S4 in FIG. 2 performed by the natural-image prediction unit 131 shown in FIG. 3 are discussed below with reference to FIG. 6.

In step S551, the class tap extracting portion 551 selects, as a subject pixel, one of the pixels forming the high-quality natural image determined from the HD image supplied from the output phase converter 112 shown in FIG. 1.

In step S552, the class tap extracting portion 551 then extracts, as class taps, some of the pixels forming the input HD image, such as those shown in FIG. 4, used for classifying the subject pixel selected in step S551, and supplies the extracted class taps to the ADRC processor 552.

In step S553, the ADRC processor 552 performs ADRC processing on the pixel values of the pixels forming the class taps supplied from the class tap extracting portion 551, and sets the resulting ADRC code as the feature of the class taps.

In step S554, the ADRC processor 552 determines the class based on the ADRC code to classify the subject pixel, and then supplies the determined class to the prediction coefficient memory 555.

In step S555, the prediction coefficient generator 554 reads out the corresponding coefficient seed from the coefficient seed memory 553.

In step S556, the prediction coefficient generator 554 generates the prediction coefficient from the coefficient seed read from the coefficient seed memory 553 by using the polynomial containing the parameters h and v input by the user, and supplies the generated prediction coefficient to the prediction coefficient memory 555. Details of the processing for generating a prediction coefficient from a coefficient seed are discussed below.

In step S557, the prediction coefficient memory 555 reads out the prediction coefficient on the basis of the class supplied from the ADRC processor 552, and supplies the read prediction coefficient to the prediction computation portion 557.

In step S558, the prediction tap extracting portion 556 extracts, as prediction taps, some of the pixels forming the input HD image, such as those shown in FIG. 5, used for predicting the pixel value of the subject pixel. The prediction tap extracting portion 556 supplies the extracted prediction taps to the prediction computation portion 557.

In step S559, the prediction computation portion 557 performs prediction computation, for example, linear expression computation, for determining the prediction value of the true value of the subject pixel by using the prediction taps supplied from the prediction tap extracting portion 556 and the prediction coefficient supplied from the prediction coefficient memory 555.

In step S560, the prediction computation portion 557 outputs the predicted pixel value of the subject pixel as a result of the prediction computation, i.e., the pixel value of the corresponding pixel forming the high-quality natural image, to the synthesizer 133.

In step S561, the class tap extracting portion 551 determines whether all the pixels forming the high-quality natural image determined from the input HD image have been selected as the subject pixels. If it is determined in step S561 that not all the pixels forming the high-quality natural image have been selected as the subject pixels, the process proceeds to step S562. In step S562, the class tap extracting portion 551 selects a pixel which has not been selected as the subject pixel, and returns to step S552. Steps S552 and the subsequent steps are then repeated. If it is determined in step S561 that all the pixels forming the high-quality natural image have been selected as the subject pixels, the natural-image prediction processing is completed.

As discussed above, the natural-image prediction unit 131 predicts a high-quality natural image from the HD image supplied from the output phase converter 112 and outputs the predicted high-quality natural image. That is, the natural-image prediction unit 131 converts the HD image into the high-quality natural image and outputs it.

As described above, in the image conversion device 101 shown in FIG. 1, the output phase converter 112 converts an SD image supplied from the cyclic converter 122 into an HD image, and then supplies the converted HD image to the natural-image prediction unit 131. Accordingly, the number of pixels forming the image after prediction is the same as that before prediction, and the positions of the pixels forming the image after prediction are not displaced from those of the pixels forming the image before prediction.

Accordingly, the natural-image prediction unit 131 can predict the pixel value of a subject pixel of the high-quality natural image by using the prediction taps formed of the pixels of the HD image which are in phase with the subject pixel. As a result, the natural-image prediction unit 131 can accurately predict the high-quality natural image to perform high-precision image conversion. That is, the output phase converter 112 and the natural-image prediction unit 131 can accurately convert an SD image supplied from the cyclic converter 122 into a high-quality natural image, which is a high-quality HD image having the number of pixels different from that of the SD image.

Additionally, the natural-image prediction unit 131 determines the feature of the waveform of the pixels forming the class taps, and then classifies the subject pixel by using the determined feature. Accordingly, the subject pixel can be suitably classified according to the feature of a natural image having relatively a small number of flat portions. As a result, the natural-image prediction unit 131 can enhance the quality of the natural image components contained in the HD image.

A description is now given of the prediction computation performed by the prediction computation portion 557 shown in FIG. 3 and learning for prediction coefficients used for the prediction computation.

It is now assumed that linear prediction computation is conducted as predetermined prediction computation for predicting the pixel value of a pixel forming a high-quality natural image (hereinafter such a pixel is sometimes referred to as a "high-quality natural image pixel") by using prediction taps extracted from an input HD image and a prediction coefficient. In this case, the pixel value y of the high-quality natural image pixel can be determined by the following linear expression:

$$y = \sum_{n=1}^{N} W_n x_n \tag{1}$$

where $x_n$ represents the pixel value of the n-th pixel of the HD image (hereinafter sometimes referred to as an "HD image pixel") forming the prediction taps for the high-quality natural image pixel having the pixel value y, and $W_n$ designates the n-th prediction coefficient to be multiplied by the n-th pixel value of the HD image. It should be noted that the prediction taps are formed of N HD image pixels $x_1, x_2, \ldots,$ and $x_n$ in equation (1).

The pixel value y of the high-quality natural image pixel may be determined from a higher-order expression instead of the linear expression represented by equation (1).

If the true value of the pixel value of the k-sample high-quality natural image pixel is represented by $y_k$ and the prediction value of the true value $y_k$ obtained by equation (1) is represented by $y_k'$, the prediction error $e_k$ can be expressed by the following equation.

$$e_k = y_k - y_k' \tag{2}$$

The prediction value $y_k'$ in equation (2) can be obtained by equation (1). Accordingly, if equation (1) is substituted into equation (2), the following equation can be found:

$$e_k = y_k - \left( \sum_{n=1}^{N} W_n x_{n,k} \right) \tag{3}$$

where $x_{n,k}$ designates the n-th HD image pixel forming the prediction taps for the k-sample high-quality natural image pixel.

The prediction coefficient $W_n$ that reduces the prediction error $e_k$ in equation (3) or (2) to 0 or statistically minimizes the prediction error $e_k$ is the optimal prediction coefficient $W_n$ for predicting the high-quality natural image pixel. Generally, however, it is difficult to obtain such a prediction coefficient $W_n$ for all high-quality natural image pixels.

If, for example, the method of least squares, is employed as the standard for representing that the prediction coefficient $W_n$ is optimal, the optimal prediction coefficient $W_n$ can be obtained by minimizing the total error E of square errors expressed by the following equation:

$$E = \sum_{k=1}^{K} e_k^2 \tag{4}$$

where K is the number of samples of sets of the true values $y_k$ of the pixel values of a high-quality image and the HD image pixels $x_{1,k}, x_{2,k}, \ldots, x_{N,k}$ forming the prediction taps for the true values $y_k$, i.e., the number of samples for conducting learning.

The minimum value of the total error E of the square errors in equation (4) can be given by the prediction coefficient $W_n$ that allows the value obtained by partially differentiating the total error E with respect to the prediction coefficient $W_n$ to be 0, as expressed by equation (5).

$$\frac{\partial E}{\partial W_n} = e_1 \frac{\partial e_1}{\partial W_n} + e_n \frac{\partial e_2}{\partial W_n} + \ldots + e_k \frac{\partial e_{k2}}{\partial W_n} = 0 \tag{5}$$

$$(n = 1, 2, \ldots, N)$$

Then, if equation (3) is partially differentiated with respect to the prediction coefficient $W_n$, the following equation can be found.

$$\frac{\partial e_k}{\partial W_1} = -x_{1,k}, \frac{\partial e_k}{\partial W_2} = -x_{2,k}, \ldots, \tag{6}$$

$$\frac{\partial e_k}{\partial W_N} = -x_{N,k}, (k = 1, 2, \ldots, K)$$

The following equation can be found from equations (5) and (6).

$$\sum_{k=1}^{K} e_k x_{1,k} = 0, \sum_{k=1}^{K} e_k x_{2,k} = 0, \ldots \sum_{k=1}^{K} e_k x_{N,k} = 0 \tag{7}$$

By substituting equation (3) into $e_k$ in equation (7), equation (7) can be represented by normal equations, as expressed by equation (8).

$$\begin{bmatrix} \left(\sum_{k=1}^{K} x_{1,k} x_{1,k}\right) & \left(\sum_{k=1}^{K} x_{1,k} x_{2,k}\right) & \cdots & \left(\sum_{k=1}^{K} x_{1,k} x_{N,k}\right) \\ \left(\sum_{k=1}^{K} x_{2,k} x_{1,k}\right) & \left(\sum_{k=1}^{K} x_{2,k} x_{2,k}\right) & \cdots & \left(\sum_{k=1}^{K} x_{2,k} x_{N,k}\right) \\ \vdots & \vdots & \ddots & \vdots \\ \left(\sum_{k=1}^{K} x_{N,k} x_{1,k}\right) & \left(\sum_{k=1}^{K} x_{N,k} x_{2,k}\right) & \cdots & \left(\sum_{k=1}^{K} x_{N,k} x_{N,k}\right) \end{bmatrix} \begin{bmatrix} W_1 \\ W_2 \\ \vdots \\ W_N \end{bmatrix} = \begin{bmatrix} \left(\sum_{k=1}^{K} x_{1,k} y_k\right) \\ \left(\sum_{k=1}^{K} x_{2,k} y_k\right) \\ \vdots \\ \left(\sum_{k=1}^{K} x_{N,k} y_k\right) \end{bmatrix} \quad (8)$$

The normal equations in equation (8) can be solved with respect to the prediction coefficient $W_n$ by using, for example, a sweeping-out method (Gauss-Jordan elimination method).

By solving the normal equations in equation (8) for each class, the optimal prediction coefficient $W_n$ that minimizes the total error E of the least squares can be found for each class.

Polynomials used for generating prediction coefficients by the prediction coefficient generator 554 shown in FIG. 3 and learning for coefficient seeds used for the polynomials are discussed below.

If, for example, a polynomial, is used as an expression for generating a prediction coefficient by using input parameters h and v and a coefficient seed, the prediction coefficient $W_n$ for each class and for each set of the parameters h and v can be found by the following equation:

$$W_n = w_{n,0} + w_{n,1}v + w_{n,2}h + w_{n,3}v^2 + \quad (9)$$
$$w_{n,4}vh + w_{n,5}h^2 + w_{n,6}v^3 + w_{n,7}v^2h + w_{n,8}vh^2 + w_{n,9}h^3$$

where $w_{n,k}$ (k=1, 2, . . . , 9) represents the k-th term coefficient among the coefficient seeds for generating the n-th prediction coefficient $W_n$ which is to be multiplied by the pixel value $x_n$ of the n-th pixel of the HD image, the n-th pixel of the HD image forming the prediction taps for the high-quality natural image pixel having the n-th pixel value y expressed by equation (1).

If the true value of the n-th prediction coefficient corresponding to the parameters h and v is represented by $W_{vhn}$ and if the estimation value of the true value $W_{vhn}$ obtained by equation (9) is indicated by $W_{vhn}'$, the estimation error $e_{vhn}$ can be expressed by the following equation.

$$e_{vhn} = W_{vhn} - W'_{vhn} \quad (10)$$

The estimation value $W_{vhn}'$ in equation (10) can be obtained by equation (9). Accordingly, if equation (9) is substituted into $W_{vhn}'$ in equation (10), the following equation can be found:

$$e_{vhn} = W_{vhn} - \sum_{k=0}^{9} w_{vhn,k} t_k \quad (11)$$

where $W_{vhn,k}$ represents the k-th term coefficient among the coefficient seeds for generating the prediction coefficient $W_{vhn}$. In equation (11), $t_k$ can be defined by the following equations.

$t_0 = 1$ $t_1 = v$ $t_2 = h$ $t_3 = v^2$ $t_4 = vh$ $t_5 = h^2$ $t_6 = v^3$ $t_7 = v^2 h$ $t_8 = vh^2$ $t_9 = h^3 \quad (12)$ The coefficient seed $w_{vhn,k}$ that reduces the prediction error $e_{vhn}$ in equation (10) or (11) to 0 or statistically minimizes the prediction error $e_{vhn}$ is the optimal coefficient seed for estimating the prediction coefficient. Generally, however, it is difficult to determine such a coefficient seed $w_{vhn,k}$ for all prediction coefficients.

If, for example, the method of least squares, is employed as the standard for representing that the coefficient seed $w_{vhn,k}$ is optimal, the optimal coefficient seed $w_{vhn,k}$ can be obtained by minimizing the total error E of square errors expressed by the following equation:

$$E = \sum_{v=1}^{V} \sum_{h=1}^{H} e_{vhn}^2 \quad (13)$$

where V indicates the number of parameters v and H represents the number of parameters h.

The minimum value of the total error E of the square errors in equation (13) can be given by the coefficient seed $w_{vhn,k}$ that allows the value obtained by partially differentiating the total error E with respect to the coefficient seed $w_{vhn,k}$ to be 0, as expressed by equation (14).

$$\frac{\partial E}{\partial W_{vhn,k}} = \sum_{v=1}^{V} \sum_{h=1}^{H} 2\left(\frac{\partial e_{vhn}}{\partial W_{vhn,k}}\right) e_{vhn} = -\sum_{v=1}^{V} \sum_{h=1}^{H} 2 t_K e_{vhn} = 0 \quad (14)$$

If $X_{kl}$ and $Y_k$ are defined by equations (15) and (16), respectively, equation (14) can be modified into normal equations expressed by equation (17).

$$X_{kl} = \sum_{v=1}^{V} \sum_{h=1}^{H} t_k t_l \quad (15)$$

$$Y_k = \sum_{v=1}^{V} \sum_{h=1}^{H} t_k W_{vhn} \quad (16)$$

$$\begin{bmatrix} X_{00} & X_{01} & \cdots & X_{09} \\ X_{10} & X_{11} & \cdots & X_{19} \\ \vdots & \vdots & \ddots & \vdots \\ X_{90} & X_{91} & \cdots & X_{99} \end{bmatrix} \begin{bmatrix} W_{n,0} \\ W_{n,i} \\ \vdots \\ W_{n,9} \end{bmatrix} = \begin{bmatrix} Y_0 \\ Y_1 \\ \vdots \\ Y_9 \end{bmatrix} \quad (17)$$

The normal equations expressed by equation (17) can be solved with respect to the coefficient seed $w_{n,k}$ by using, for example, a sweeping-out method (Gauss-Jordan elimination method).

By solving the normal equations in equation (17) for each class, the optimal coefficient seed $w_{n,k}$ that minimizes the total error E of the least squares can be found for each class.

Figure 7:
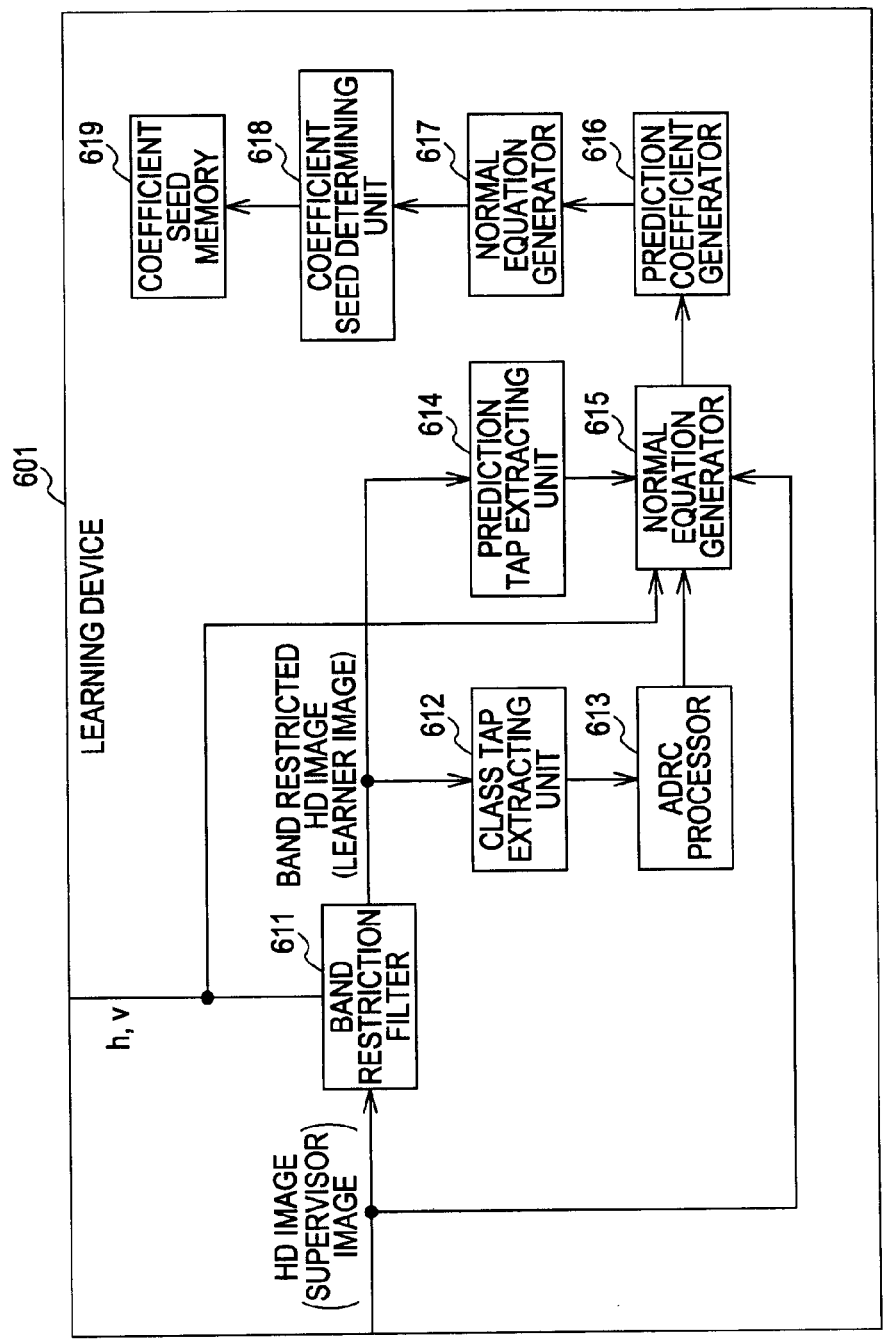
FIG. 7 is a block diagram illustrating the configuration of a learning device.

FIG. 7 is a block diagram illustrating the configuration of a learning device 601 that conducts learning for determining the coefficient seed $w_{n,k}$ for each class by establishing and solving the normal equations expressed by equation (17).

The learning device 601 shown in FIG. 7 includes a band restriction filter 611, a class tap extracting unit 612, an ADRC processor 613, a prediction tap extracting unit 614, a normal equation generator 615, a prediction coefficient generator 616, a normal equation generator 617, a coefficient seed determining unit 618, and a coefficient seed memory 619.

In the learning device 601, a plurality of supervisor images, which serve as target natural images after performing prediction processing, read from a database (not shown) are input into the band restriction filter 611 and the normal equation generator 615. Parameters h and v are also input from an external source to the band restriction filter 611 and the normal equation generator 615 in response to an instruction from a user. In the learning device 601, every time one supervisor image is input, all combinations of parameters h and v are input.

In response to the parameters h and v input from an external source, the band restriction filter 611 performs filtering processing for restricting the bands of a supervisor image obtained from a database (not shown) in the vertical direction and in the horizontal direction. Accordingly, a learner image corresponding to a natural image before performing prediction processing is generated for each combination of parameters h and v. If the number of parameters h and the number of parameters v are nine, the band restriction filter 611 generates 81 learner images from one supervisor image in accordance with the combinations of parameters h and v.

The band restriction filter 611 supplies the generated learner images to the class tap extracting unit 612 and the prediction tap extracting unit 614.

The configuration of the class tap extracting unit 612 is similar to that of the class tap extracting unit 551 shown in FIG. 3.

The class tap extracting unit 612 sequentially selects the pixels forming the supervisor image as subject supervisor pixels, and extracts class taps having the same tap structure, such as that shown in FIG. 4, as that of the class taps extracted by the class tap extracting unit 551 shown in FIG. 3. The class tap extracting unit 612 then supplies the class taps to the ADRC processor 613.

The ADRC processor 613 performs ADRC processing on the pixel values of the pixels forming the class taps supplied from the class tap extracting unit 612, and sets the resulting ADRC code as the feature of the class taps. The ADRC processor 613 determines the class based on the ADRC code and supplies the determined class to the normal equation generator 615.

The configuration of the prediction tap extracting unit 614 is similar to that of the prediction tap extracting unit 556 shown in FIG. 3. The prediction tap extracting unit 614 extracts, from a learner image supplied from the band restriction filter 611, as prediction taps, such as those shown in FIG. 5, some of the pixels forming the learner image used for predicting the pixel value of the subject supervisor pixel. The prediction tap extracting unit 614 supplies the prediction taps to the normal equation generator 615.

The normal equation generator 615 establishes the normal equations expressed by equation (8) for each class supplied from the ADRC processor 613 and for each combination of parameters h and v input from an external source by using the input supervisor image and a prediction tap supplied from the prediction tap extracting unit 614 as a learning pair used for learning the prediction coefficient $W_n$. The normal equation generator 615 then supplies the normal equations to the prediction coefficient generator 616.

The prediction coefficient generator 616 solves the normal equations for each class supplied from the normal equation generator 615 to determine the prediction coefficient $W_n$ that statistically minimizes the prediction error for each class and for each combination of parameters h and v. The prediction coefficient generator 616 then supplies the prediction coefficient $W_n$ to the normal equation generator 617.

The normal equation generator 617 generates normal equations expressed by equation (17) for each class based on the prediction coefficient $W_{vhn}$ supplied from the prediction coefficient generator 616, and outputs the generated normal equations to the coefficient seed determining unit 618. The coefficient seed determining unit 618 solves the normal equations expressed by equation (17) for each class to determine the coefficient seed $w_{n,k}$ for each class, and stores the coefficient seed $w_{n,k}$ in the coefficient seed memory 619. The coefficient seed stored in the coefficient seed memory 619 is to be stored in the coefficient seed memory 553 shown in FIG. 3.

The positional relationship between the supervisor image and the learner images is described below with reference to FIG. 8.

Figure 8:
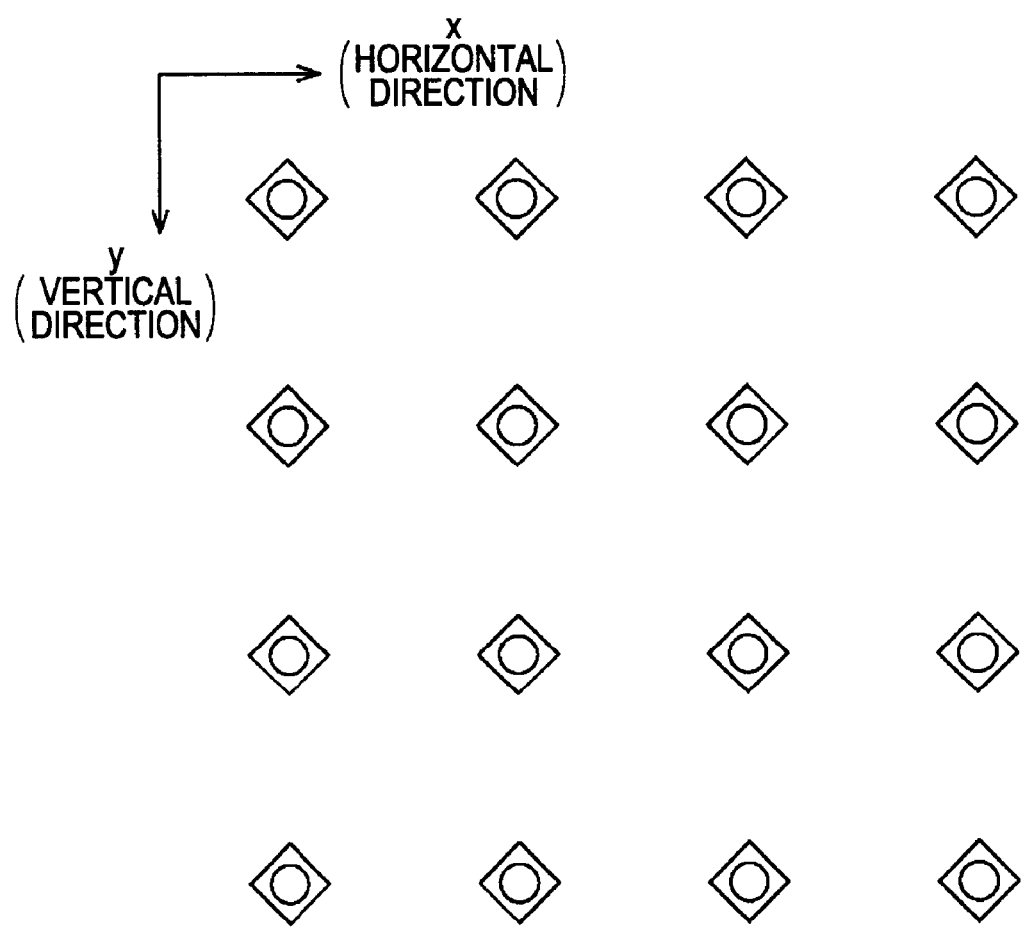
FIG. 8 illustrates the positional relationship between pixels of a supervisor image and pixels of a learner image.
Figure 9:
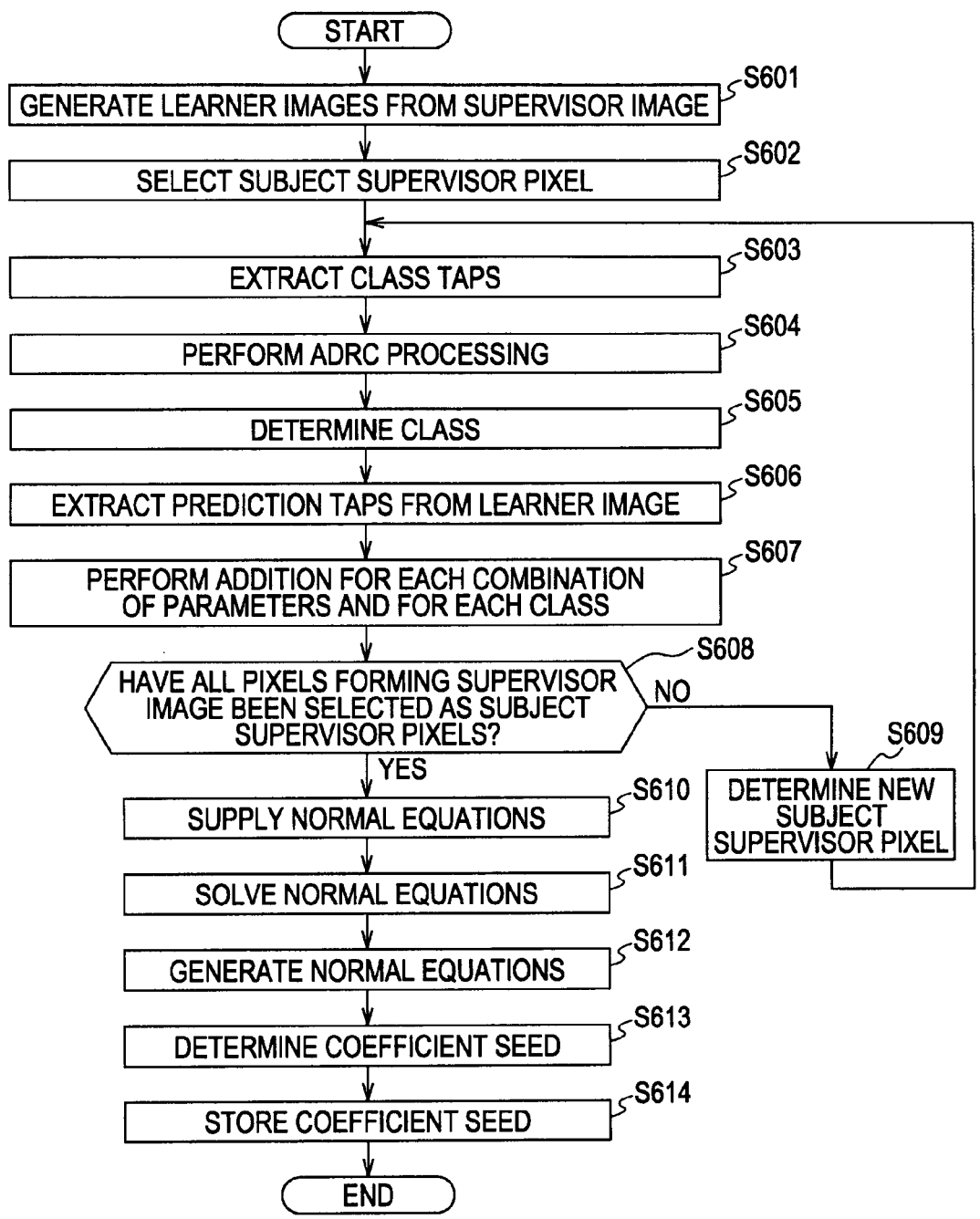
FIG. 9 is a flowchart illustrating an example of learning processing.

In FIG. 8, the rhomboids represent the pixels of a supervisor image, and the white circles represent the pixels of a learner image. In FIG. 8, the horizontal axis represents the horizontal position, while the vertical axis designates the vertical position.

The horizontal and vertical positions of the pixels of the supervisor image are the same as those of the learner image. That is, the supervisor image and the learner image are in phase with each other.

The learning processing performed by the learning device 601 shown in FIG. 7 is discussed below with reference to the flowchart in FIG. 9.

In step S601, in response to input parameters h and v, the band restriction filter 611 performs filtering processing for restricting the bands of an input supervisor image in the horizontal direction and in the vertical direction to generate learner images. The band restriction filter 611 then supplies the generated learner images to the class tap extracting unit 612 and the prediction tap extracting unit 614.

In step S602, as in the class tap extracting portion 551 shown in FIG. 3, the class tap extracting unit 612 selects one of the pixels forming the supervisor image as a subject supervisor pixel.

In step S603, as in the class tap extracting portion 551 shown in FIG. 3, the class tap extracting unit 612 extracts class taps, such as those shown in FIG. 4, from the learner image, and supplies the extracted class taps to the ADRC processor 613.

In step S604, the ADRC processor 613 performs ADRC processing on the pixel values of the pixels forming the class taps. In step S605, the ADRC processor 613 determines the class based on the ADRC code obtained as a result of the ADRC processing, and supplies the determined class to the normal equation generator 615.

In step S606, as in the prediction tap extracting portion 556 shown in FIG. 3, the prediction tap extracting unit 614 extracts prediction taps, such as those shown in FIG. 5, for the subject supervisor pixel from the learner image supplied from the band restriction filter 611, and supplies the prediction taps to the normal equation generator 615.

In step S607, the normal equation generator 615 extracts the subject supervisor pixel from the input supervisor image, and performs addition in equation (8) on the subject supervisor pixel and the learner image forming the prediction taps for the subject supervisor pixel supplied from the prediction tap extracting unit 614 for each combination of parameters h and v and for each class supplied from the ADRC processor 613.

In step S608, the class tap extracting unit 612 determines whether all the pixels forming the input supervisor image have been selected as subject supervisor pixels. If it is determined in step S608 that not all the pixels forming the supervisor image have been selected, the process proceeds to step S609. In step S609, the class tap extracting unit 612 selects a pixel that has not been selected as a subject supervisor pixel. Then, the process returns to step S603, and step S603 and the subsequent steps are repeated.

If it is determined in step S608 that all the pixels forming the supervisor image have been selected as the subject supervisor pixels, the process proceeds to step S610. In step S610, the normal equation generator 615 supplies, as normal equations, a matrix on the left side and the vector on the right side in equation (8) for each combination of parameters h and v and for each class to the prediction coefficient generator 616.

In step S611, the prediction coefficient generator 616 solves the normal equations in equation (8) for each combination of parameters h and v and for each class supplied from the normal equation generator 615 to determine the prediction coefficient $W_{vhn}$ for each combination of parameters h and v and for each class. The prediction coefficient generator 616 outputs the determined prediction coefficient $W_{vhn}$ to the normal equation generator 617.

In step S612, the normal equation generator 617 generates normal equations in equation (17) for each class on the basis of the prediction coefficient $W_{vhn}$, and outputs the generated normal equations to the coefficient seed determining unit 618.

In step S613, the coefficient seed determining unit 618 solves the normal equations in equation (17) to determine the coefficient seed $w_{n,k}$ for each class. In step S614, the coefficient seed $w_{n,k}$ is stored in the coefficient seed memory 619. The coefficient seed $w_{n,k}$ is to be stored in the coefficient seed memory 553 shown in FIG. 3.

As described above, the natural-image prediction unit 131 predicts a high-quality natural image by using the prediction coefficient $w_n$ generated from the coefficient seed which is obtained by conducting learning using a natural image. It is thus possible to enhance the quality of natural image components contained in an HD image supplied from the output phase converter 112.

Additionally, the natural-image prediction unit 131 classifies subject pixels in accordance with the feature of the waveforms of class taps. With this arrangement, the subject pixels of a natural image can be accurately classified. The natural-image prediction unit 131 can predict a high-quality natural image from the HD image by using a prediction coefficient generated from a coefficient seed obtained by conducting learning for each class. Accordingly, the natural-image prediction unit 131 can suppress noise contained in the natural image with higher precision and thus outputs a higher-quality natural image.

Figure 10:
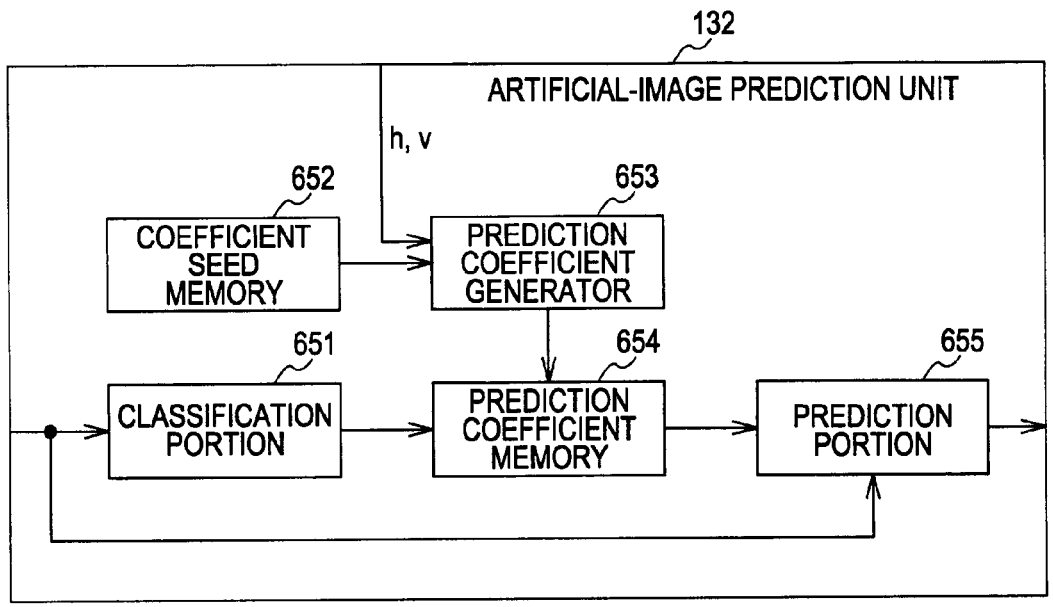
FIG. 10 is a block diagram illustrating the configuration of an artificial-image prediction unit.

FIG. 10 is a block diagram illustrating the configuration of the artificial-image prediction unit 132 shown in FIG. 1.

The artificial-image prediction unit 132 includes a classification portion 651, a coefficient seed memory 652, a prediction coefficient generator 653, and a prediction coefficient memory 654, and a prediction portion 655. The artificial-image prediction unit 132 predicts a high-quality artificial image after eliminating noise from artificial image components contained in a progressive HD image supplied from the output phase converter 112.

The HD image supplied from the output phase converter 112 is input into the classification portion 651 and the prediction portion 655. The classification portion 651 sequentially selects the pixels forming the high-quality artificial image determined from the HD image as subject pixels, and allocates the subject pixels into some classes in accordance with the feature of the phase of the HD image. The classification portion 651 then supplies the classes to the prediction coefficient memory 654.

The coefficient seed memory 652 is formed of, for example, a read only memory (ROM), and stores a coefficient seed obtained by conducting learning, which is discussed below with reference to FIGS. 17 through 19, for each class.

The prediction coefficient generator 653 generates the prediction coefficient $W_n$ from the coefficient seed $w_{n,k}$ read from the coefficient seed memory 652 by using the polynomial expressed by equation (9) containing the parameters h and v input from the user, and stores the generated prediction coefficient $W_n$ in the prediction coefficient memory 654.

The prediction coefficient memory 654 reads out the prediction coefficient $W_n$ based on the class supplied from the classification portion 651, and supplies the prediction coefficient $W_n$ for that class to the prediction portion 655.

The prediction portion 655 performs predetermined prediction computation for determining the prediction value of the true value of the subject pixel by using the HD image and the prediction coefficient $W_n$ supplied from the prediction coefficient memory 654. Accordingly, the prediction portion 655 predicts the pixel value of the subject pixel, i.e., the pixel value of the subject pixel forming the high-quality artificial image, and outputs the predicted pixel value to the synthesizer 133 shown in FIG. 1.

Figure 11:
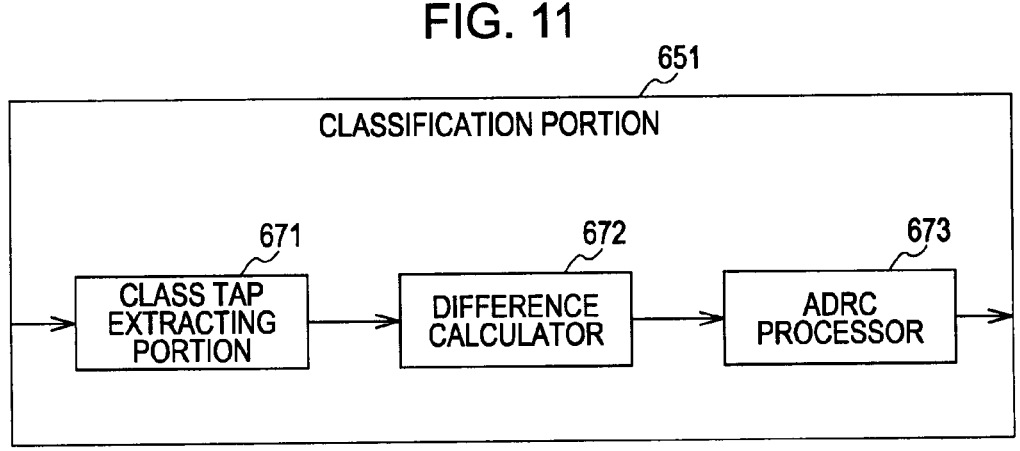
FIG. 11 is a block diagram illustrating the detailed configuration of a classification portion.

FIG. 11 is a block diagram illustrating the detailed configuration of the classification portion 651.

The classification portion 651 shown in FIG. 11 includes a class tap extracting portion 671, a difference calculator 672, and an ADRC processor 673.

The class tap extracting portion 671 extracts, as class taps, some of the pixels forming the HD image for classifying the subject pixel, and supplies the class taps to the difference calculator 672.

Among the pixels forming the class taps supplied from the class tap extracting portion 671, the difference calculator 672 calculates, as the feature of the phase of the class taps, the absolute value of the difference of the pixel values of two adjacent pixels (hereinafter simply referred to as "adjacent pixels") for each set of adjacent pixels. Such an absolute value is hereinafter referred to as the "adjacent difference absolute value". The difference calculator 672 supplies the adjacent difference absolute value of each set of adjacent pixels to the ADRC processor 673.

The ADRC processor 673 performs one-bit ADRC processing on the adjacent difference absolute values supplied from the difference calculator 672. More specifically, the ADRC processor 673 divides the adjacent difference absolute values of the class taps by the average of the maximum value MAX and the minimum value MIN to re-quantize each adjacent different absolute value into one bit with the decimal fractions omitted. That is, the ADRC processor 673 binarizes the adjacent difference absolute values.

The ADRC processor 673 arranges the one-bit pixel values in a predetermined order, resulting in a bit string, which is determined as the class of the subject pixel. Accordingly, the class serves as phase information concerning the positions of edges in the class taps. That is, the class represents the value degenerated from the phase of the class taps. The ADRC processor 673 supplies the determined class to the prediction coefficient memory 654 shown in FIG. 10.

In this manner, the classification portion 651 classifies the subject pixel in accordance with the feature of the phase of the class taps obtained from the adjacent difference absolute value of each set of adjacent pixels.

Figure 12:
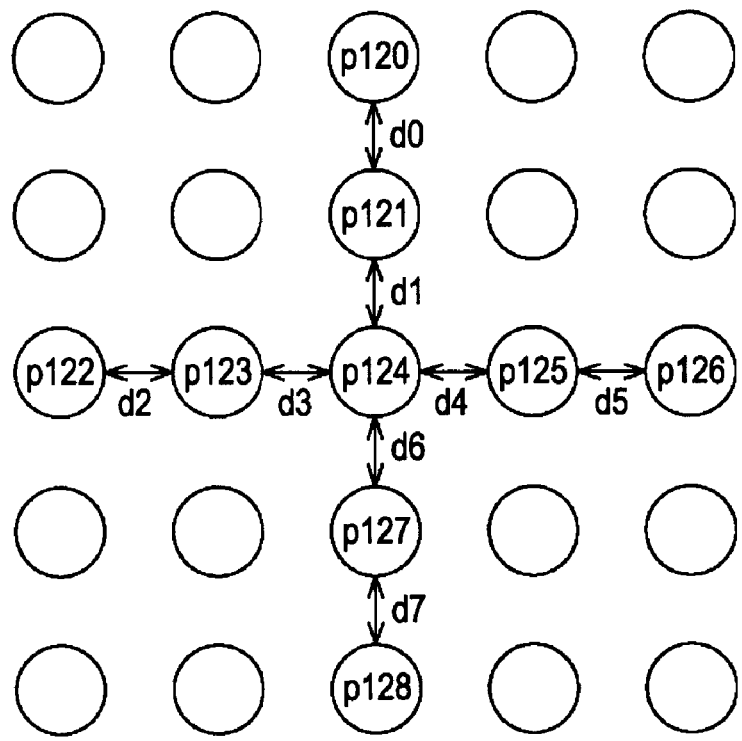
FIG. 12 illustrates another example of the tap structure of class taps.

FIG. 12 illustrates an example of the tap structure of the class taps extracted by the class tap extracting portion 671 shown in FIG. 11. However, this is an example only, and the tap structure of the class taps may be different from that shown in FIG. 12.

In FIG. 12, among an HD image supplied from the output phase converter 112 shown in FIG. 1, nine pixels including a pixel p124 corresponding to a subject pixel and two pixels adjacent to the pixel p124 in each of the upward, leftward, rightward, and downward directions, i.e., pixels p120, p121, p122, p123, p125, p126, p127, and p128, are disposed. That is, a so-called "cross-shaped class tap" structure is formed.

The difference calculator 672 shown in FIG. 11 calculates eight adjacent difference absolute values d0 through d7 between pixels p120 and p121, pixels p121 and p124, pixels p122 and p123, pixels p123 and p124, pixels p124 and p125, pixels p125 and p126, p124 and p127, and p127 and p128, respectively, and supplies the calculated adjacent difference absolute values d0 through d7 to the ADRC processor 673. As a result, the 8-bit class is output from the ADRC processor 673.

Figure 13:
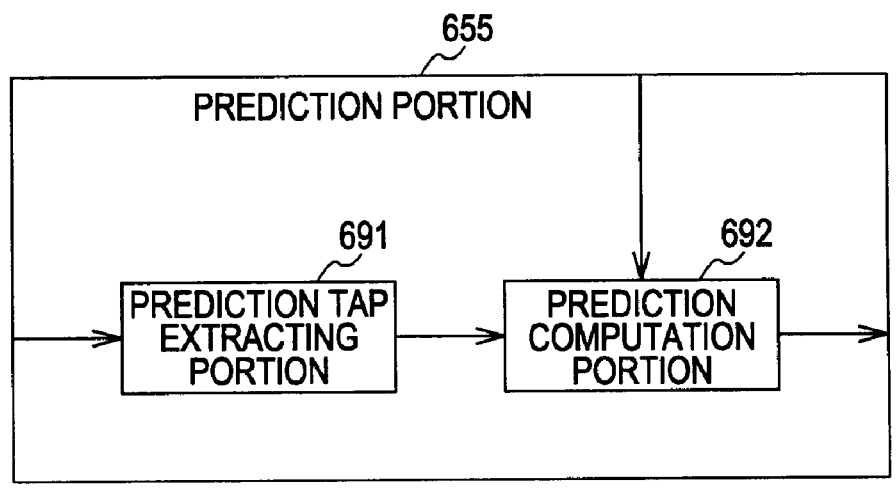
FIG. 13 is a block diagram illustrating the detailed configuration of a prediction portion.

FIG. 13 is a block diagram illustrating the detailed configuration of the prediction portion 655 shown in FIG. 10.

The prediction portion 655 shown in FIG. 13 includes a prediction tap extracting portion 691 and a prediction computation portion 692.

The prediction tap extracting portion 691 extracts, as prediction taps, some of the pixels forming the HD image used for predicting the pixel value of a subject pixel.

More specifically, the prediction tap extracting portion 691 extracts, from the HD image, as prediction taps, pixels corresponding to the subject pixel, for example, a plurality of pixels of the HD image spatially closer to the subject pixel. The prediction tap extracting portion 691 supplies the extracted prediction taps to the prediction computation portion 692.

The prediction taps and the class taps may have the same tap structure or different tap structures.

The prediction computation portion 692 receives, not only the prediction taps from the prediction tap extracting portion 691, but also the prediction coefficient from the prediction coefficient memory 654 shown in FIG. 10. The prediction computation portion 692 performs prediction computation expressed by equation (1) to determine the prediction value of the true value of the subject pixel by using the prediction taps and the prediction coefficient. Accordingly, the prediction computation portion 692 predicts pixel value of the subject pixel, i.e., the pixel value of the subject pixel forming the high-quality artificial image, and outputs the predicted pixel value to the synthesizer 133 shown in FIG. 1.

Figure 14:
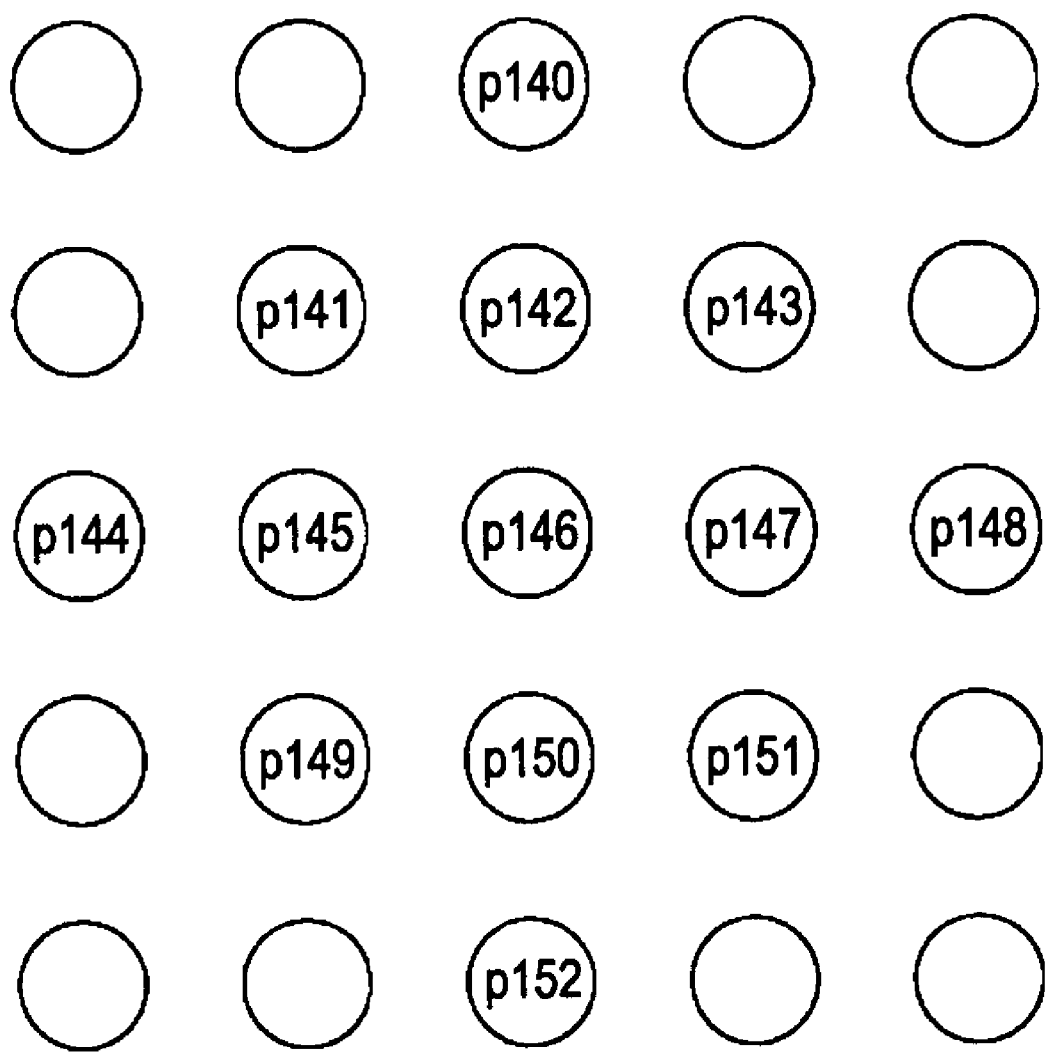
FIG. 14 illustrates another example of the tap structure of prediction taps.

FIG. 14 illustrates an example of the tap structure of the prediction taps extracted by the prediction tap extracting portion 691 shown in FIG. 13. However, this is an example only, and the tap structure of the prediction taps may be different from that shown in FIG. 14.

In FIG. 14, the prediction taps are formed of 13 pixels. More specifically, in FIG. 14, among the HD image supplied from the output phase converter 112, five pixels p140, p142, p146, p150, and p152 vertically arranged around pixel p146 corresponding to the subject pixel, three pixels p141, p145, and p149 vertically arranged around p145, which is left-adjacent to pixel p146, three pixels p143, p147, and p151 vertically arranged around p147, which is right-adjacent to pixel p146, and two pixels p144 and p148 away from pixel p146 in the left and right directions by two pixels, are disposed. That is, a generally rhomboid prediction tap structure is formed.

Details of the artificial-image prediction processing in step S5 in FIG. 2 performed by the artificial-image prediction unit 132 shown in FIG. 10 are discussed below.

In step S701, the classification portion 651 performs classification processing for classifying a predetermined subject pixel of the pixels forming a high-quality artificial image in accordance with the feature of the phase of the HD image corresponding to the subject pixel. Details of the classification processing are discussed below with reference to FIG. 16.

In step S702, the coefficient seed memory 652 reads out the coefficient seed $w_{n,k}$ and outputs it to the prediction coefficient generator 653. In step S703, the prediction coefficient generator 653 generates the prediction coefficient $W_n$ from the coefficient seed $w_{n,k}$ on the basis of the parameters h and v input from the user by using the polynomial expressed by equation (9) containing the parameters h and v, and supplies the generated prediction coefficient $W_n$ to the prediction coefficient memory 654.

In step S704, the prediction coefficient memory 654 reads out the prediction coefficient $W_n$ based on the class determined by the classification portion 651, and supplies the read prediction coefficient $W_n$ to the prediction computation portion 692 of the prediction portion 655.

In step S705, the prediction tap extracting portion 691 extracts, from the HD image supplied from the output phase converter 112, as prediction taps, such as those shown in FIG. 14, some of the pixels forming the HD image used for predicting the pixel value of the subject pixel, and supplies the extracted prediction taps to the prediction computation portion 692.

In step S706, the prediction computation portion 692 performs prediction computation expressed by equation (1) by using the prediction taps supplied from the prediction tap extracting portion 691 and the prediction coefficient $W_n$ supplied from the prediction coefficient memory 654 to determine the pixel value of the subject pixel forming the high-quality artificial image. In step S707, the prediction computation portion 692 outputs the pixel value of the subject pixel forming the high-quality artificial image determined in step S706 to the synthesizer 133 shown in FIG. 1.

In step S708, the classification portion 651 determines whether all the pixels forming the high-quality artificial image have been selected as the subject pixels. If it is determined in step S708 that not all the pixels have been selected, the process proceeds to step S709. In step S709, the classification portion 651 determines a pixel that has not been selected as the next subject pixel and then returns to step S701. Steps S701 and the subsequent steps are repeated.

If the classification portion 651 determines in step S708 that all the pixels forming the high-quality artificial image have been selected as the subject pixels, the artificial-image prediction processing is completed.

As discussed above, the artificial-image prediction unit 132 predicts a high-quality artificial image from an HD image supplied from the output phase converter 112, and outputs the predicted image. That is, the artificial-image prediction unit 132 converts an HD image into a high-quality artificial image and outputs it.

Figure 15:
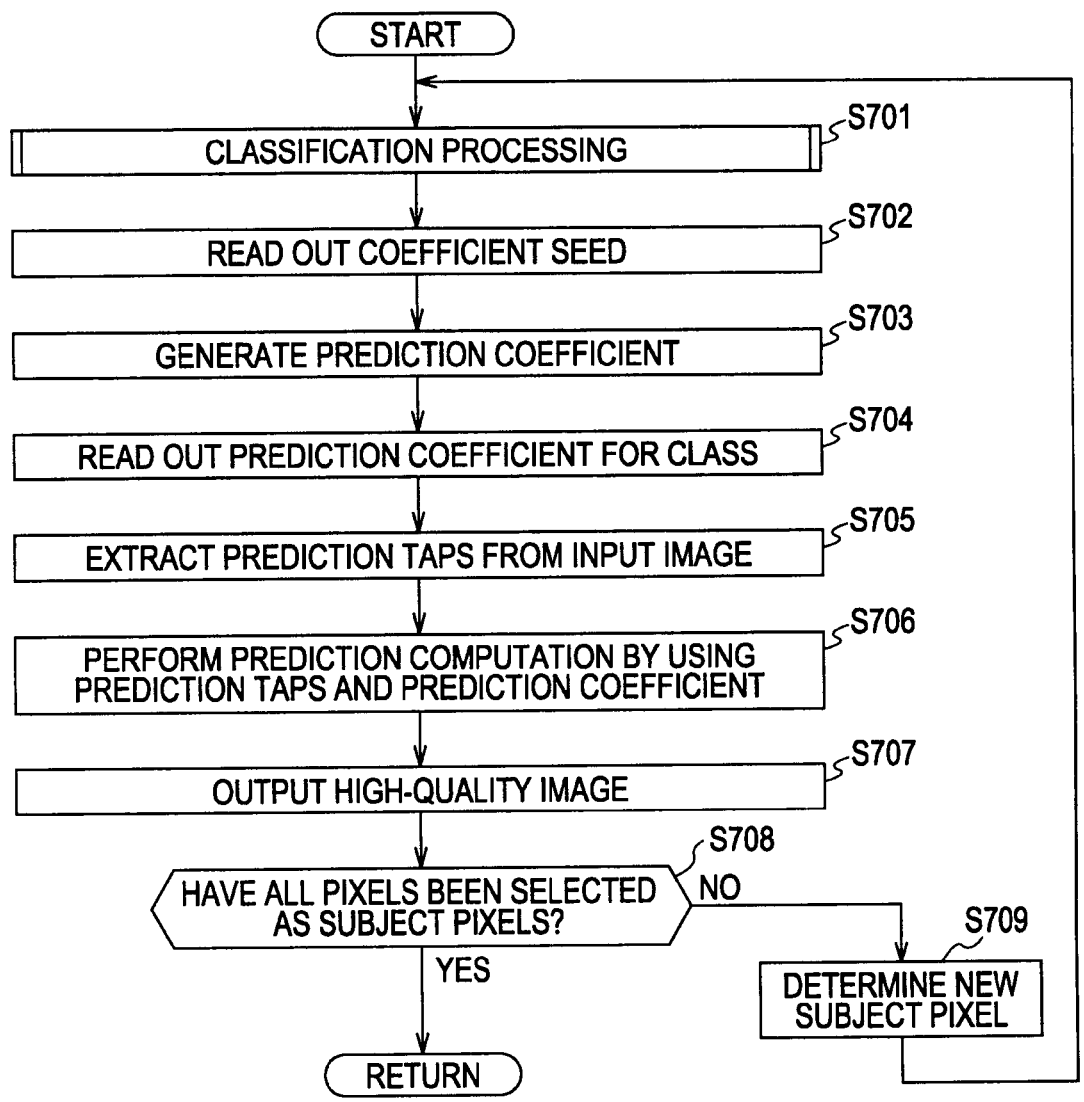
FIG. 15 is a flowchart illustrating artificial-image prediction processing.

Details of the classification processing in step S701 in FIG. 15 are discussed below with reference to the flowchart in FIG. 16.

In step S721, the class tap extracting portion 671 shown in FIG. 11 of the classification portion 651 extracts, as class taps, such as those shown in FIG. 12, some of the pixels forming the HD image used for classifying the subject pixel, and supplies the extracted class taps to the difference calculator 672.

In step S722, the difference calculator 672 calculates, among the pixels forming the class taps supplied from the class tap extracting portion 671, the adjacent difference absolute value of each set of adjacent pixels, and supplies the calculated adjacent difference absolute values to the ADRC processor 673.

In step S723, the ADRC processor 673 performs one-bit ADRC processing on the adjacent difference absolute values supplied from the difference calculator 672. The ADRC processor 673 then determines the resulting ADRC bit string as the class to classify the subject pixel. The ADRC processor 673 then supplies the determined class to the prediction coefficient memory 654 shown in FIG. 10. The process then returns to step S701 in FIG. 15.

Figure 17:
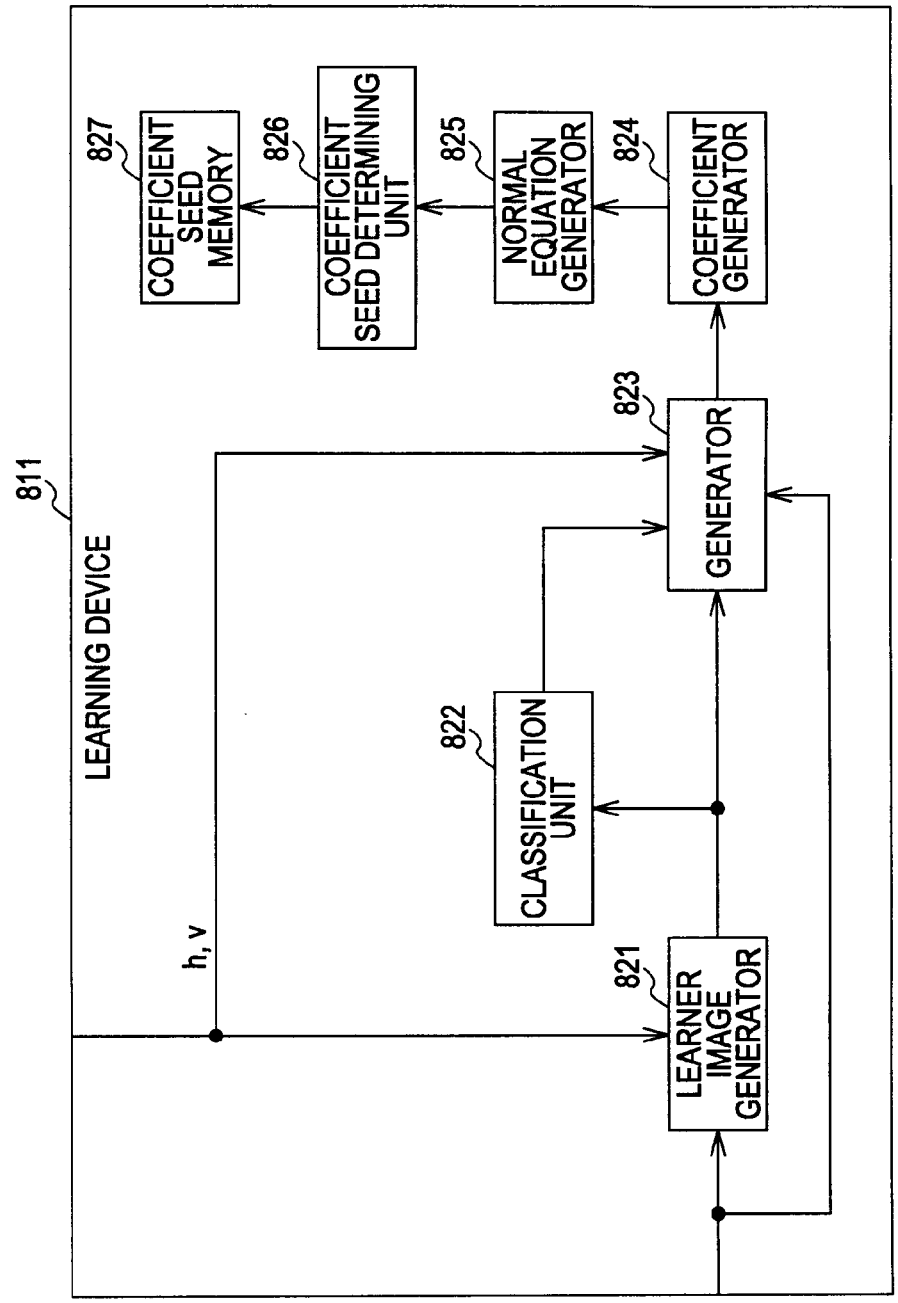
FIG. 17 is a block diagram illustrating the configuration of another learning device.

FIG. 17 is a block diagram illustrating the configuration of a learning device 811 that conducts learning for determining coefficient seeds to be stored in the coefficient memory 652 shown in FIG. 10.

The learning device 811 shown in FIG. 17 includes a learner image generator 821, a classification unit 822, a generator 823, a coefficient generator 824, a normal equation generator 825, a coefficient seed determining unit 826, and a coefficient seed memory 827.

The learning device 811 conducts learning for coefficient seeds in a manner similar to learning conducted for the coefficient seed $w_{n,k}$ stored in the coefficient seed memory 553 (FIG. 3) of the natural-image prediction unit 131. More specifically, by using, as a supervisor image, an HD image corresponding to a target artificial image after performing prediction processing, and by using, as a learner image, an HD image corresponding to an artificial image before performing prediction processing, the learning device 811 solves the normal equations expressed by equation (8) for each class and for each combination of externally input parameters h and v which are externally input in response to an instruction from the user. As a result, the learning device 811 can determine the prediction coefficient $W_{vhn}$, which is the prediction coefficient $W_n$ for each class and for each combination of parameters h and v.

Then, the learning device 811 solves the normal equations expressed by equation (17) generated for each class based on the prediction coefficient $W_{vhn}$, thereby generating the coefficient seed $w_{n,k}$ for each class. The learning device 811 then stores the coefficient seed $w_{n,k}$.

A plurality of supervisor images read from a database (not shown) are input into the learning device 811 and are supplied to the learner image generator 821 and the generator 823. Parameters h and v are also input into the learning device 811 and are supplied to the learner image generator 821 and the generator 823.

The learner image generator 821 is formed of, for example, a low-pass filter. The learner image generator 821 decreases the quality of a supervisor image, which is an artificial image, obtained from a database (not shown) in accordance with the parameters h and v, thereby generating a learner image for each combination of parameters h and v. The learner image generator 821 supplies the generated learner image to the classification unit 822 and the generator 823.

The configuration of the classification unit 822 is similar to that of the classification portion 651 shown in FIG. 11 of the artificial-image prediction unit 132. The classification unit 822 sequentially selects the pixels forming the supervisor image as the subject supervisor pixels, and extracts, from the learner image, class taps having the same tap structure as the class taps (FIG. 12) extracted by the class tap extracting portion 671 shown in FIG. 11 for each subject supervisor pixel.

The classification unit 822 calculates the adjacent difference absolute value of each set of adjacent pixels among the pixels forming the class taps, and performs one-bit ADRC processing on the adjacent difference absolute values. The classification unit 822 determines the resulting bit string as the class of the subject supervisor pixel, and supplies the determined class to the generator 823.

The generator 823 establishes the normal equations expressed by equation (8) for each combination of externally input parameters h and v and for each class supplied from the classification unit 822 by using learning pairs, and supplies the normal equations to the coefficient generator 824. The learning pairs are formed of a supervisor image and the learner images supplied from the learner image generator 821 and are used for learning prediction coefficients.

The coefficient generator 824 solves the normal equations supplied from the generator 823 for each combination of parameters h and v and for each class to determine the prediction coefficient $W_{vhn}$ for each combination of parameters h and v and for each class, and outputs the prediction coefficient $W_{vhn}$ to the normal equation generator 825.

The normal equation generator 825 generates normal equations expressed by equation (17) for each class based on the prediction coefficient $W_{vhn}$, and outputs the generated normal equations to the coefficient seed determining unit 826. The coefficient seed determining unit 826 solves the normal equations to determine the coefficient seed $w_{n,k}$ and stores it in the coefficient seed memory 827. The coefficient seed $w_{n,k}$ stored in the coefficient seed memory 827 is to be stored in the coefficient seed memory 652 shown in FIG. 10.

Figure 18:
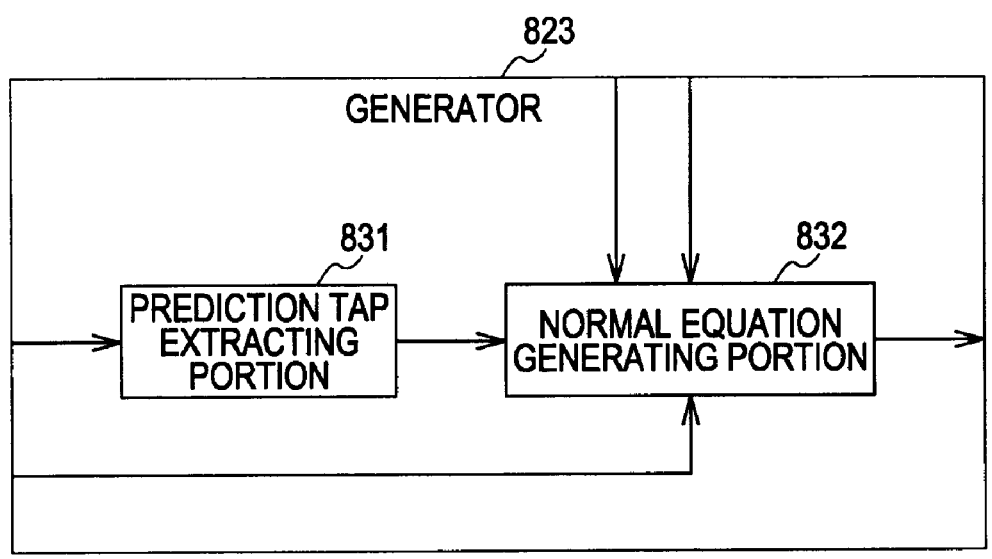
FIG. 18 is a block diagram illustrating the detailed configuration of a generator.
Figure 19:
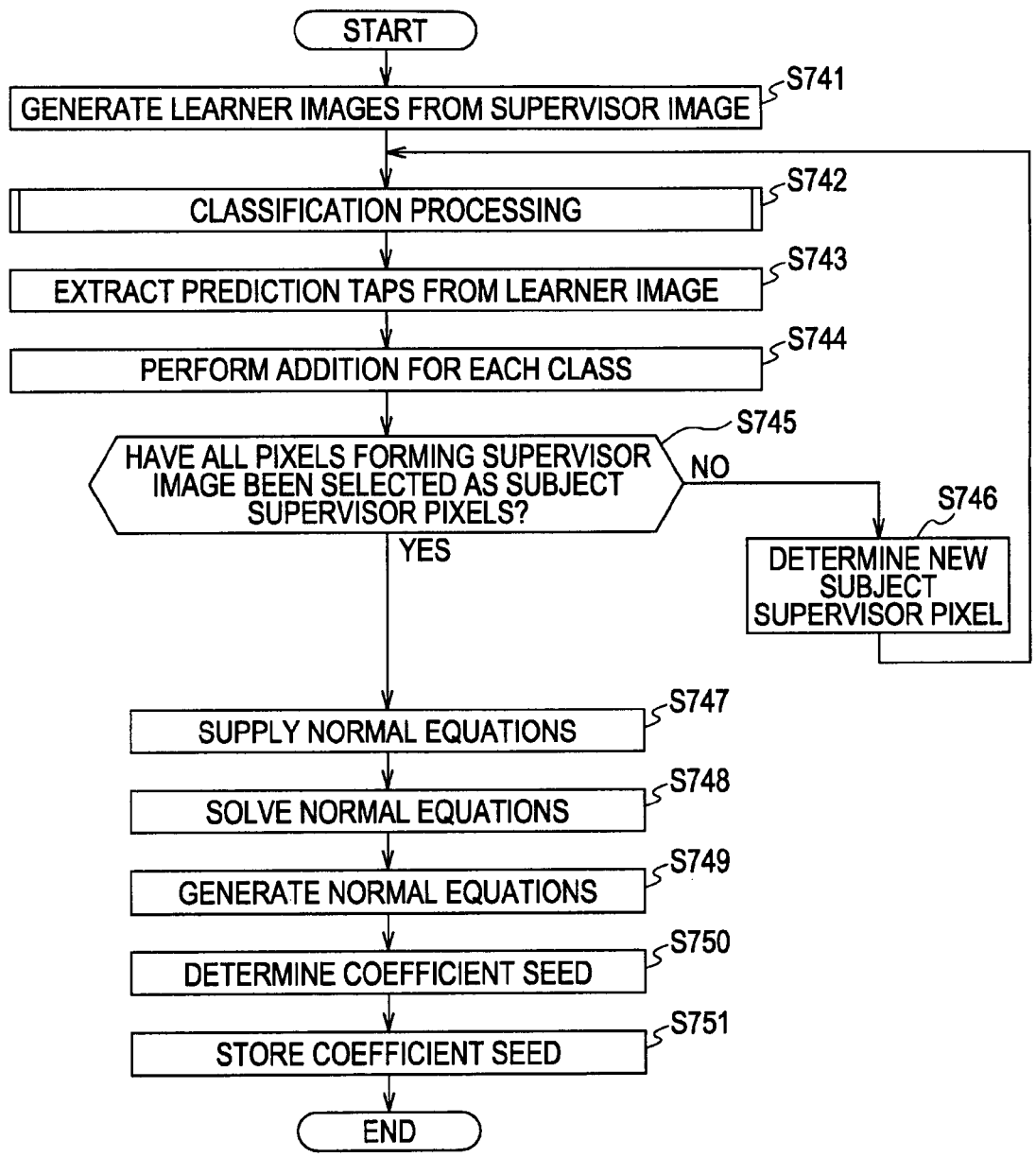
FIG. 19 is a flowchart illustrating another example of learning processing.

FIG. 18 is a block diagram illustrating the detailed configuration of the generator 823 shown in FIG. 17.

The generator 823 shown in FIG. 18 includes a prediction tap extracting portion 831 and a normal equation generating portion 832.

The learner image and the supervisor image of a learning pair input into the generator 823 are supplied to the prediction tap extracting portion 831 and the normal equation generating portion 832, respectively.

The prediction tap extracting portion 831 sequentially selects the pixels forming the supervisor image of the learning pair as the subject supervisor pixels. The prediction tap extracting portion 831 then extracts, from the learner image of the learning pair, prediction taps having the same tap structure as the prediction taps (FIG. 14) extracted by the prediction tap extracting portion 691 shown in FIG. 13, and supplies the prediction taps to the normal equation generating portion 832.

The normal equation generating portion 832 extracts the subject supervisor pixel from the supervisor image, and performs addition processing on the subject supervisor pixel and the learner image forming the prediction taps extracted for the subject supervisor pixel for each combination of externally input parameters h and v and for each class supplied from the classification unit 822.

The normal equation generating portion 832 performs the above-described addition processing by setting all the pixels forming the supervisor image input into the learning device 811 as the subject supervisor pixels to establish the normal equations expressed by equation (8) for each class, and then supplies the normal equations to the coefficient generator 824 shown in FIG. 17.

The learning processing performed by the learning device 811 shown in FIG. 17 is described below with reference to the flowchart in FIG. 19.

In step S741, the learner image generator 821 generates learner images from an input supervisor image in accordance with externally input parameters h and v, and supplies the generated learner images to the classification unit 822 and the generator 823.

Figure 16:
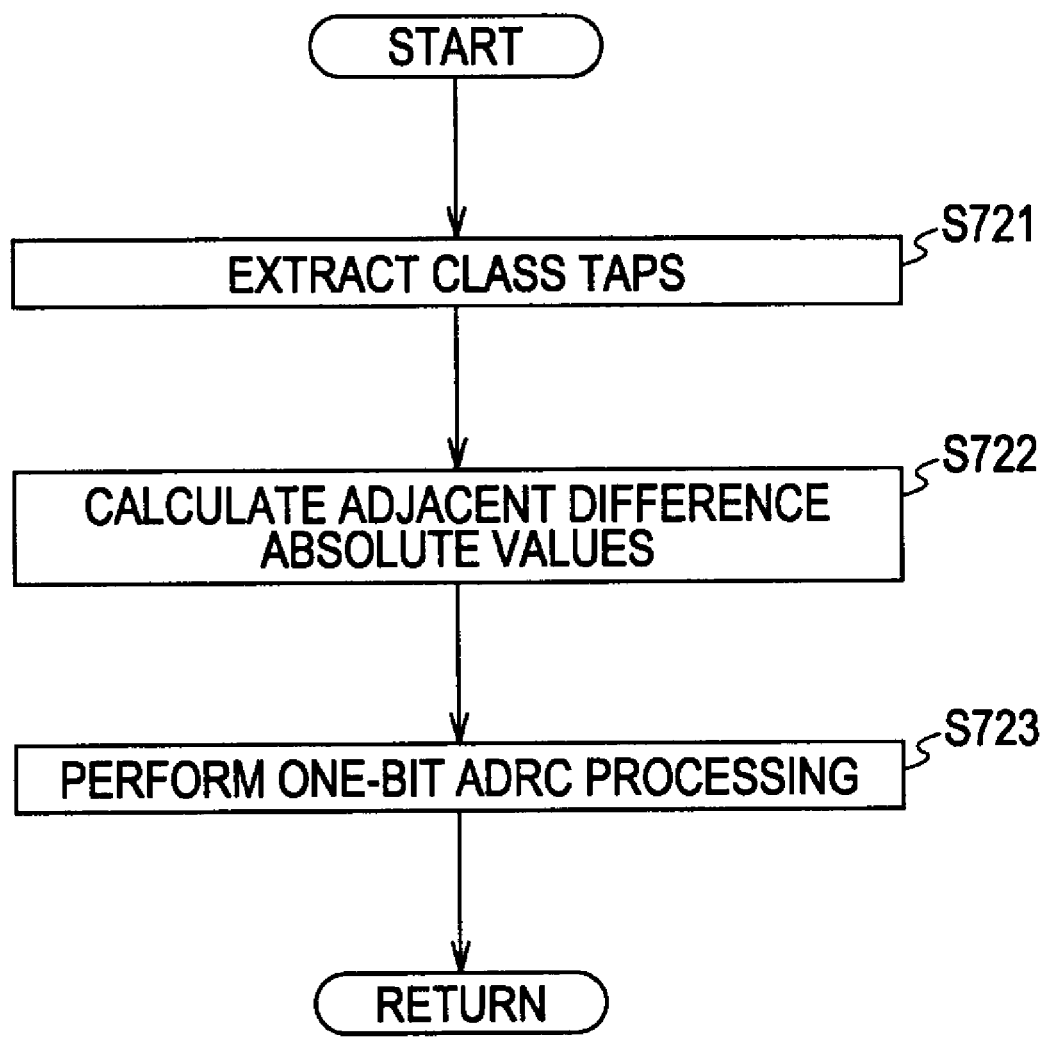
FIG. 16 is a flowchart illustrating classification processing.

In step S742, the classification unit 822 performs classification processing, as in the classification processing shown in FIG. 16, for classifying a predetermined subject supervisor pixel of the supervisor image in accordance with the phase of the learner image associated with the subject supervisor pixel. The classification unit 822 supplies the determined class to the normal equation generating portion 832 (FIG. 18) of the generator 823.

In step S743, the prediction tap extracting portion 831 shown in FIG. 18 extracts prediction taps for the subject supervisor pixel from the learner image supplied from the learner image generator 821, and supplies the extracted prediction taps to the normal equation generating portion 832.

In step S744, the normal equation generating portion 832 extracts the subject supervisor pixel from the input supervisor image, and performs addition processing expressed by equation (8) on the subject supervisor pixel and the learner image forming the associated prediction taps supplied from the prediction tap extracting portion 831 for each combination of parameters h and v and for each class supplied from the classification unit 822.

In step S745, the classification unit 822 determines whether all the pixels forming the supervisor image have been selected as the subject supervisor pixels. If it is determined in step S745 that not all the pixels have been selected as the subject supervisor pixels, the process proceeds to step S746. In step S746, the classification unit 822 selects a pixel of the supervisor image which has not been selected as the next subject supervisor pixel, and then returns to step S742. Steps S742 and the subsequent steps are repeated.

If it is determined in step S745 that all the pixels forming the supervisor image have been selected as the subject supervisor pixels, the process proceeds to step S747. In step S747, the normal equation generating portion 832 supplies the matrix on the left side and the vector on the right side in equation (8) for each combination of parameters h and v and for each class to the coefficient generator 824 as the normal equations.

In step S748, the coefficient generator 824 solves the normal equations containing the matrix on the left side and the vector on the right side in equation (8) for each combination of parameters h and v and for each class to determine the prediction coefficient $W_{v,h,n}$ for each combination of parameters h and v and for each class. The coefficient generator 824 then supplies the determined prediction coefficient $W_{v,h,n}$ to the normal equation generator 825.

In step S749, the normal equation generator 825 generates normal equations expressed by equation (17) for each class based on the prediction coefficient $W_{v,h,n}$, and outputs the normal equations to the coefficient seed determining unit 826. In step S750, the coefficient seed determining unit 826 solves the normal equations expressed by equation (17) for each class to determine the coefficient seed $w_{n,k}$ for each class. In step S751, the coefficient seed $w_{n,k}$ is stored in the coefficient seed memory 827 and is also stored in the coefficient seed memory 652 shown in FIG. 10.

As discussed above, the artificial-image prediction unit 132 predicts a high-quality artificial image by using a prediction coefficient generated from a coefficient seed obtained by conducting learning using an artificial image. It is thus possible to enhance the quality of the artificial image components contained in the HD image supplied from the output phase converter 112.

Additionally, the artificial-image prediction unit 132 classifies subject pixels in accordance with the positions of the edges of class taps as the feature of the phase. With this arrangement, the subject pixels of an artificial image having small number of grayscale levels and distinct phase information can be accurately classified. Accordingly, the artificial-image prediction unit 132 can predict a high-quality artificial image from an HD image by using a prediction coefficient generated from a coefficient seed obtained by conducting learning for each class. As a result, it is possible to suppress noise contained in the artificial image with higher precision and to output a higher-quality artificial image.

A description is now given, with reference to FIG. 20, of the detailed configuration of the natural-image/artificial-image determining unit 114.

The natural-image/artificial-image determining unit 114 includes a broad-range feature extracting portion 911, a broad-range degree-of-artificiality calculator 912, a degree-of-artificiality generator 913, a narrow-range feature extracting portion 914, and a narrow-range degree-of-artificiality calculator 915.

The broad-range feature extracting portion 911 includes a broad edge parameter (BEP) extracting portion 931, a broad flat parameter (BFP) extracting portion 932, and a feature synthesizer 933. The broad-range feature extracting portion 911 extracts a broad-range feature from each pixel forming an HD image supplied from the output phase converter 112, and supplies the extracted broad-range feature to the broad-range degree-of-artificiality calculator 912.

The BEP extracting portion 931 obtains, for each pixel of the HD image supplied from the output phase converter 112, a value based on the dynamic range of the pixel values of pixels contained in a reference area set for the subject pixel. The BEP extracting portion 931 then sets the obtained value as the broad-range feature BEP and supplies the broad-range feature BEP to the BFP extracting portion 932 and the feature synthesizer 933. The detailed configuration of the BEP extracting portion 931 is given below with reference to FIG. 21. The pixels contained in the reference area and the broad-range feature BEP are also referred to as the "reference pixels" and the "BEP", respectively. Also, in the following description, the subject pixel is a pixel forming the HD image supplied from the output phase converter 112 and is to be processed by the natural-image/artificial-image determining unit 114.

The BFP extracting portion 932 obtains, for each pixel forming the HD image supplied from the output phase converter 112, a value based on the BEP and the difference absolute values of adjacent pixels among the reference pixels set for the subject pixel. The BFP extracting portion 932 then sets the obtained value as the broad-range feature BFP and supplies it to the feature synthesizer 933. The detailed configuration of the BFP extracting portion 932 is given below with reference to FIG. 22. The broad-range feature BFP is also simply referred to as the "BFP".

The feature synthesizer 933 combines the BEP supplied from the BEP extracting portion 931 and the BFP supplied from the BFP extracting portion 932 to generate a broad-range feature, and supplies it to the broad-range degree-of-artificiality calculator 912. That is, the broad-range feature is formed of two types of features, such as the above-described BEP and BFP, and indicates the feature of an image located in a broad range that contains the subject pixel.

The broad-range degree-of-artificiality calculator 912 includes a feature separator 951, a broad-range boundary comparator 952, a broad-range boundary memory 953, and a dividing point calculator 954. The broad-range degree-of-artificiality calculator 912 calculates the broad-range degree of artificiality $Art_b$ on the basis of the broad-range feature supplied from the broad-range feature extracting portion 911, and supplies the calculated broad-range degree of artificiality $Art_b$ to the degree-of-artificiality generator 913.

The feature separator 951 obtains the broad-range feature supplied from the broad-range feature extracting portion 911, and supplies the obtained feature to the broad-range boundary comparator 952. That is, in this example, since the broad-range feature includes the BEP and BFP, the feature separator 951 separates the BEP and BFP and supplies them to the broad-range boundary comparator 952.

The broad-range boundary memory 953 stores broad-range boundaries, which have been statistically determined from a plurality of artificial images and natural images, indicating whether image components contained in artificial images and natural images belong to an artificial image or a natural image. The broad-range boundary comparator 952 compares the two types of features, i.e., the BEP and BFP, supplied from the feature separator 951 with the broad-range boundaries, and supplies comparison results to the dividing point calculator 954.

The dividing point calculator 954 calculates the broad-range degree of artificiality $Art_b$ corresponding to the broad-range feature on the basis of the comparison results supplied from the broad-range boundary comparator 952, and supplies the calculated broad-range degree of artificiality $Art_b$ to the degree-of-artificiality generator 913.

The narrow-range feature extracting portion 914 includes a primary narrow discrimination parameter (PNDP) extracting portion 971, a secondary narrow discrimination parameter (SNDP) extracting portion 972, and a feature synthesizer 973. The narrow-range feature extracting portion 914 extracts a narrow-range feature from each pixel of the HD image supplied from the output phase converter 112, and supplies the extracted narrow-range feature to the narrow-range degree-of-artificiality calculator 915.

The PNDP extracting portion 971 obtains, for each pixel of the HD image supplied from the output phase converter 112, the value based on the dynamic range of the pixel values of the pixels of a long tap area included in a reference area which is set for the subject pixel. The PNDP extracting portion 971 then sets the obtained value as the feature PNDP forming the narrow-range feature, and supplies the feature PNDP to the SNDP extracting portion 972 and the feature synthesizer 973. The detailed configuration of the PNDP extracting portion 971 is discussed below with reference to FIG. 23. The feature PNDP is also simply referred to as the "PNDP".

The SNDP extracting portion 972 extracts, as the narrow-range feature, for each pixel of the HD image supplied from the output phase converter 112, the feature SNDP obtained based on the PNDP and the dynamic range of the pixel values of the pixels of a short tap area contained in a long tap area included in a reference area which is set for the subject pixel. The SNDP extracting portion 972 then supplies the feature SNDP to the feature synthesizer 973 as the narrow-range feature. The detailed configuration of the SNDP extracting portion 972 is discussed below with reference to FIG. 24. The feature SNDP is also simply referred to as the "SNDP".

The feature synthesizer 973 combines the PNDP supplied from the PNDP extracting portion 971 with the SNDP supplied from the SNDP extracting portion 972 to generate a narrow-range feature, and supplies the narrow-range feature to the narrow-range degree-of-artificiality calculator 915. That is, the narrow-range feature is formed of two types of features, i.e., the PDNP and SNDP, and indicates the feature of an image located in a narrow range that contains the subject pixel.

The narrow-range degree-of-artificiality calculator 915 includes a feature separator 991, a narrow-range boundary comparator 992, a narrow-range boundary memory 993, and a dividing point calculator 994. The narrow-range degree-of-artificiality calculator 915 calculates the narrow-range degree of artificiality $Art_n$ on the basis of the narrow-range feature supplied from the narrow-range feature extracting portion 914, and supplies the calculated narrow-range degree of artificiality $Art_n$ to the degree-of-artificiality generator 913.

The feature separator 991 separates the narrow-range feature supplied from the narrow-range feature extracting portion 914, and supplies the separated feature to the narrow-range boundary comparator 992. That is, in this example, since the narrow-range feature includes the PNDP and SNDP, the feature separator 991 separates the PNDP and SNDP and supplies them to the narrow-range boundary comparator 992.

The narrow-range boundary memory 993 stores narrow-range boundaries, which have been statistically determined from a plurality of artificial images and natural images, indicating whether image components contained in artificial images and natural images belong to an artificial image or a natural image. The narrow-range boundary comparator 992 compares the two types of features, i.e., the PNDP and SNDP, supplied from the feature separator 991 with the narrow-range boundaries, and supplies comparison results to the dividing point calculator 994.

The dividing point calculator 994 calculates the narrow-range degree of artificiality $Art_n$ corresponding to the narrow-range feature on the basis of the comparison results supplied from the narrow-range boundary comparator 992, and supplies the calculated narrow-range degree of artificiality $Art_n$ to the degree-of-artificiality generator 913.

The degree-of-artificiality generator 913 combines the broad-range degree of artificiality $Art_b$ supplied from the broad-range degree-of-artificiality calculator 912 with the narrow-range degree of artificiality $Art_n$ supplied from the narrow-range degree-of-artificiality calculator 915 to generate the degree of artificiality Art, and outputs it to the image processor 113.

The detailed configuration of the BEP extracting portion 931 is discussed below with reference to FIG. 21.

Figure 21:
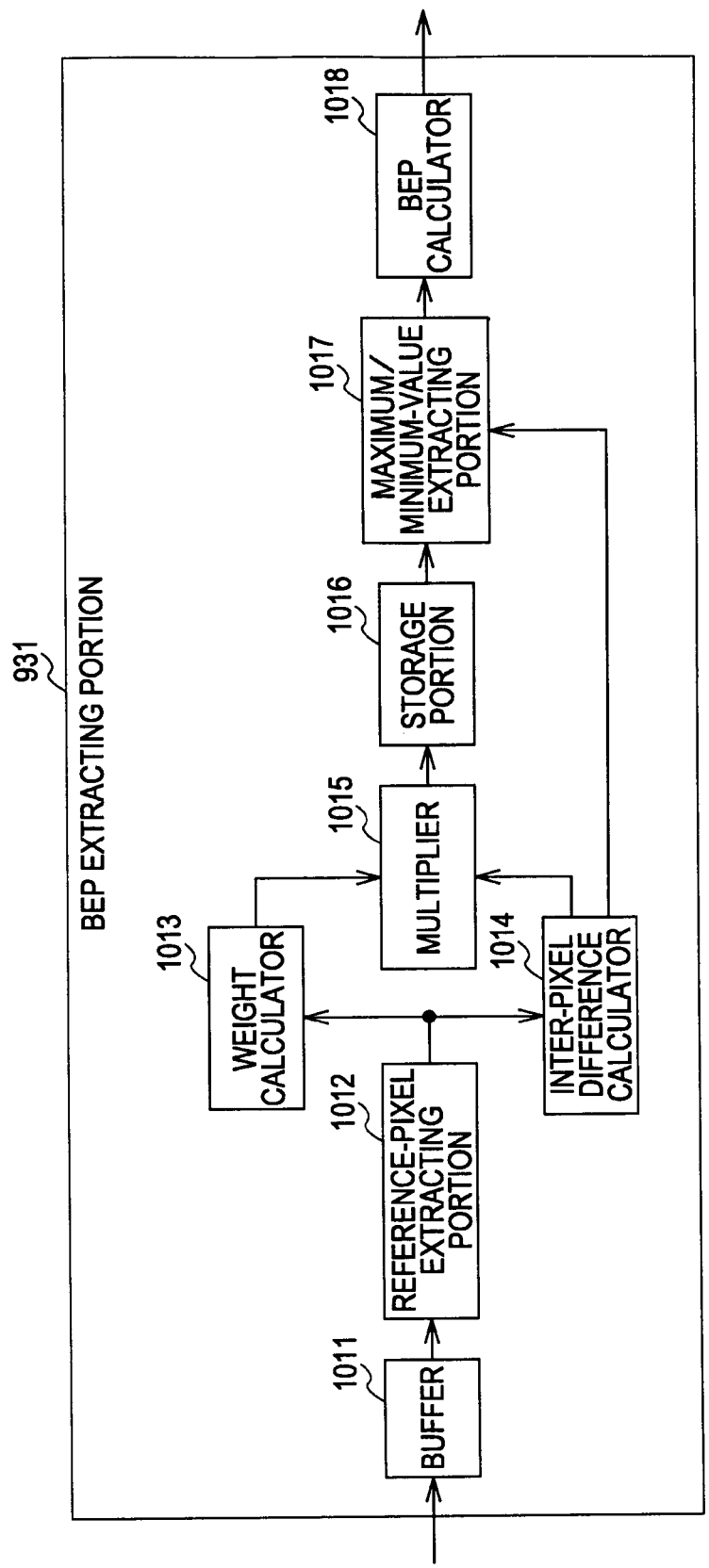
FIG. 21 is a block diagram illustrating an example of the configuration of a broad edge parameter (BEP) extracting portion.

The BEP extracting portion 931 shown in FIG. 21 includes a buffer 1011, a reference-pixel extracting portion 1012, a weight calculator 1013, an inter-pixel difference calculator 1014, a multiplier 1015, a storage portion 1016, a maximum/minimum-value extracting portion 1017, and a BEP calculator 1018.

The buffer 1011 temporarily stores an HD image supplied from the output phase converter 112, and supplies the HD image to the reference-pixel extracting portion 1012 if necessary. The reference-pixel extracting portion 1012 sequentially reads out reference pixels for each subject pixel, and supplies the read reference pixels to the weight calculator 1013 and the inter-pixel difference calculator 1014. The reference pixels are pixels within a predetermined area which is set for each subject pixel, e.g., all the pixels contained in an n-pixel×n-pixel area around the subject pixel. The number and the arrangement of reference pixels are arbitrary as long as the reference pixels are set for a subject pixel.

The weight calculator 1013 calculates a weight in accordance with the distance between the subject pixel and each reference pixel supplied from the reference-pixel extracting portion 1012, and supplies the calculated weight to the multiplier 1015. The inter-pixel difference calculator 1014 determines the difference between the subject pixel and each reference pixel supplied from the reference-pixel extracting portion 1012, and supplies the calculated difference to the multiplier 1015. The multiplier 1015 multiplies the difference calculated by the inter-pixel difference calculator 1014 by the weight calculated by the weight calculator 1013, and stores the resulting value in the storage portion 1016.

When all the values obtained by multiplying the differences between the subject pixel and all the reference pixels by the weights are stored in the storage portion 1016, the maximum/minimum-value extracting portion 1017 extracts the maximum value and the minimum value, and supplies the maximum value and the minimum value to the BEP calculator 1018. The BEP calculator 1018 outputs, as the BEP of the subject pixel, the value obtained by multiplying the difference between the subject pixel and each reference pixel, i.e., the dynamic range obtained from the differences between the subject pixel and the reference pixels, by the weight calculated based on the distance between the subject pixel and the corresponding reference pixel. The value obtained by multiplying the difference dynamic range by the weight is also referred to as the "dynamic range based on the distance from the subject pixel" or simply referred to as the "difference dynamic range".

The detailed configuration of the BFP extracting portion 932 is now discussed below with reference to FIG. 22.

The BFP extracting portion 932 includes a buffer 1031, a reference-pixel extracting portion 1032, an adjacent-pixel difference calculator 1033, a function transformer 1034, a weight calculator 1035, a multiplier 1036, a storage portion 1037, and a BFP calculator 1038.

The buffer 1031 temporarily stores HD images supplied from the output phase converter 112, and sequentially supplies the HD images to the reference-pixel extracting portion 1032 if necessary. The reference-pixel extracting portion 1032 sequentially reads out the reference pixels for each subject pixel, and supplies the reference pixels to the adjacent-pixel difference calculator 1033 and the weight calculator 1035.

The adjacent-pixel difference calculator 1033 calculates the absolute values of the differences between adjacent pixels of all the reference pixels supplied from the reference-pixel extracting portion 1032, and supplies the calculated absolute values to the function transformer 1034. The function transformer 1034 sets a transform function based on the BEP supplied from the BEP extracting portion 931, and then transforms the adjacent-pixel difference absolute values supplied from the adjacent-pixel difference calculator 1033 by the transform function, and supplies the transformed absolute values to the multiplier 1036.

The weight calculator 1035 calculates, for the position of each reference pixel supplied from the reference-pixel extracting portion 1032, the weight based on the distance from the subject pixel, and supplies the calculated weight to the multiplier 1036. The multiplier 1036 multiplies the adjacent-pixel difference absolute values transformed by the function and supplied from the function transformer 1034 by the weights supplied from the weight calculator 1035, and stores the multiplied values in the storage portion 1037.

The BFP calculator 1038 cumulatively adds the multiplied values stored in the storage portion 1037, and outputs the added value as the BFP of the subject pixel.

The detailed configuration of the PNDP extracting portion 971 is discussed below with reference to FIG. 23.

The PNDP extracting portion 971 includes a buffer 1051, a reference-pixel extracting portion 1052, a long-tap extracting portion 1053, a pixel-value storage portion 1054, a maximum/minimum-value extracting portion 1055, and a PNDP calculator 1056.

The buffer 1051 temporarily stores HD images supplied from the output phase converter 112, and sequentially supplies the HD images to the reference-pixel extracting portion 1052 if necessary. The reference-pixel extracting portion 1052 sequentially reads out the reference pixels for each subject pixel, and supplies the read reference pixels to the long-tap extracting portion 1053.

The long-tap extracting portion 1053 extracts pixels from an area contained in the reference area, i.e., from an area smaller than or equal to the reference pixel area, and supplies the extracted pixels to the pixel-value storage portion 1054. The long-tap extracting portion 1053 also supplies long tap information to a short-tap extracting portion 1073 of the SNDP extracting portion 972. When all the pixels forming the long tap have been extracted, the long-tap extracting portion 1053 supplies information that all the pixels forming the long tap have been extracted to the maximum/minimum-value extracting portion 1055.

The maximum/minimum-value extracting portion 1055 extracts the maximum value and the minimum value of all the pixel values of the long tap stored in the pixel-value storage portion 1054, and supplies the extracted maximum and minimum values to the PNDP calculator 1056.

The PNDP calculator 1056 determines the reference-pixel dynamic range of the pixel values from the difference between the maximum value and the minimum value supplied from the maximum/minimum-value extracting portion 1055 (such a dynamic range is simply referred to as a "pixel-value dynamic range"), and outputs the pixel-value dynamic range as the PNDP of the subject pixel. The pixel-value dynamic range is the value obtained by subtracting the minimum value from the maximum value of all the pixel values contained n a predetermined area.

The detailed configuration of the SNDP extracting portion 972 is discussed below with reference to FIG. 24.

The SNDP extracting portion 972 includes a buffer 1071, a reference-pixel extracting portion 1072, the short-tap extracting portion 1073, a pixel value storage portion 1074, a maximum/minimum-value extracting portion 1075, a dynamic range (DR) calculator 1076, a DR storage portion 1077, and an SNDP selector 1078.

The buffer 1071 temporarily stores HD images supplied from the output phase converter 112, and sequentially supplies the HD images to the reference-pixel extracting portion 1072 if necessary. The reference-pixel extracting portion 1072 sequentially reads out the reference pixels for each subject pixel, and supplies the read reference pixels to the short-tap extracting portion 1073.

Based on information concerning the long tap supplied from the long-tap extracting portion 1053, the short-tap extracting portion 1073 extracts pixels from a plurality of areas containing the subject pixel, which are smaller than or equal to the long tap area, and supplies the extracted pixels to the pixel value storage portion 1074. That is, for one long tap, a plurality of patterns may be set for short taps. When all the patterns for a plurality of short taps have been extracted, the short-tap extracting portion 1073 supplies information that all the patterns have been extracted to the SNDP selector 1078.

The maximum/minimum-value extracting portion 1075 extracts the maximum value and the minimum value of all the pixel values contained in each short tap and stored in the pixel value storage portion 1074, and supplies the extracted maximum and minimum values to the DR calculator 1076.

The DR calculator 1076 determines the pixel-value dynamic range from the difference between the maximum and minimum values supplied from the maximum/minimum-value extracting portion 1075, and stores the pixel-value dynamic range in the DR storage portion 1077.

Upon receiving the information that all the patterns have been extracted for short taps from the short-tap extracting portion 1073, the SNDP selector 1078 selects the minimum dynamic range from the pixel-value dynamic ranges determined for all the patterns of the short taps and stored in the DR storage portion 1077, and outputs the selected minimum dynamic range as the SNDP.

The natural-image/artificial-image determination processing is discussed below with reference to the flowchart in FIG. 25.

In step S831, the BEP extracting portion 931 of the broad-range feature extracting portion 911 performs BEP extraction processing to extract the BEP for each pixel from an HD image supplied from the output phase converter 112, and supplies the extracted BEP to the feature synthesizer 933.

Figure 26:
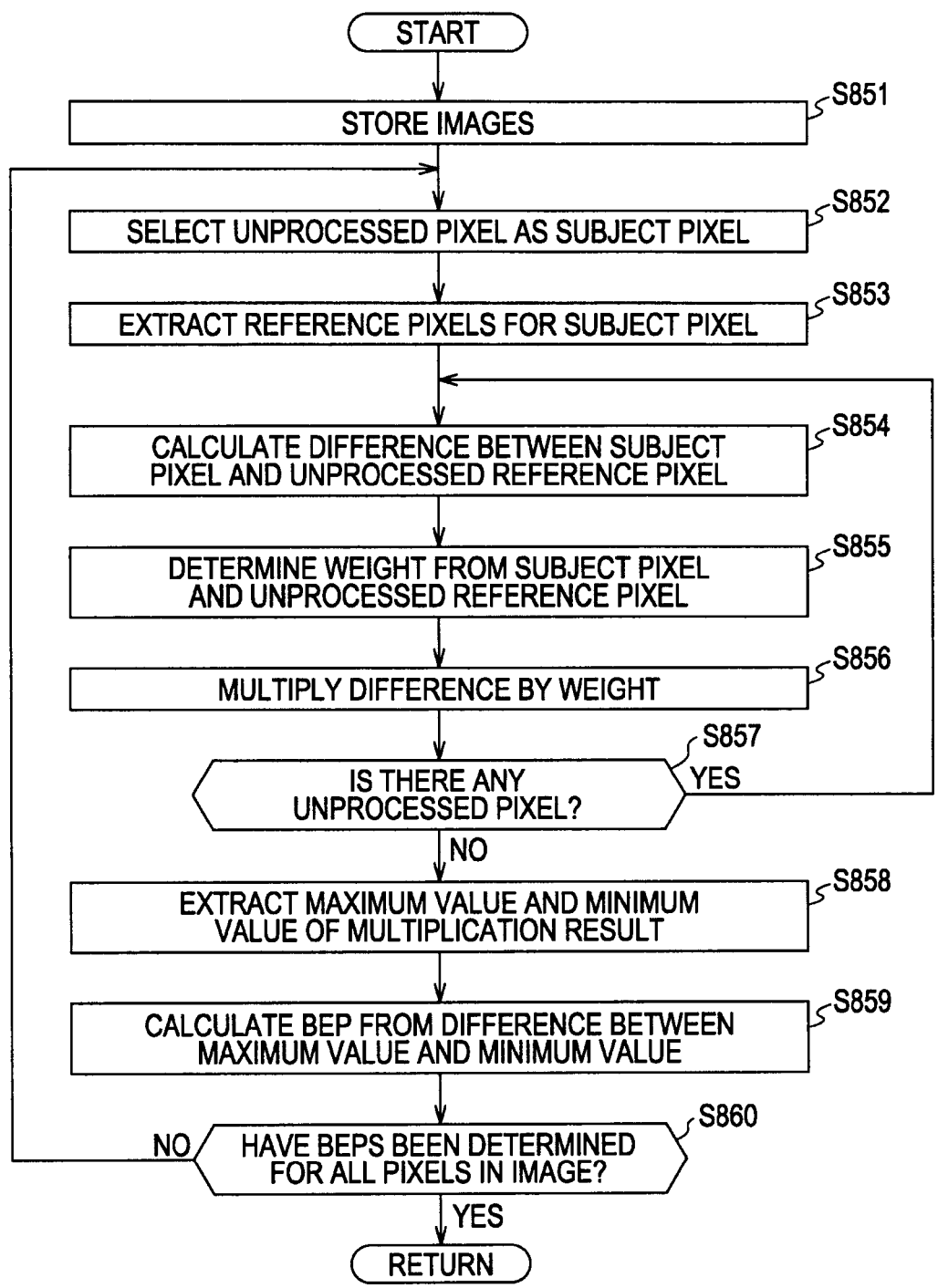
FIG. 26 is a flowchart illustrating BEP extraction processing performed by the BEP extracting portion shown in FIG. 21.

A description is now given, with reference to the flowchart in FIG. 26, of the BEP extraction processing performed by the BEP extracting portion 931 shown in FIG. 21.

In step S851, the buffer 1011 temporarily stores HD images supplied from the output phase converter 112.

In step S852, the reference-pixel extracting portion 1012 selects an unprocessed subject pixel received from the buffer 1011 as a subject pixel. In step S853, the reference-pixel extracting portion 1012 reads out reference pixels which are set for the subject pixel and supplies the read reference pixels to the weight calculator 1013 and the inter-pixel difference calculator 1014. The reference pixels are pixels in a predetermined area which is set for the subject pixel, for example, all the pixels contained in an n-pixel×n-pixel area around the subject pixel, as shown in FIG. 27.

Figure 27:
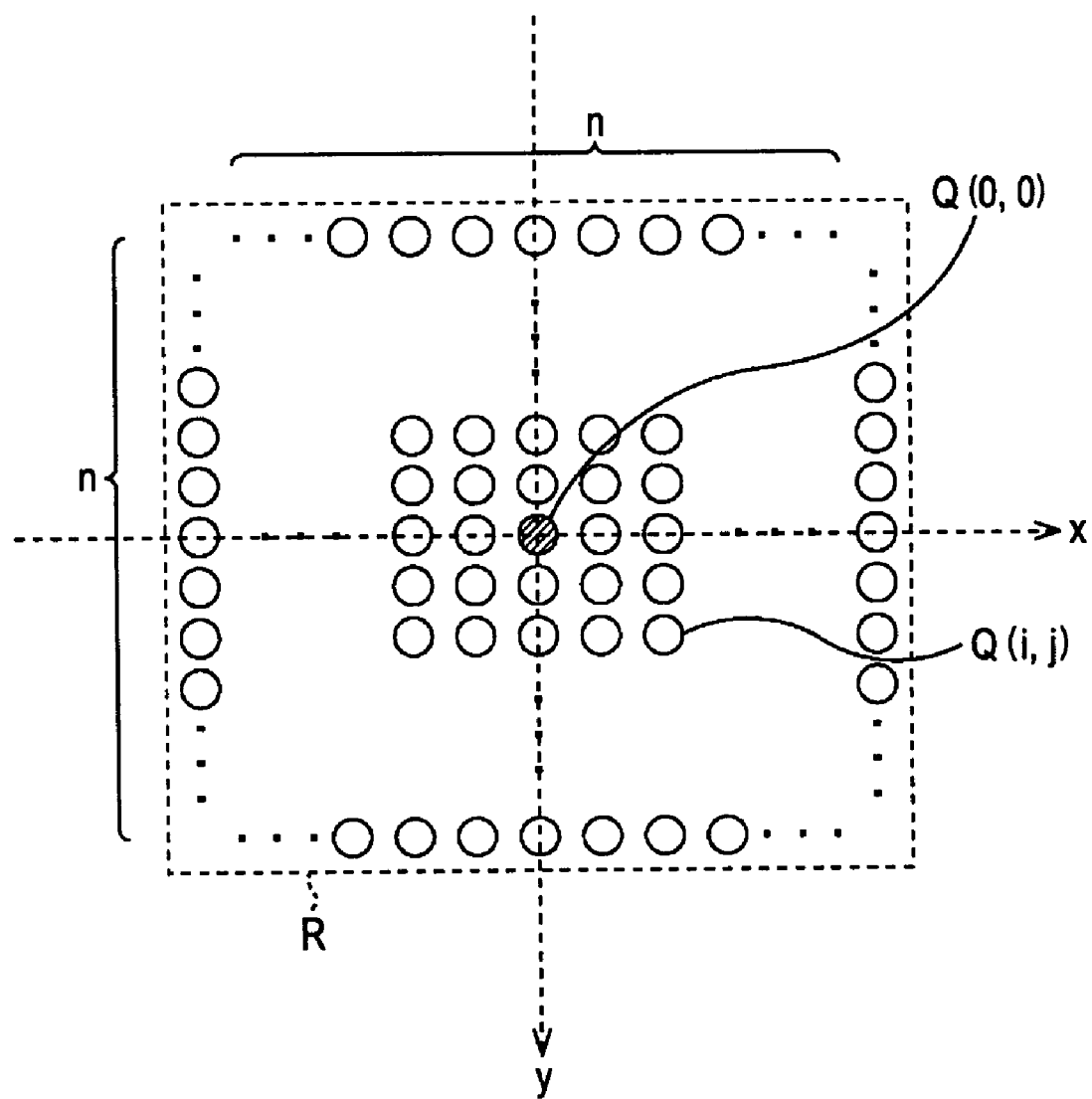
FIG. 27 illustrates reference pixels.

In FIG. 27, in a reference area R of an image, reference pixels Q(i,j) are indicated by the white circles on the two-dimensional coordinates in the x direction and in the y direction around the subject pixel Q(0,0) indicated by the hatched portion. The pixels contained in the area surrounded by the broken lines (n×n) around the subject pixel Q(0,0) are reference pixels Q(i,j) that can be represented by $-(n-1)/2 \leq i \leq (n-1)/2$, $-(n-1)/2 \leq j \leq (n-1)/2$, where i and j are integers.

In step S854, the inter-pixel difference calculator 1014 calculates the difference between the subject pixel and an unprocessed reference pixel, and supplies the calculated difference to the multiplier 1015. That is, in FIG. 27, the inter-pixel difference calculator 1014 calculates (Q(0,0)−Q(i,j)) as the inter-pixel difference, and supplies the calculated difference to the multiplier 1015. Q(0,0) and Q(i,j) in the inter-pixel difference represent the pixel values of the subject pixel Q(0, 0) and the reference pixel Q(i,j), respectively.

In step S855, the weight calculator 1013 calculates the weight based on the distance between the subject pixel and the unprocessed reference pixel, and supplies the calculated weight to the multiplier 1015. More specifically, if the reference pixel for which the inter-pixel difference has been determined is the reference pixel Q(i,j), the weight calculator 1013 calculates $w_d = a/(i^2+j^2)$ (a is a constant) as the weight by using a coordinate parameter. It is sufficient if the weight $w_d$ becomes greater as the distance is shorter and becomes smaller as the distance is longer. Accordingly, the weight $w_d$ may be calculated by a parameter different from the parameter expressed by the above-described equation. For example, the weight may be calculated by $w_d = \sqrt{(i^2+j^2)}$ (a is a constant).

In step S856, the multiplier 1015 multiplies the inter-pixel difference supplied from the inter-pixel difference calculator 1014 by the weight supplied from the weight calculator 1013, and stores the multiplication result in the storage portion 1016. That is, in FIG. 27, the multiplier 1015 multiplies the inter-pixel difference (Q(0,0)−Q(i,j)) supplied from the inter-pixel difference calculator 1014 by the weight $w_d$ supplied from the weight calculator 1013, and stores the multiplication result $w_d \times (Q(\mathbf{0,0})-Q(i,j))$ in the storage portion 1016.

In step S857, the inter-pixel difference calculator 1014 checks for an unprocessed reference pixel. If there is an unprocessed reference pixel, the process returns to step S854. That is, steps S854 through S857 are repeated until all the reference pixels have been processed.

If it is determined in step S857 that there is no unprocessed reference pixel, i.e., that the differences between all the reference pixels and the subject pixel have been determined and the weights $w_d$ are set based on the distances from the subject pixel and that the multiplication results obtained by multiplying the differences by the weights are stored in the storage portion 1016, the process proceeds to step S858. In step S858, the inter-pixel difference calculator 1014 supplies information that all the reference pixels have been processed to the maximum/minimum-value extracting portion 1017. The maximum/minimum-value extracting portion 1017 extracts the maximum value and the minimum value of the values stored in the storage portion 1016, and supplies the maximum and minimum values to the BEP calculator 1018.

In step S859, the BEP calculator 1018 calculates, as the BEP of the subject pixel, the reference-pixel difference dynamic range obtained by subtracting the minimum value from the maximum value of the multiplication results supplied from the maximum/minimum-value extracting portion 1017, and supplies the BEP to the BFP extracting portion 932 and the feature synthesizer 933.

In step S860, the reference-pixel extracting portion 1012 determines whether the BEPs have been calculated for all the pixels in the image stored in the buffer 1011. If it is determined in step S860 that the BEPs have not been calculated for all the pixels, the process returns to step S852. That is, steps S852 through S860 are repeated until the BEPs have been calculated for all the pixels of the image stored in the buffer 1011. If it is determined in step S860 that the BEPs have been calculated for all the pixels, the BEP extraction processing is completed.

According to the above-described processing, the BEP, which serves as the feature representing an edge in a broad range of an image. That is, the BEP is indicated by the difference dynamic range of the reference pixel relative to the subject pixel. Accordingly, the BEP becomes larger if there is an edge in a broad range containing the subject pixel, and conversely, the BEP becomes smaller if there is no edge.

After the BEP extraction processing is completed, the process returns to step S832 in FIG. 25. In step S832, the BFP extracting portion 932 of the broad-range feature extracting portion 911 performs BFP extraction processing to extract the BFP for each pixel from an HD image supplied from the output phase converter 112, and supplies the extracted BFP to the feature synthesizer 933.

Figure 22:
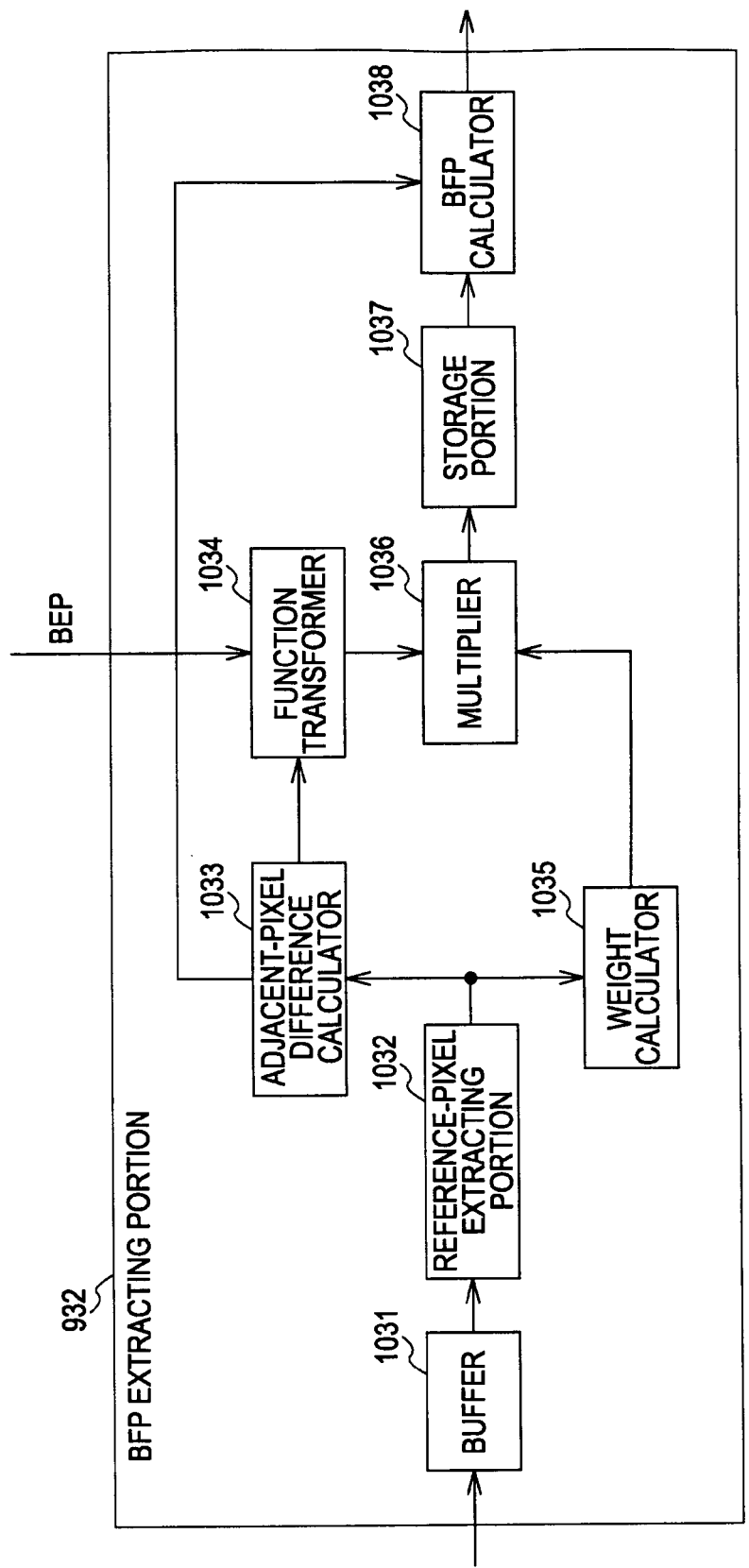
FIG. 22 is a block diagram illustrating an example of the configuration of a broad flat parameter (BFP) extracting portion.
Figure 28:
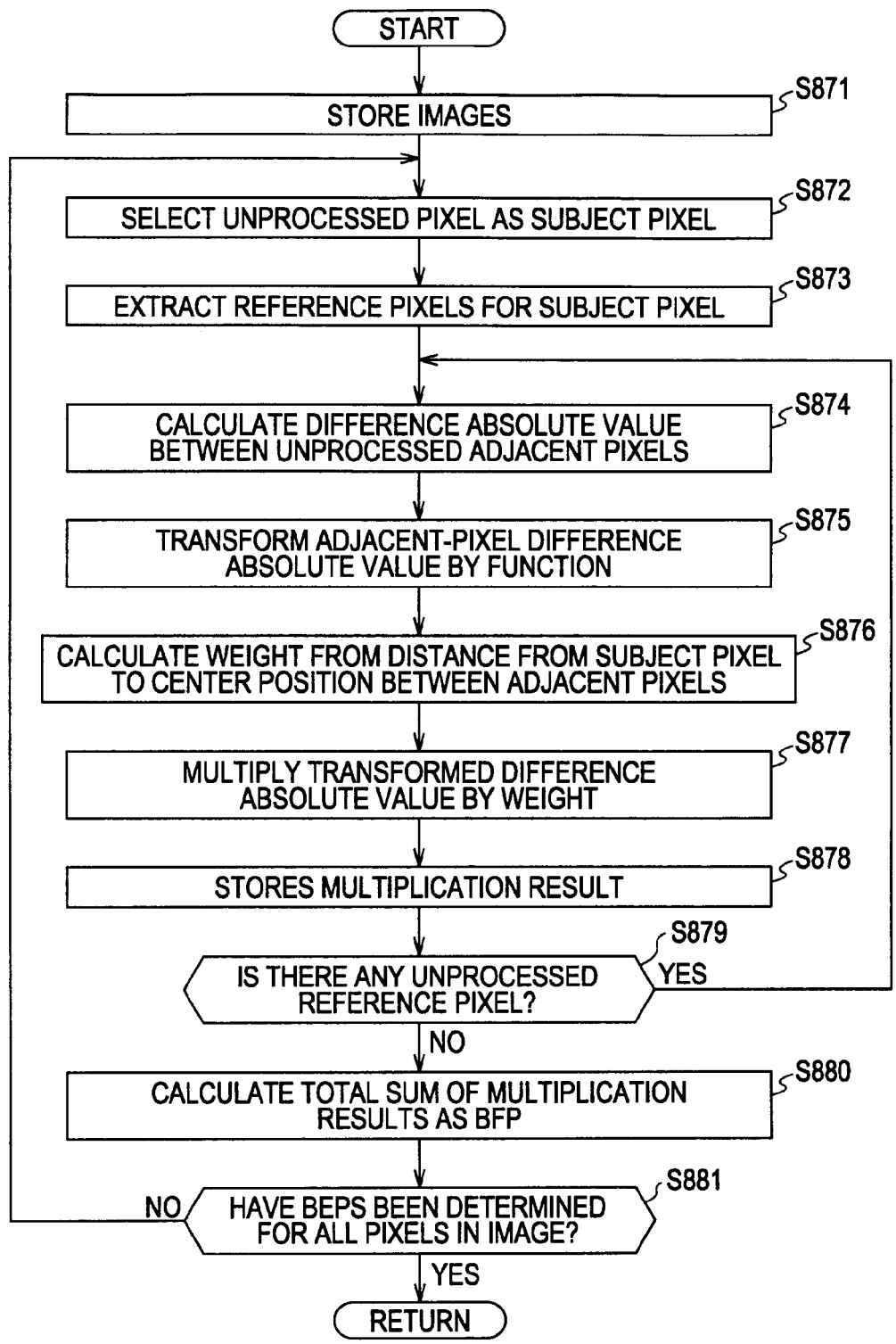
FIG. 28 is a flowchart illustrating BFP extraction processing performed by the BFP extracting portion shown in FIG. 22.

The BFP extraction processing performed by the BFP extracting portion 932 shown in FIG. 22 is discussed below with reference to the flowchart in FIG. 28.

In step S871, the buffer 1031 temporarily stores HD images supplied from the output phase converter 112.

In step S872, the reference-pixel extracting portion 1032 selects an unprocessed reference pixel as the subject pixel. In step S873, the reference-pixel extracting portion 1032 reads out the reference pixels set for the subject pixel, and supplies the read reference pixels to the adjacent-pixel difference calculator 1033 and the weight calculator 1035.

In step S874, the adjacent-pixel difference calculator 1033 calculates the absolute value of the difference between unprocessed reference pixels (including the subject pixel), and supplies the calculated difference absolute value to the function transformer 1034. More specifically, in FIG. 29, the adjacent-pixel difference calculator 1033 calculates, for example, $e=|Q(i+1,j)-Q(i,j)|$, as the adjacent-pixel difference absolute value e, and supplies it to the function transformer 1034. $Q(i+1,j)$ and $Q(i,j)$ in the adjacent-pixel difference absolute value represent the pixel value of the reference pixel $Q(i+1,j)$ and the pixel value of the reference pixel $Q(i,j)$, respectively. The circle indicated by the hatched portion in FIG. 29 represents the subject pixel $Q(0,0)$.

Figure 29:
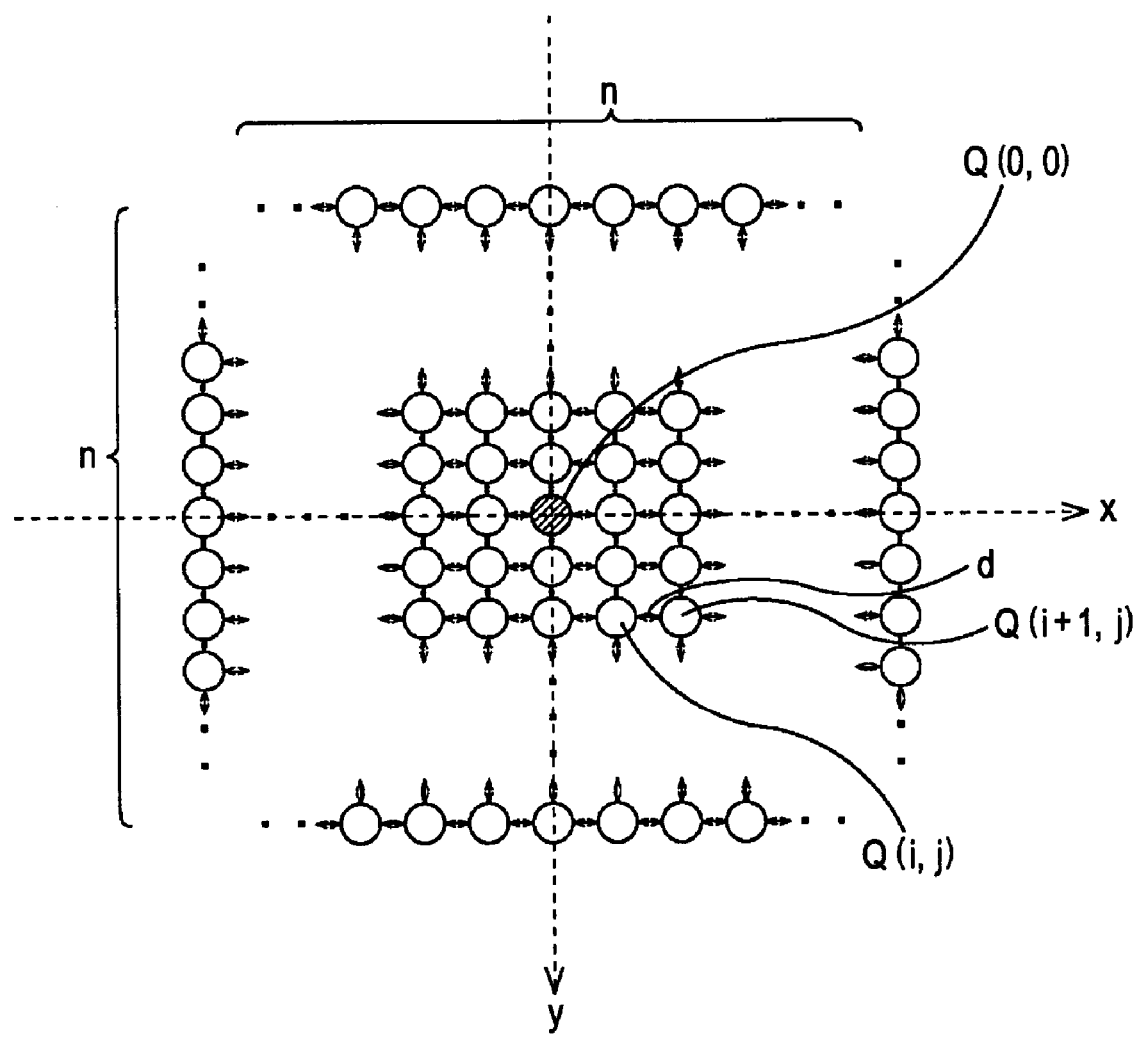
FIG. 29 illustrates the relationship among reference pixels to determine the adjacent-pixel difference absolute values therebetween.

The adjacent-pixel difference absolute values e of the reference pixels are the absolute values of the differences of each pixel x indicated by a circle in FIG. 29 from the adjacent pixels in the x direction and in the y direction. That is, as the adjacent-pixel difference absolute values e of the reference pixel $Q(i,j)$, four adjacent-pixel difference absolute values e, such as $|Q(i+1,j)-Q(i,j)|$, $|Q(i,j+1)-Q(i,j)|$, $|Q(i-1,j)-Q(i,j)|$, and $|Q(i,j-1)-Q(i,j)|$, are set. However, since reference pixels located at edges of an area containing the reference pixels are not adjacent to the reference pixel in one of the positive and negative x and y directions, only three adjacent-pixel difference absolute values are set. Also, since reference pixels located at the four corners in an area containing the reference pixels are not adjacent to the reference pixels in two directions of the positive and negative x and y directions, only two adjacent-pixel difference absolute values are set. As a result, if n×n reference pixels are set around the subject pixel, 2n(n−1) adjacent-pixel difference absolute values are set.

In step S875, the function transformer 1034 transforms the adjacent-pixel difference absolute value e supplied from the adjacent-pixel difference calculator 1033 on the basis of the function f set by the BEP supplied from the BEP extracting portion 931, and supplies the transformed adjacent-pixel difference absolute value e to the multiplier 1036. More specifically, the function transformer 1034 transforms the adjacent-pixel difference absolute value e based on the following equation set from the BEP supplied from the BEP extracting portion 931, and outputs the transformed value to the multiplier 1036.

$$f(e) = \begin{cases} 1 & \text{if } th \geq e \\ 0 & \text{if } th < e \end{cases} \quad (18)$$

$$th = BEP/b$$

In equation (18), if the adjacent-pixel difference absolute value e is greater than the threshold th=BEP/b, 0 is output to the multiplier 1036. If the adjacent-pixel difference absolute value e is smaller than or equal to the threshold th=BEP/b, 1 is output to the multiplier 1036. In equation (18), b is a constant. The BEP used for calculating the threshold th is the BEP of the subject pixel. It is sufficient if the threshold th reflects the characteristic of the BEP. Accordingly, the threshold th may be calculated by an equation different from th=BEP/b, for example, th=($\sqrt{BEP}$)/b or th=$(BEP)^2$/b.

In step S876, the weight calculator 1035 calculates the weight based on the distance between the subject pixel and the center position between adjacent pixels for which the adjacent-pixel difference absolute value is calculated, and supplies the resulting weight $w_e$ to the multiplier 1036. More specifically, if reference pixels for which the adjacent-pixel difference absolute value is calculated are reference pixels $Q(i,j)$ and $Q(i+1,j)$, the weight calculator 1035 calculates $w_e=a/((i+1/2)^2+j^2)$ (a is a constant) as the weight by using a coordinate parameter. In this case, it is sufficient if the weight $w_e$ is a value determined by the distance. Accordingly, the weight $w_e$ may be calculated by an equation different from $w_e=a/((i+1/2)^2+j^2)$, for example, by $w_e=a/\sqrt{((i+½)^2+j^2)}$ (a is a constant).

In step S877, the multiplier 1036 multiplies the adjacent-pixel difference absolute value e supplied from the function transformer 1034 by the weight $w_e$ supplied from the weight calculator 1035. In step S878, the multiplier 1036 stores the multiplication result in the storage portion 1037. That is, in FIG. 29, the multiplier 1036 multiplies the transformation result supplied from the function transformer 1034, i.e., 1 or 0, by the weight $w_e$ supplied from the weight calculator 1035, and stores the multiplication result, i.e., $w_e$ or 0, in the storage portion 1037.

In step S879, the adjacent-pixel difference calculator 1033 checks for an unprocessed reference pixel, i.e., whether there is an unprocessed reference pixel even though an adjacent-pixel difference absolute value has been determined for that reference pixel. If it is determined in step S879 that there is an unprocessed reference pixel, the process returns to step S874. Steps S874 through S879 are repeated until adjacent-pixel difference absolute values are calculated for all the reference pixels. That is, as stated above, if the reference pixels are n×n pixels, as shown in FIG. 29, 2n(n−1) adjacent-pixel difference absolute values are determined. Accordingly, steps S874 through S879 are repeated for 2n(n−1) times.

If it is determined in step S879 that there is no unprocessed reference pixel, i.e., that all the adjacent-pixel difference absolute values are determined and transformed by the function and weights are set based on the distances and that the multiplication results obtained by multiplying the absolute values by the weights are stored in the storage portion 1037, the process proceeds to step S880. In step S880, the adjacent-pixel difference calculator 1033 supplies information that all the reference pixels have been processed to the BFP calculator 1038. The BFP calculator 1038 calculates the sum of the multiplication results stored in the storage portion 1037, and outputs the sum as the BFP.

In step S881, the reference-pixel extracting portion 1032 determines whether the BFPs have been calculated for all the pixels forming the image stored in the buffer 1011. If it is determined in step S881 that the BFPs have not been calculated for all the pixels, the process returns to step S872. That is, steps S872 through S881 are repeated until the BFPs have been calculated for all the pixels forming the image stored in the buffer 1031. If it is determined in step S881 that the BFPs have been calculated for all the pixels, the BFP extraction processing is completed.

According to the above-described processing, the BFP is determined as the feature that represents a flat portion in a broad area of an image. That is, if the weight $w_e$ is not variable based on the distance, but is uniquely 1, the BFP becomes equal to the number of adjacent-pixel difference absolute values smaller than or equal to the threshold th. As a result, the BFP becomes greater if a broad range containing the subject pixel is flat, and conversely, the BFP becomes smaller if a broad range containing the subject pixel is not flat, i.e., if it includes many edges.

In the foregoing example, the adjacent-pixel difference absolute values are calculated for all the reference pixels. It is sufficient, however, if the relationship between the values of adjacent pixels can be determined, and thus, it is not necessary to calculate the adjacent-pixel difference absolute values for all the reference pixels. For example, the absolute values of the differences between adjacent pixels only in the x direction or in the y direction in FIG. 29 may be calculated. Alternatively, the sum of the absolute values of the differences between vertically adjacent pixels or between horizontally adjacent pixels, or the sum of the absolute values of the differences between vertically adjacent pixels and those between horizontally adjacent pixels may be used as the adjacent-pixel difference absolute values. The same applies to processing for determining adjacent-pixel difference absolute values in the following description.

Figure 30:
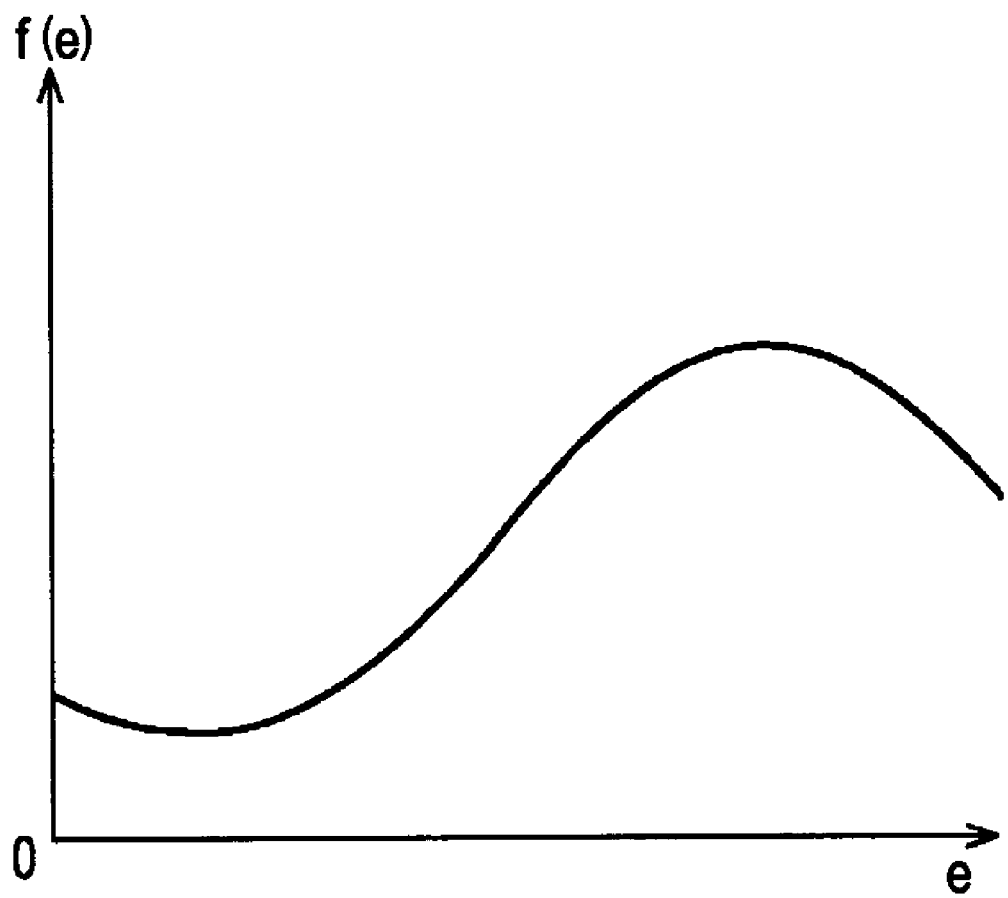
FIG. 30 illustrates transform function f.

The function transformer 1034 transforms the adjacent-pixel difference absolute value e by the function expressed by equation (18). However, the function is not restricted to that expressed by equation (18), and may be a function that can transform the adjacent-pixel difference absolute value e into a value that can clearly show the difference between the adjacent-pixel difference absolute values e, as shown in FIG. 30. In this case, the effect of such a function is similar to that when the function expressed by equation (18) is used.

The function f may be that shown in FIG. 30, as stated above, and may further be associated with the BEP. For example, if the adjacent-pixel difference absolute value e is greater than or equal to the threshold th1 (th1=BEP/b1), f(e) may be A, i.e., f(e)=A, where A is a constant. Conversely, if the adjacent-pixel difference absolute value e is smaller than or equal to the threshold th2 (th2=BEP/b2), f(e) may be B, i.e., f(e)=B, where B is a constant. If the adjacent-pixel difference absolute value e is greater than the threshold th2=BEP/b2 and smaller than the threshold th1=BEP/b1, f(e) may be (B−A)·(e−th1)/(th2−th1)+A. It is sufficient if the thresholds th1 and th2 can reflect the characteristic of the BEP, the thresholds th1 and th2 may be calculated by equations expressed by th1=($\sqrt{BEP}$)/b1 and th2=($\sqrt{BEP}$)/b2, or th1=(BEP)²/b1 and th2=(BEP)²/b2.

After the BFP extraction processing is completed, the process returns to step S833 in FIG. 25.

In step S833, the feature synthesizer 933 combines the BEP supplied from the BEP extracting portion 931 with the BFP supplied from the BFP extracting portion 932, and supplies the synthesized value to the broad-range degree-of-artificiality calculator 912 as the broad-range feature.

In step S834, the broad-range degree-of-artificiality calculator 912 performs broad-range degree-of-artificiality calculation processing on the basis of the broad-range feature supplied from the broad-range feature extracting portion 911 to calculate the broad-range degree of artificiality $Art_b$, and supplies $Art_b$ to the degree-of-artificiality generator 913.

Figure 31:
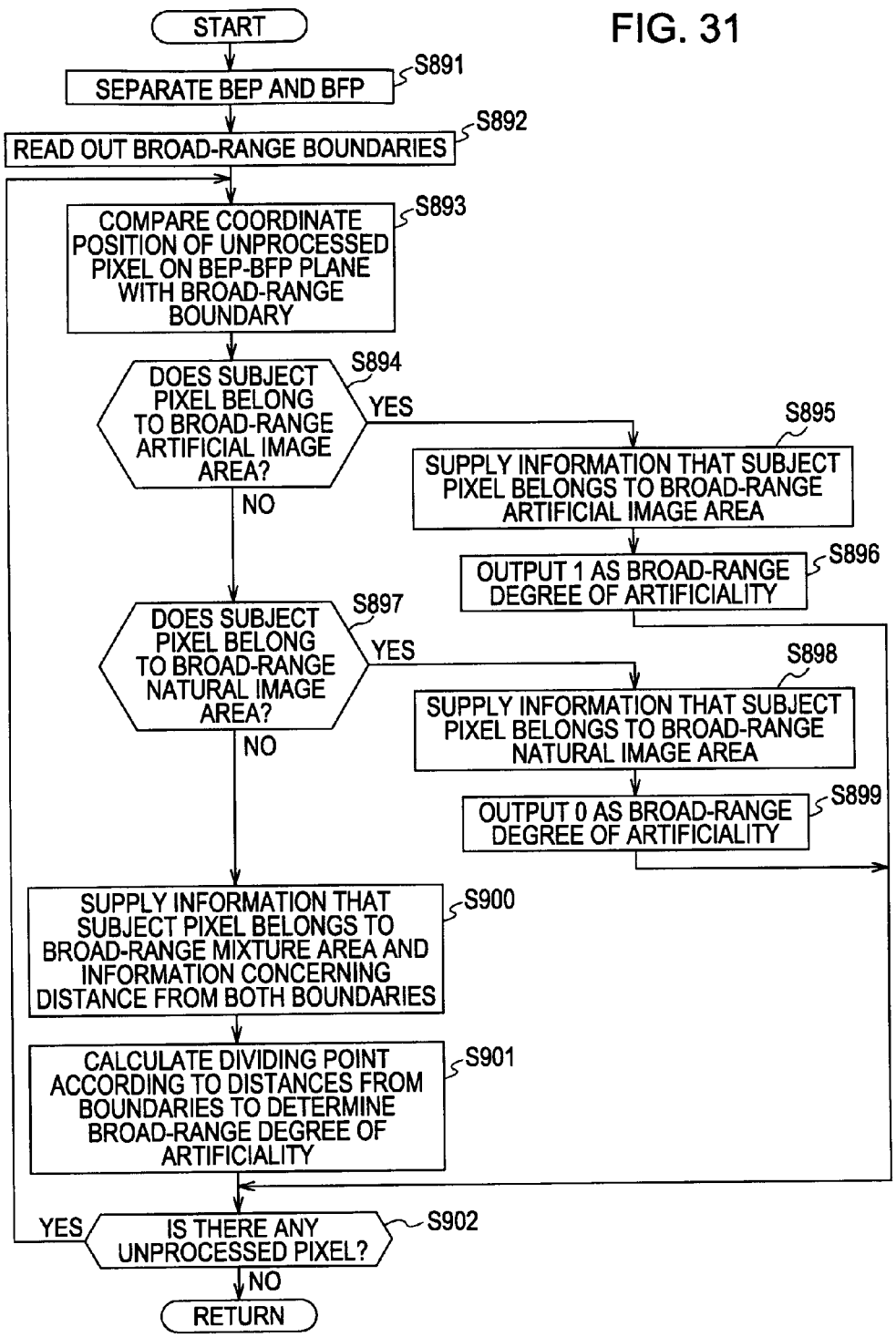
FIG. 31 is a flowchart illustrating broad-range degree-of-artificiality calculation processing.

The broad-range degree-of-artificiality calculation processing performed by the broad-range degree-of-artificiality calculator 912 is described below with reference to the flowchart in FIG. 31.

In step S891, the feature separator 951 obtains the broad-range feature supplied from the broad-range feature extracting portion 911, and also separates the BEP and BFP and supplies them to the broad-range boundary comparator 952.

In step S892, the broad-range boundary comparator 952 reads out information concerning the broad-range boundaries from the broad-range boundary memory 953.

In step S893, the broad-range boundary comparator 952 selects an unprocessed pixel as the subject pixel. The broad-range boundary comparator 952 also extracts the BEP and BFP of the subject pixel to plot the BEP and BFP on the two-dimensional BEP-BFP plane, and also determines the positional relationship of the BEP and BFP to the broad-range boundaries.

Figure 32:
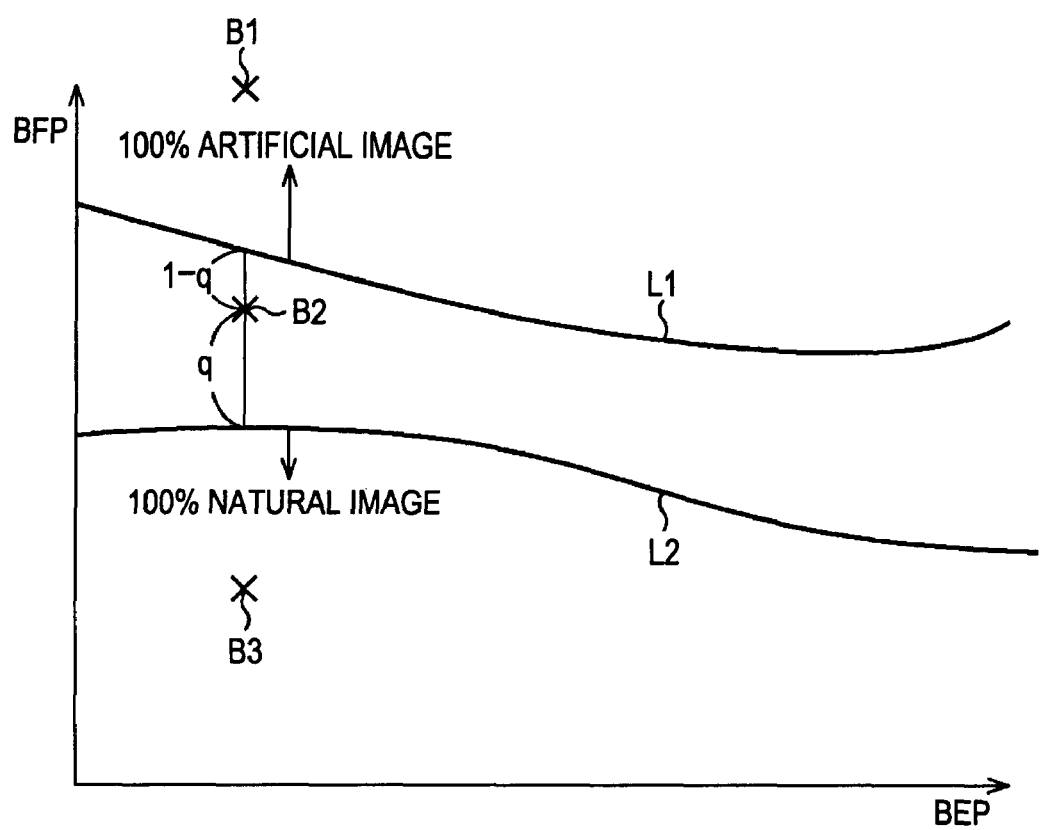
FIG. 32 illustrates broad-range boundaries.

The broad-range boundaries are boundaries that can be generated from a statistical distribution obtained by plotting the BEPs and BFPs extracted from a plurality of artificial images and natural images on the two-dimensional (BEP, BFP) space on the BEP axis and the BFP axis. The broad-range boundaries include two types of boundaries such as a broad-range artificial image boundary and a broad-range natural image boundary. The broad-range artificial image boundary is a boundary between an area where only broad-range features of artificial images are plotted and an area where broad-range features of both the artificial images and natural images are plotted. The broad-range natural image boundary is a boundary between an area where only broad-range features of natural images are plotted and an area where broad-range features of both the artificial images and natural images are plotted. Accordingly, the two-dimensional BEP-BFP area can be divided, as shown in FIG. 32, into three types of areas, such as a broad-range artificial image area, a broad-range natural image area, and a broad-range mixture area containing artificial images and natural images, based on the broad-range artificial image boundary and the broad-range natural image boundary. In FIG. 32, the broad-range artificial image boundary and the broad-range natural image boundary are represented by L1 and L2, respectively. The curves L1 and L2 are thus referred to as the "broad-range artificial image boundary L1" and the "broad-range natural image boundary L2", respectively. In FIG. 32, the area above the broad-range artificial image boundary L1 is the broad-range artificial image area, the area between the broad-range artificial image boundary L1 and the broad-range natural image boundary L2 is the broad-range mixture area, and the area below the broad-range natural image boundary L2 is the broad-range natural image area.

In step S894, the broad-range boundary comparator 952 determines whether the position at which the BEP and BFP of the subject pixel are plotted is contained in the broad-range artificial image area. For example, if the position at which the BEP and BFP of the subject pixel are plotted is position B1 in FIG. 32, the process proceeds to step S895. In step S895, the broad-range boundary comparator 952 supplies information that the subject pixel belongs to the broad-range artificial image area to the dividing point calculator 954.

Upon receiving this information, in step S896, the dividing point calculator 954 sets the broad-range degree of artificiality $Art_b$ to 1 and supplies $Art_b$ to the degree-of-artificiality generator 913. The process then proceeds to step S902.

If the position at which the BEP and BFP of the subject pixel are plotted is, for example, position B2 or B3, instead of position B1, the broad-range boundary comparator 952 determines in step S894 that the subject pixel does not belong to the broad-range artificial image area. The process then proceeds to step S897.

The broad-range boundary comparator 952 determines in step S897 whether the position at which the BEP and BFP of the subject pixel are plotted is contained in the broad-range natural image area. If the position at which the BEP and BFP of the subject pixel are plotted is position B3 in FIG. 32, the broad-range boundary comparator 952 determines in step S897 that the subject pixel belongs to the broad-range natural image. Then, in step S898, the broad-range boundary comparator 952 supplies information that the subject pixel belongs to the broad-range natural image area to the dividing point calculator 954.

Upon receiving this information, in step S899, the dividing point calculator 954 sets the broad-range degree of artificiality $Art_b$ to be 0, and supplies $Art_b$ to the degree-of-artificiality generator 913. The process then proceeds to step S902.

If the position at which the BEP and BFP of the subject pixel are plotted is, for example, position B2 instead of position B3, the broad-range boundary comparator 952 determines in step S897 that the subject pixel belongs to neither of the broad-range artificial image area nor the broad-range natural image area. The process then proceeds to step S900.

In step S900, the broad-range boundary comparator 952 supplies information that the subject pixel belongs to the broad-range mixture area and information concerning the dividing point ratio of the distance to the broad-range artificial image boundary L1 to the distance to the broad-range natural image boundary L2 to the dividing point calculator 954. That is, at position B2 in FIG. 32, the ratio of the distance to the broad-range artificial image boundary L1 to the distance to the broad-range natural image boundary L2 is 1−q:q. Accordingly, the information concerning the dividing point ratio 1−q:q is supplied to the dividing point calculator 954.

Upon receiving the information that the broad-range feature of the subject pixel belongs to the broad-range mixture area and the information concerning the dividing point ratio from the broad-range boundary comparator 952, in step S901, the dividing point calculator 954 sets the dividing point ratio q as the broad-range degree of artificiality $Art_b$, and supplies $Art_b$ to the degree-of-artificiality generator 913.

In step S902, the broad-range boundary comparator 952 checks for an unprocessed pixel, i.e., whether a determination as to whether the broad-range feature of an unprocessed pixel belongs to the broad-range artificial image area, the broad-range natural image area, or the broad-range mixture area has been made to determine the broad-range degree of artificiality. If it is found in step S902 that the broad-range degrees of artificiality have not been determined for all the pixels, the process returns to step S893.

If it is found in step S902 that the broad-range degrees of artificiality $Art_b$ have been determined for all the pixels, the broad-range degree-of-artificiality calculation processing is completed.

According to the above-described processing, the BEPs and BFPs representing the broad-range features are read out for all the pixels and are plotted in the BEP-BFP space. Then, the position at which the BEP and BFP of a subject pixel are plotted is compared with the broad-range artificial image boundary and the broad-range natural image boundary that are statistically determined from the distribution of a plurality of artificial images and natural images. Based on the positional relationship of the plotted position to the broad-range artificial image boundary and the broad-range natural image boundary, the broad-range degree of artificiality $Art_b$ is calculated. In the above-described example, when the subject pixel is contained in the broad-range mixture area, the dividing point ratio q is set as the degree of artificiality $Art_b$. However, since it is sufficient if the dividing point ratio reflects the characteristic of the broad-range degree of artificiality $Art_b$, $q^2$ or $\sqrt{q}$ may be used as the degree of artificiality $Art_b$.

After the broad-range degree-of-artificiality processing is completed, the process returns to step S835 in FIG. 25.

In step S835, the PNDP extracting portion 971 of the narrow-range feature extracting portion 912 performs PNDP processing to extract the PNDP for each pixel from an HD image supplied from the output phase converter 112, and supplies the extracted PNDP to the feature synthesizer 933.

Figure 23:
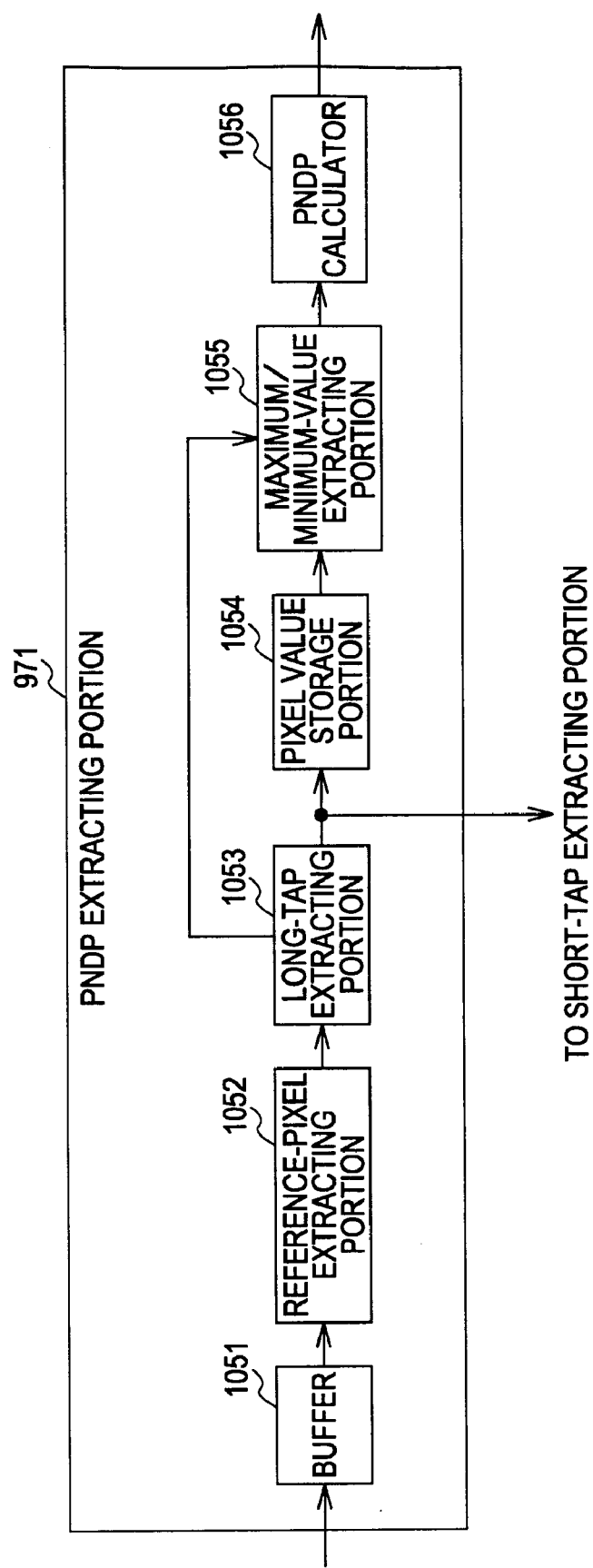
FIG. 23 is a block diagram illustrating an example of the configuration of a (primary narrow discrimination parameter (PNDP) extracting portion.
Figure 33:
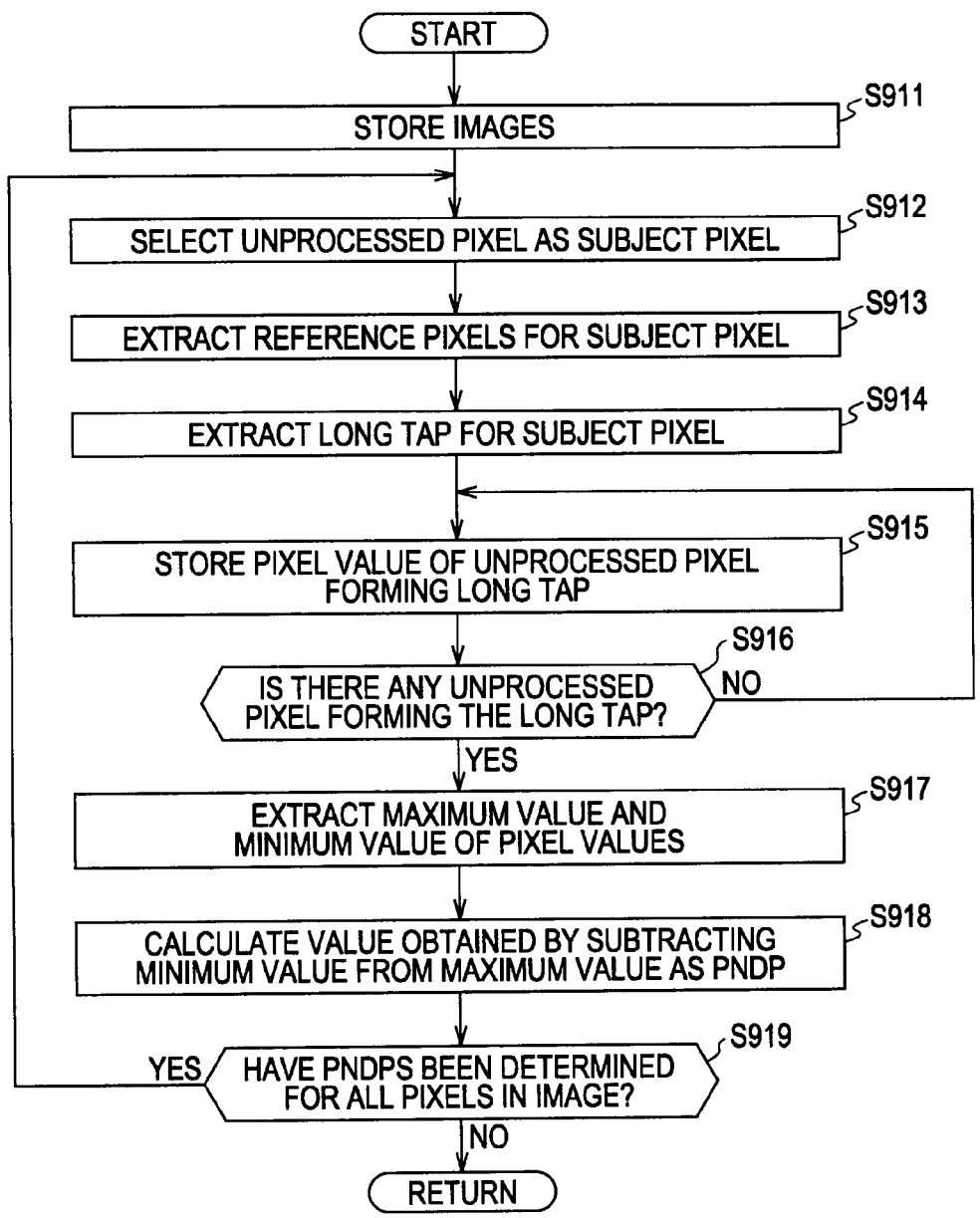
FIG. 33 is a flowchart illustrating PNDP extraction processing performed by the PNDP extracting portion shown in FIG. 23.

The PNDP extraction processing performed by the PDNP extracting portion 971 shown in FIG. 23 is described below with reference to the flowchart in FIG. 33.

In step S911, the buffer 1051 temporarily stores HD images supplied from the output phase converter 112.

In step S912, the reference-pixel extracting portion 1052 selects an unprocessed pixel as the subject pixel. In step S913, the reference-pixel extracting portion 1052 reads out the reference pixels set for the subject pixel and supplies the reference pixels to the long-tap extracting portion 1053.

Figure 34:
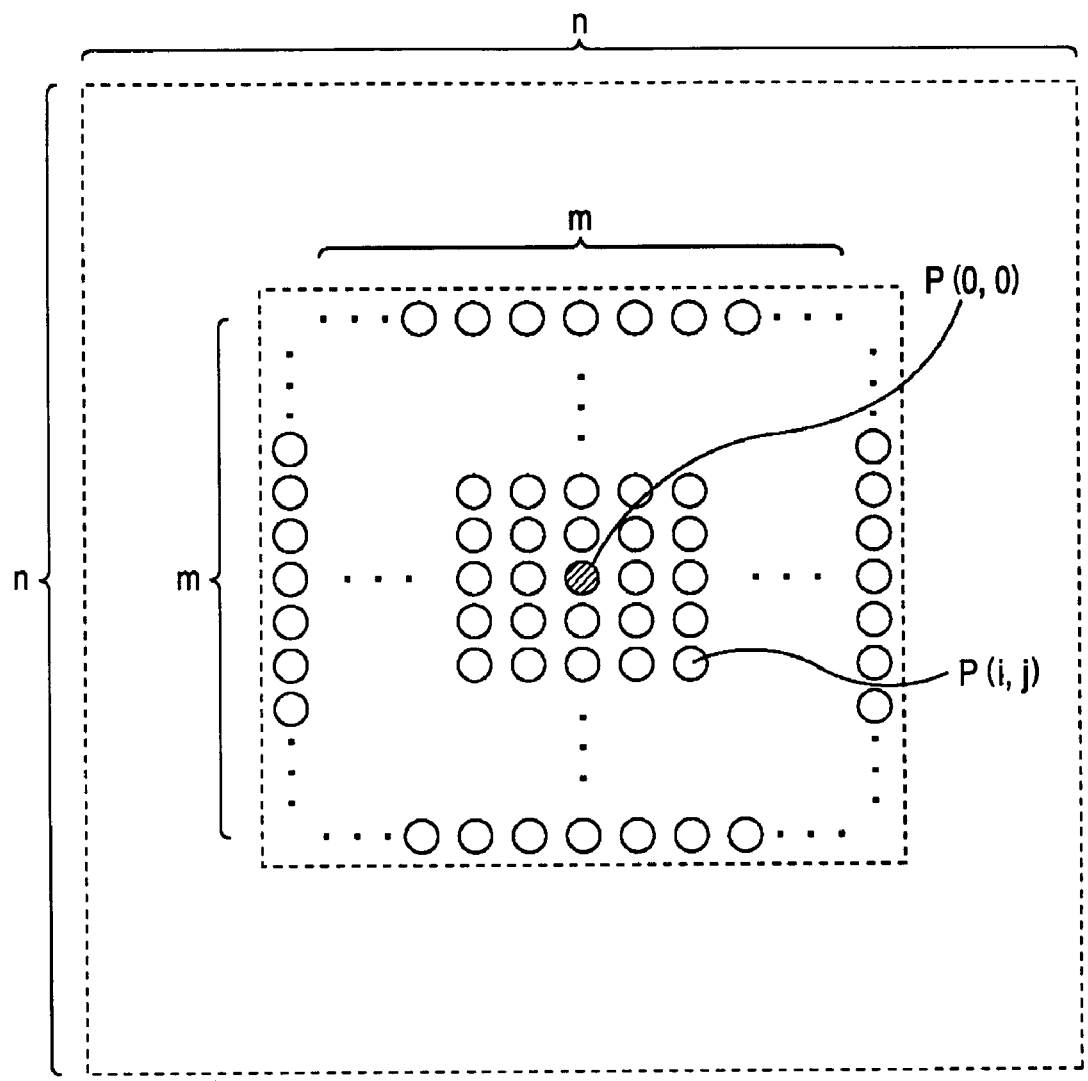
FIG. 34 illustrates a long tap.

In step S914, the long-tap extracting portion 1053 extracts a long tap from the reference pixels. In step S915, the long-tap extracting portion 1053 stores a pixel value forming the long tap in the pixel-value storage portion 1054, and also supplies the pixel value forming the long tap to the SNDP extracting portion 972. The long tap includes pixels contained in a predetermined area set for the subject pixel and contained in the reference pixels, e.g., m×m pixels around the subject pixel, as shown in FIG. 34. In FIG. 34, an n-pixel×n-pixel area (n>m) indicates a reference pixel range. In FIG. 34, the pixels P(i,j) forming the long tap are indicated by the white circles on the two-dimensional coordinates in the x direction and in the y direction around the subject pixel P(0,0) indicated by the hatched portion in the image. The pixels P(i,j) contained in the area surrounded by the broken lines (m×m) around the subject pixel Q(0,0) forming the long tap can be represented by −(m−1)/2≦i≦(m−1)/2, −(m−1)/2≦j≦(m−1)/2, where i and j are integers.

In step S916, the pixel value storage portion 1054 checks for an unprocessed pixel forming the long tap. If an unprocessed pixel forming the long tap is found in step S916, the process returns to step S915. That is, steps S915 and S916 are repeated until all the pixel values forming the long tap are processed.

If it is found in step S916 that there is no unprocessed pixel forming the long tap, i.e., that all the pixel values of the long tap have been extracted and stored in the pixel-value storage portion 1054, the process proceeds to step S917. In step S917, the pixel-value extracting portion 1054 supplies information that all the pixels forming the long tap have been processed to the maximum/minimum-value extracting portion 1055. Upon receiving this information, the maximum/minimum-value extracting portion 1055 extracts the maximum value and the minimum value from the pixel values stored in the pixel-value storage portion 1054, and supplies the maximum and minimum values to the PNDP calculator 1056.

In step S918, the PNDP calculator 1056 calculates, as the PNDP for the subject pixel, the pixel-value dynamic range of the long tap obtained by subtracting the minimum value from the maximum value supplied from the maximum/minimum-value extracting portion 1055, and supplies the PNDP to the feature synthesizer 933.

In step S919, the reference-pixel extracting portion 1052 determines whether the PNDPs have been calculated for all the pixels in the image stored in the buffer 1051. If it is found in step S919 that the PNDPs have not been calculated for all the pixels, the process returns to step S912. That is, steps S912 through S919 are repeated until the PNDPs have been determined for all the pixels. If it is found in step S919 that the PNDPs have been determined for all the pixels, the PNDP extraction processing is completed.

According to the above-described processing, the PNDP representing the feature of an edge in a narrow area of an image is determined. That is, the PNDP represents the dynamic range of the pixel values forming a long tap set for the subject pixel. Accordingly, the PNDP becomes greater if there is an edge in a narrow area containing the subject pixel, and conversely, the PNDP becomes smaller if there is no edge.

After the PNDP extraction processing, the process returns to step S836 in FIG. 25.

In step S836, the SNDP extracting portion 972 of the narrow-range feature extracting portion 914 performs SNDP extraction processing to extract an SNDP for each pixel from an HD image supplied from the output phase converter 112, and supplies the extracted SNDP to the feature synthesizer 933.

Figure 24:
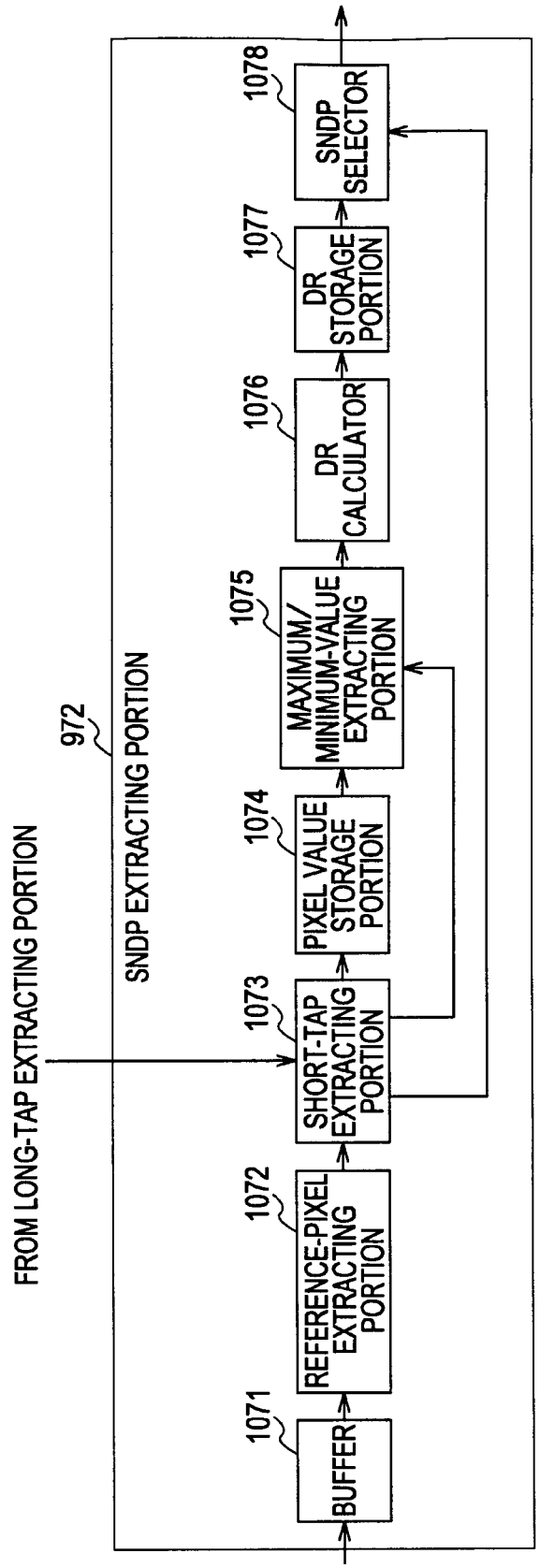
FIG. 24 is a block diagram illustrating an example of the configuration of a secondary narrow discrimination parameter (SNDP) extracting portion.
Figure 35:
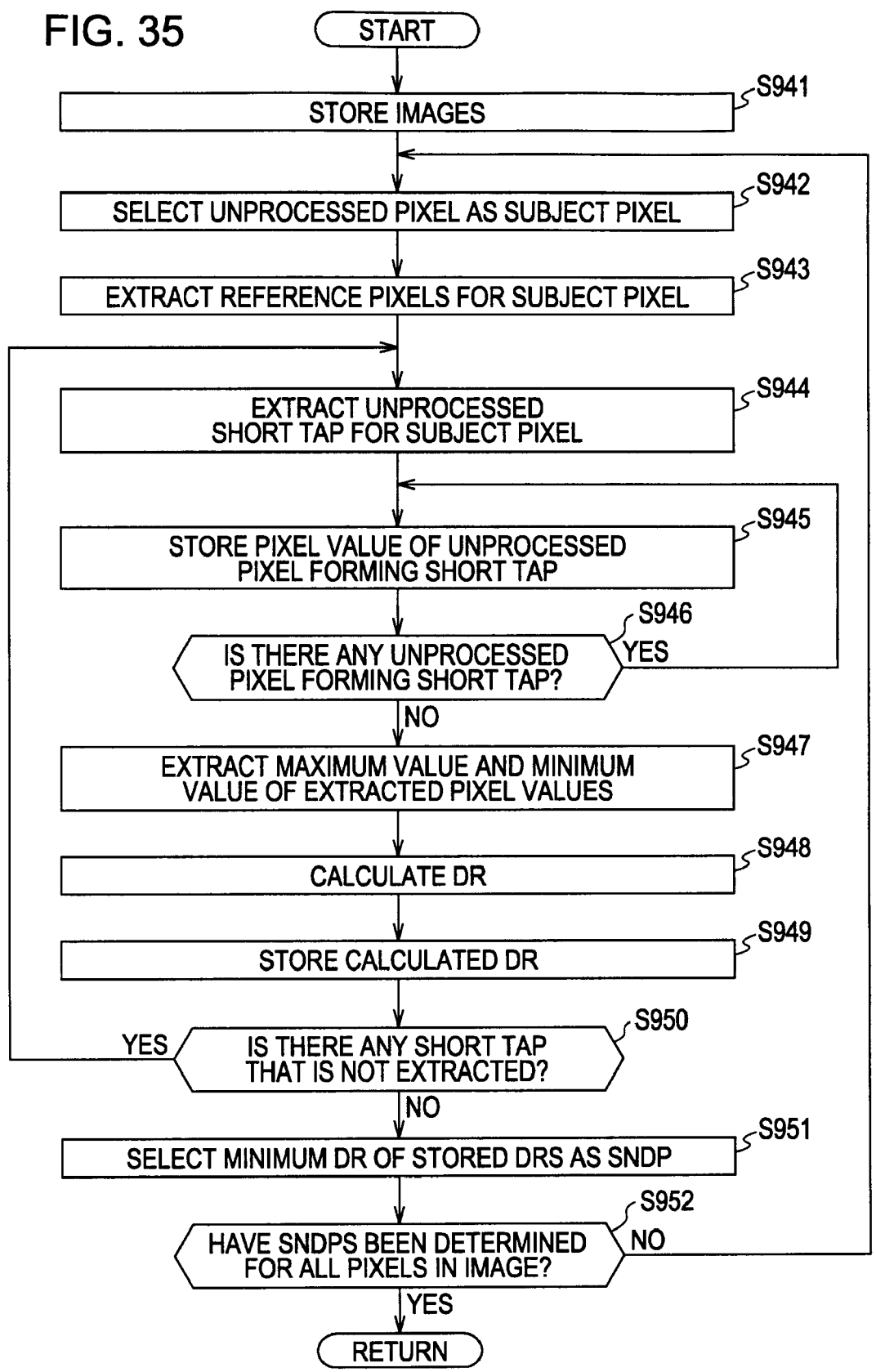
FIG. 35 is a flowchart illustrating SNDP extraction processing performed by the SNDP extracting portion shown in FIG. 24.

The SNDP extraction processing performed by the SNDP extracting portion 972 shown in FIG. 24 is discussed below with reference to the flowchart in FIG. 35.

In step S941, the buffer 1071 temporarily stores HD images supplied from the output phase converter 112.

In step S942, the reference-pixel extracting portion 1072 selects an unprocessed pixel from the buffer 1051 as the subject pixel. In step S943, the reference-pixel extracting portion 1072 reads out reference pixels set for the subject pixel and supplies the reference pixels to the short-tap extracting portion 1073.

Figure 36:
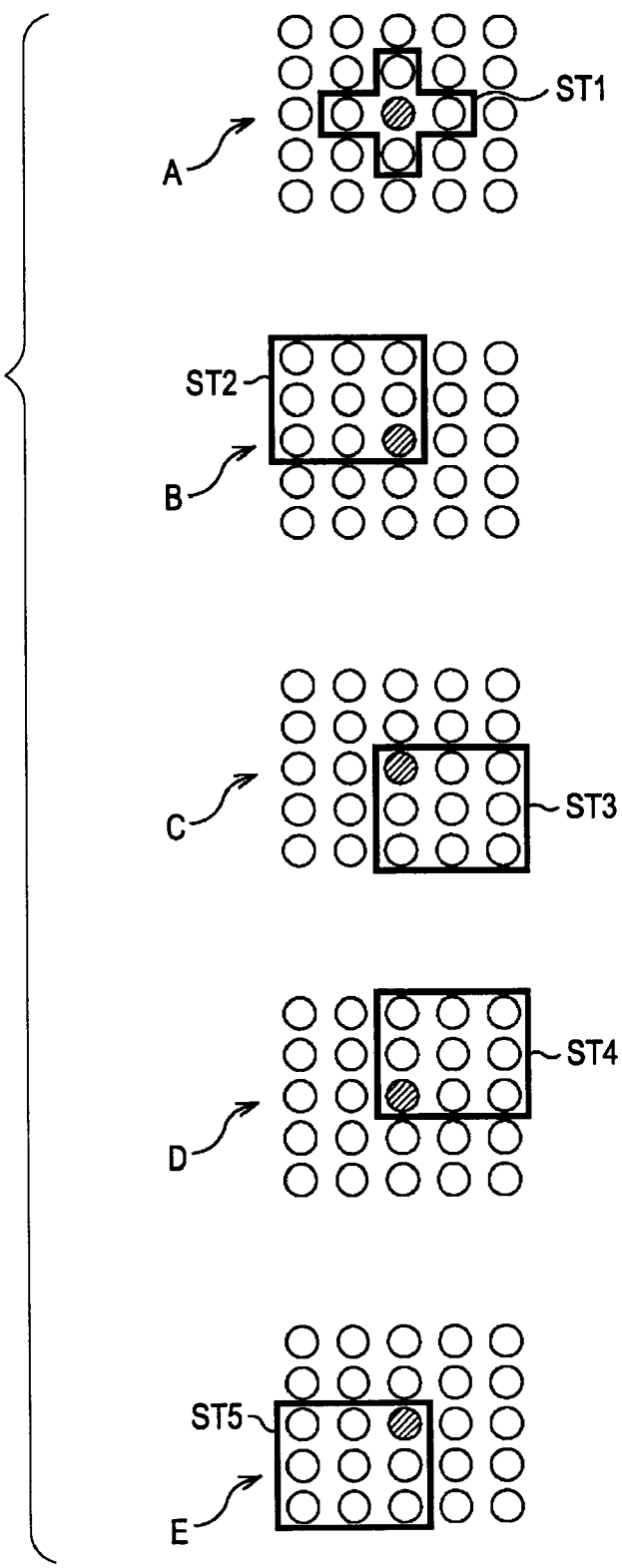
FIG. 36 illustrates short taps.

In step S944, the short-tap extracting portion 1073 extracts a short tap from the reference pixels on the basis of the reference pixels and the information concerning the long tap supplied from the PNDP extracting portion 971. The short tap includes a plurality of pixels contained in the long tap and including the subject pixel, for example, pixels within a predetermined area which is set for the subject pixel and which is contained in the long tap of the reference pixels. For example, the short tap may be a short tap ST1, as indicated by pattern A in FIG. 36, including a total of five pixels composed of a subject pixel and four pixels adjacent to the subject pixel in the horizontal and vertical direction. The short tap may be a short tap ST2, as indicated by pattern B in FIG. 36, including a total of nine (3×3) pixels composed of the subject pixel at the bottom right and eight pixels, or may be a short tap ST3, as indicated by pattern C in FIG. 36, including nine (3×3) pixels composed of the subject pixel at the top left and eight pixels. Alternatively, the short tap may be a short tap ST3, as indicated by pattern D in FIG. 36, including nine (3×3) pixels composed of the subject pixel at the bottom left and eight pixels, or may be a short tap ST5, as indicated by pattern E in FIG. 36, including nine (3×3) pixels composed of the subject pixel at the top right and eight pixels. A plurality of patterns of short taps are referred to as a "short tap set". Accordingly, if short taps ST1 through ST5 shown in FIG. 36 are used, it means that a short tap set including five patterns of short taps is formed. In FIG. 36, the circles indicate pixels among which the circles indicated by the hatched portions represent the subject pixels. The pixels surrounded by the solid lines designate the pixels forming the short taps.

In step S945, the short-tap extracting portion 1073 extracts the pixel value of an unprocessed pixel forming a short tap and stores the extracted pixel value in the pixel value storage portion 1074.

In step S946, the short-tap extracting portion 1073 checks for an unprocessed pixel forming the short tap. If there is an unprocessed pixel forming the short tap, the process returns to step S945. That is, steps S945 and S946 are repeated for all the pixels contained in the short tap.

If it is found in step S946 that there is no unprocessed pixel forming the short tap, i.e., that the pixel values of all the pixels forming one short tap are stored in the pixel value storage portion 1074, the process proceeds to step S947. In step S947, the pixel value extracting portion 1072 supplies information that the pixel values of all the pixels forming the short tap have been stored to the maximum/minimum-value extracting portion 1075. The maximum/minimum-value extracting portion 1075 extracts the maximum value and the minimum value of the pixel values of the short tap stored in the pixel value storage portion 1074, and supplies the maximum and minimum values to the DR calculator 1076.

In step S948, the DR calculator 1076 subtracts the minimum value from the maximum value supplied from the maximum/minimum-value extracting portion 1075 to calculate the dynamic range of the pixel values of the short tap as the pixel value DR for the subject pixel. In step S949, the DR calculator 1076 stores the calculated pixel value DR in the DR storage portion 1077.

In step S950, the short-tap extracting portion 1073 checks for an unprocessed short tap. If there is an unprocessed short tap, the process returns to step S944. That is, steps S944 through S950 are repeated until DRs have been calculated for all the short taps forming the short tap set. Accordingly, for example, if the short tap set includes five patterns, as shown in FIG. 36, steps S944 through S950 are repeated for five times.

If it is determined in step S950 that all the short taps have been extracted, i.e., that DRs have been calculated for all the short taps, the process proceeds to step S951. In step S951, the short-tap extracting portion 1073 supplies information that DRs have been calculated for all the short taps to the SNDP selector 1078. The SNDP selector 1078 compares the DRs of the short taps stored in the DR storage portion 1077 with each other to select the minimum DR as the SNDP and supplies the SNDP to the feature synthesizer 973.

In step S952, the reference-pixel extracting portion 1072 determines whether SNDPs have been calculated for all the pixels in the image stored in the buffer 1071. If it is found in step S952 that SNDPs have not been calculated for all the pixels, the process returns to step S942. That is, steps S942 through S952 are repeated until SNDPs have been determined for all the pixels of the image stored in the buffer 1071. If it is determined in step S952 that SNDPs have been calculated for all the pixels, the SNDP extraction processing is completed.

According to the above-described processing, the SNDP, which is the feature representing the flatness of a flat portion in a narrow range of an image, is determined for each pixel forming the image. That is, the SNDP, which is the minimum DR of the pixel value DRs of a plurality of short taps contained in a long tap for a subject pixel, represents the flatness of the most flat portion of the short taps contained in the long tap. Accordingly, the SNDP becomes smaller if the flat portion contained in a narrow area including the subject pixel is more flat, and conversely, the SNDP becomes greater if the flat portion is less flat.

After the SNDP extraction processing, the process returns to step S837 in FIG. 25.

In step S837, the feature synthesizer 973 combines the PNDP supplied from the PNDP extracting portion 971 with the SNDP supplied from the SNDP extracting portion 972 and supplies the resulting synthesized value to the narrow-range degree-of-artificiality calculator 915 as the narrow-range feature.

In step S838, the narrow-range degree-of-artificiality calculator 915 performs narrow-range degree-of-artificiality calculation processing on the basis of the narrow-range feature supplied from the narrow-range feature extracting portion 914 to calculate the narrow-range degree of artificiality $Art_n$, and supplies $Art_n$ to the degree-of-artificiality generator 913.

Figure 37:
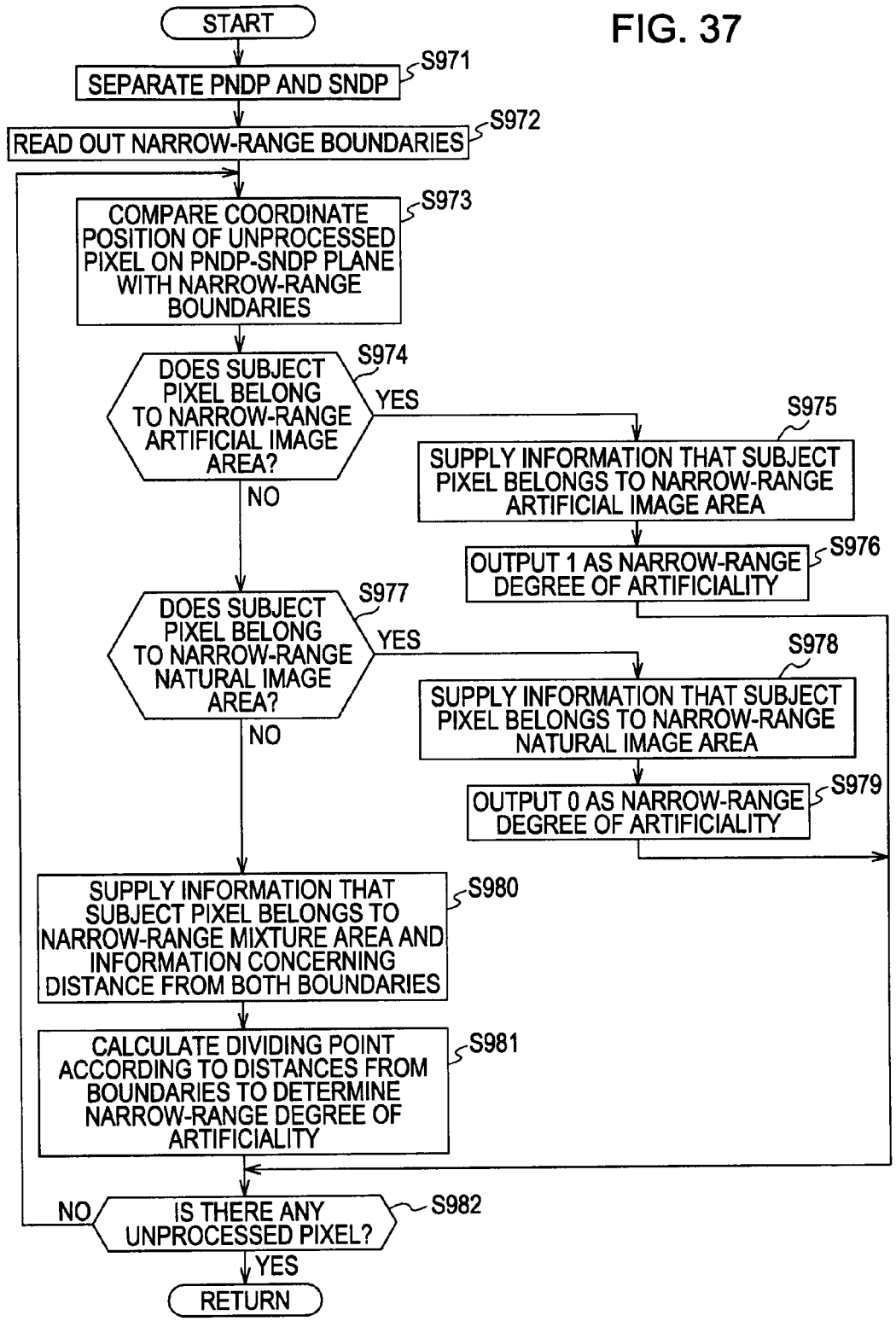
FIG. 37 is a flowchart illustrating narrow-range degree-of artificiality calculation processing.

The narrow-range degree-of-artificiality calculation processing performed by the narrow-range degree-of-artificiality calculator 915 is discussed below with reference to the flowchart in FIG. 37.

In step S971, the feature separator 991 obtains a narrow-range feature supplied from the narrow-range feature extracting portion 914 to separate the PNDP and SNDP and supplies the separated PDNP and SNDP to the narrow-range boundary comparator 992.

In step S972, the narrow-range boundary comparator 992 reads out information concerning the narrow-range boundaries from the narrow-range boundary memory 993.

In step S973, the narrow-range boundary comparator 992 selects an unprocessed pixel as the subject pixel and extracts the PNDP and SNDP of the subject pixel to plot the extracted PNDP and SNDP on the two-dimensional PNDP-SNDP plane. The narrow-range boundary comparator 992 also compares the position at which the PNDP and SNDP are plotted with the read narrow-range boundaries.

Figure 38:
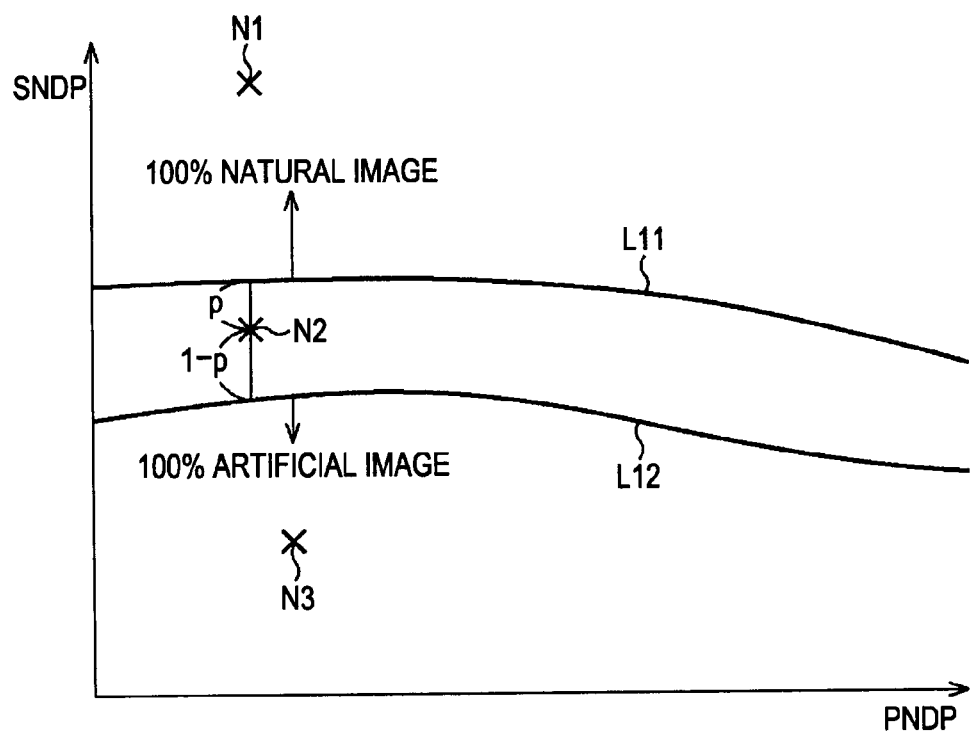
FIG. 38 illustrates narrow-range boundaries.

The narrow-range boundaries are boundaries that can be generated from a statistical distribution obtained by plotting the PNDPs and SNDPs extracted from a plurality of artificial images and natural images on the two-dimensional (PNDP, SNDP) space on the PDNP axis and the SNDP axis. The narrow-range boundaries include two types of boundaries such as a narrow-range artificial image boundary and a narrow-range natural image boundary. The narrow-range artificial image boundary is a boundary between an area where only narrow-range features of artificial images are plotted and an area where narrow-range features of both the artificial images and natural images are plotted. The narrow-range natural image boundary is a boundary between an area where only narrow-range features of natural images are plotted and an area where narrow-range features of both the artificial images and natural images are plotted. Accordingly, the two-dimensional PNDP-SNDP area can be divided, as shown in FIG. 38, into three types of areas, such as a narrow-range artificial image area, a narrow-range natural image area, and a narrow-range mixture area containing artificial images and natural images, based on the narrow-range artificial image boundary and the narrow-range natural image boundary. In FIG. 38, the narrow-range artificial image boundary and the narrow-range natural image boundary are represented by L11 and L12, respectively. The curves L11 and L12 are thus referred to as the "narrow-range natural image boundary L11" and the "narrow-range artificial image boundary L12", respectively. In FIG. 38, the area above the narrow-range natural image boundary L11 is the narrow-range natural image area, the area between the narrow-range natural image boundary L11 and the narrow-range artificial image boundary L12 is the narrow-range mixture area, and the area below the narrow-range artificial image boundary L12 is the narrow-range artificial image area.

In step S974, the narrow-range boundary comparator 992 determines whether the position at which the PNDP and SNDP of the subject pixel are plotted is contained in the narrow-range artificial image area. For example, if the position at which the PNDP and SNDP of the subject pixel are plotted is position N3 in FIG. 38, the process proceeds to step S975. In step S975, the narrow-range boundary comparator 992 supplies information that the subject pixel belongs to the narrow-range artificial image area to the dividing point calculator 994.

Upon receiving this information, in step S976, the dividing point calculator 994 sets the narrow-range degree of artificiality $Art_n$ to 1 and supplies $Art_n$ to the degree-of-artificiality generator 913. The process then proceeds to step S982.

If the position at which the PNDP and SNDP of the subject pixel are plotted is, for example, position N2 or N1, instead of position N3, the narrow-range boundary comparator 992 determines in step S974 that the subject pixel does not belong to the narrow-range artificial image area. The process then proceeds to step S977.

The narrow-range boundary comparator 992 determines in step S977 whether the position at which the PNDP and SNDP of the subject pixel are plotted is contained in the narrow-range natural image area. If the position at which the PNDP and SNDP of the subject pixel are plotted is position N1 in FIG. 38, the narrow-range boundary comparator 992 determines in step S977 that the subject pixel belongs to the narrow-range natural image. Then, in step S978, the narrow-range boundary comparator 992 supplies information that the subject pixel belongs to the narrow-range natural image area to the dividing point calculator 994.

Upon receiving this information, in step S979, the dividing point calculator 994 sets the narrow-range degree of artificiality $Art_n$ to be 0, and supplies $Art_n$ to the degree-of-artificiality generator 913. The process then proceeds to step S982.

If the position at which the PNDP and SNDP of the subject pixel are plotted is, for example, position N2 instead of position N1, the narrow-range boundary comparator 992 determines in step S977 that the subject pixel belongs to neither of the narrow-range artificial image area nor the narrow-range natural image area. The process then proceeds to step S980.

In step S980, the narrow-range boundary comparator 992 supplies information that the subject pixel belongs to the narrow-range mixture area and information concerning the dividing point ratio of the distance to the narrow-range artificial image boundary L11 to the distance to the narrow-range natural image boundary L12 to the dividing point calculator 994. That is, at position N2 in FIG. 38, the ratio of the distance to the narrow-range natural image boundary L11 to the distance to the narrow-range artificial image boundary L12 is p:1−p. Accordingly, the information concerning the dividing point ratio p:1−p is supplied to the dividing point calculator 994.

Upon receiving the information that the subject pixel belongs to the narrow-range mixture area and the information concerning the dividing point ratio from the narrow-range boundary comparator 992, in step S981, the dividing point calculator 994 sets the dividing point ratio p as the narrow-range degree of artificiality $Art_n$, and supplies $Art_n$ to the degree-of-artificiality generator 913.

In step S982, the narrow-range boundary comparator 992 checks for an unprocessed pixel, i.e., whether a determination as to whether the narrow-range feature of an unprocessed pixel belongs to the narrow-range artificial image area, the narrow-range natural image area, or the narrow-range mixture area has been made to determine the narrow-range degree of artificiality. If it is found in step S982 that the narrow-range degrees of artificiality have not been determined for all the pixels, the process returns to step S973.

If it is found in step S982 that the narrow-range degrees of artificiality $Art_n$ have been determined for all the pixels, the narrow-range degree-of-artificiality calculation processing is completed.

According to the above-described processing, the PNDPs and SNDPs representing the narrow-range features are read out for all the pixels and are plotted in the PNDP-SNDP space. Then, the position at which the PNDP and SNDP of a subject pixel are plotted is compared with the narrow-range artificial image boundary and the narrow-range natural image boundary that are statistically determined from the distribution of a plurality of artificial images and natural images. Based on the positional relationship of the plotted position to the narrow-range artificial image boundary and the narrow-range natural image boundary, the narrow-range degree of artificiality $Art_n$ is calculated. In the above-described example, when the subject pixel is contained in the narrow-range mixture area, the dividing point ratio p is set as the degree of artificiality $Art_n$. However, since it is sufficient if the dividing point ratio reflects the characteristic of the narrow-range degree of artificiality $Art_n$, $p^2$ or $\sqrt{p}$ may be used as the degree of artificiality $Art_n$.

After the narrow-range degree-of-artificiality calculation processing, the process returns to step S839 in FIG. 25.

In step S839, the degree-of-artificiality generator 913 calculates the following equation based on the broad-range degree of artificiality $Art_b$ supplied from the broad-range degree-of-artificiality calculator 912 and the narrow-range degree of artificiality $Art_n$ supplied from the narrow-range degree-of-artificiality calculator 915 to generate the degree of artificiality Art, and supplies Art to the image processor 113:

$$Art = \alpha \cdot Art_n + \beta \cdot Art_b + \gamma \cdot Art_n Art_b \quad (19)$$

where α, β, and γ are constants. The degree of artificiality is set, assuming that 0≦Art≦1. Accordingly, if the degree of artificiality Art is found to be greater than 1, the degree-of-artificiality generator 913 clips the degree of artificiality Art to be 1 and supplies Art to the image processor 113.

Figure 2:
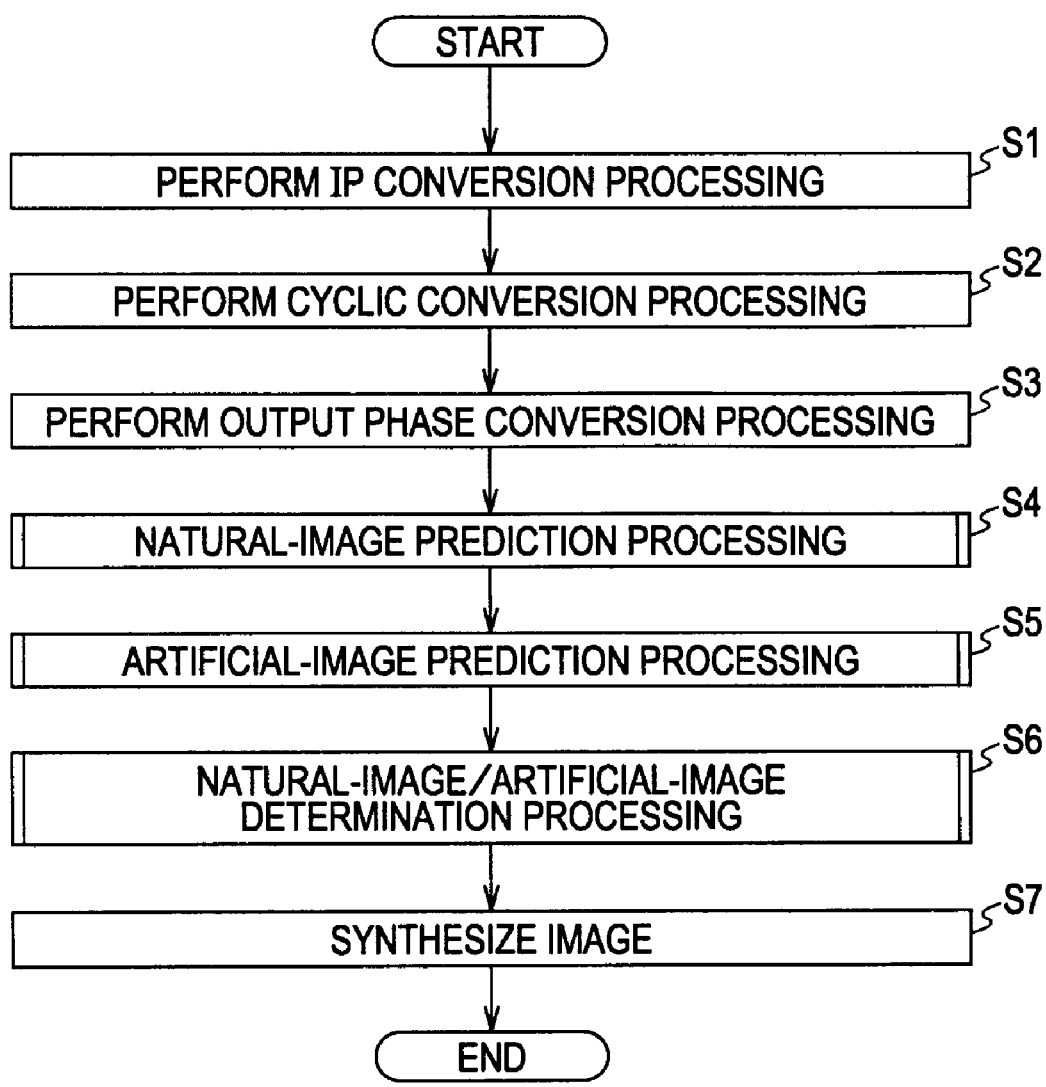
FIG. 2 is a flowchart illustrating image conversion processing performed by the image conversion device shown in FIG. 1.

According to the above-described processing, in step S7 in FIG. 2, the synthesizer 133 calculates the following equation to combine the pixel values of the pixels forming the high-quality natural image supplied from the natural-image prediction unit 131 with those forming the high-quality artificial image supplied from the artificial-image prediction unit 132 in accordance with the degree of artificiality:

$$Pix = Pix_{art} \cdot Art + Pix_{nat} \cdot (1 - Art) \quad (20)$$

where Pix indicates the pixel value of each pixel forming the final high-quality image; $Pix_{nat}$ designates the natural image supplied from the natural-image prediction unit 131; $Pix_{art}$ represents the artificial image supplied from the artificial-image prediction unit 132; and Art represents the coefficient of the degree of artificiality.

According to the foregoing description, pixels subjected to image processing as an artificial image and pixels subjected to image processing as a natural image are combined in accordance with the degrees of artificiality. Thus, it is possible to individually perform optimal processing on an area of natural image components and an area of artificial image components by distinguishing the two areas from each other.

As in the BEP extraction processing discussed with reference to the flowchart in FIG. 26, the difference between the maximum value and the minimum value of the differences between a subject pixel and reference pixels is determined as the difference dynamic range of the subject pixel. It is sufficient, however, if a portion where the pixel value of reference pixels changes sharply is determined. Accordingly, instead of the difference dynamic range, the dynamic range of the pixel values of pixels contained in a reference pixel area may be determined. If the pixel-value dynamic range is used as the BEP, the BEP value may change greatly depending on whether there is a reference pixel contained in an edge at or near a boundary of a reference pixel area. As stated above, therefore, the difference dynamic range obtained by applying a weight to the difference between a subject pixel and a reference pixel according to the distance therebetween may preferably be used.

To determine the BEPs, the difference absolute values between the pixel values of adjacent pixels for all the reference pixels may be rearranged in ascending order, and then, higher difference absolute values may be determined as the BEPs.

Figure 39:
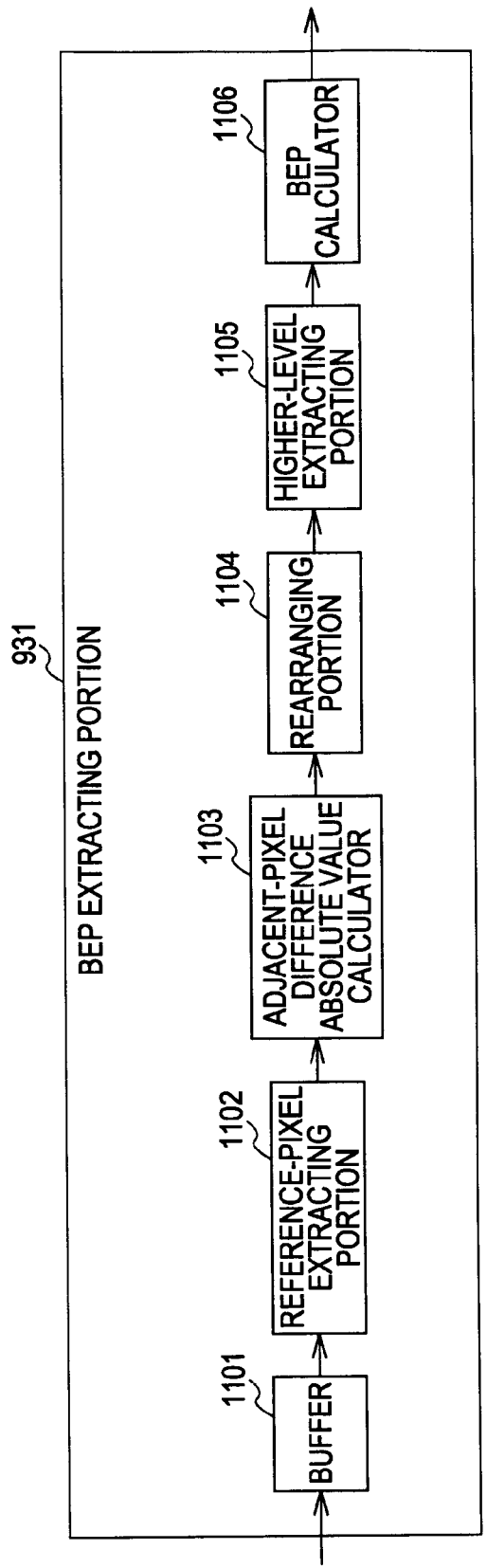
FIG. 39 is a block diagram illustrating another example of the configuration of a BEP extracting portion.

FIG. 39 illustrates the configuration of a BEP extracting portion that determines BEPs in this manner.

The BEP extracting portion 931 shown in FIG. 39 includes a buffer 1101, a reference-pixel extracting portion 1102, an adjacent-pixel difference absolute value calculator 1103, a rearranging portion 1104, a higher-level extracting portion 1105, an a BEP calculator 1106.

The buffer 1101, which is basically similar to the buffer 1011 shown in FIG. 21, temporarily stores HD images supplied from the output phase converter 112 and supplies an HD image to the reference-pixel extracting portion 1102 if necessary. The reference-pixel extracting portion 1102, which is basically similar to the reference-pixel extracting portion 1021 shown in FIG. 21, sequentially reads out reference pixels for each subject pixel and supplies the reference pixels to the adjacent-pixel difference absolute value calculator 1103.

The adjacent-pixel difference absolute value calculator 1103 determines the difference absolute values of the pixel values between vertically and horizontally adjacent reference pixels, and supplies the calculated difference absolute values to the rearranging portion 1104. The rearranging portion 1104 rearranges the difference absolute values supplied from the adjacent-pixel difference absolute value calculator 1103 in ascending order, and supplies the rearranged difference absolute values to the higher-level extracting portion 1105.

The higher-level extracting portion 1105 extracts the higher N1-th through N2-th values based on information concerning the adjacent-pixel difference absolute values rearranged in ascending order supplied from the rearranging portion 1104, and supplies the extracted higher N1-th through N2-th values to the BEP calculator 1106. The BEP calculator 1106 determines the average of the higher N1-th through N2-th values as the BEP based on the information concerning the rearranged adjacent-pixel difference absolute values supplied from the higher-level extracting portion 1105, and supplies the BEP to the feature synthesizer 933.

Figure 40:
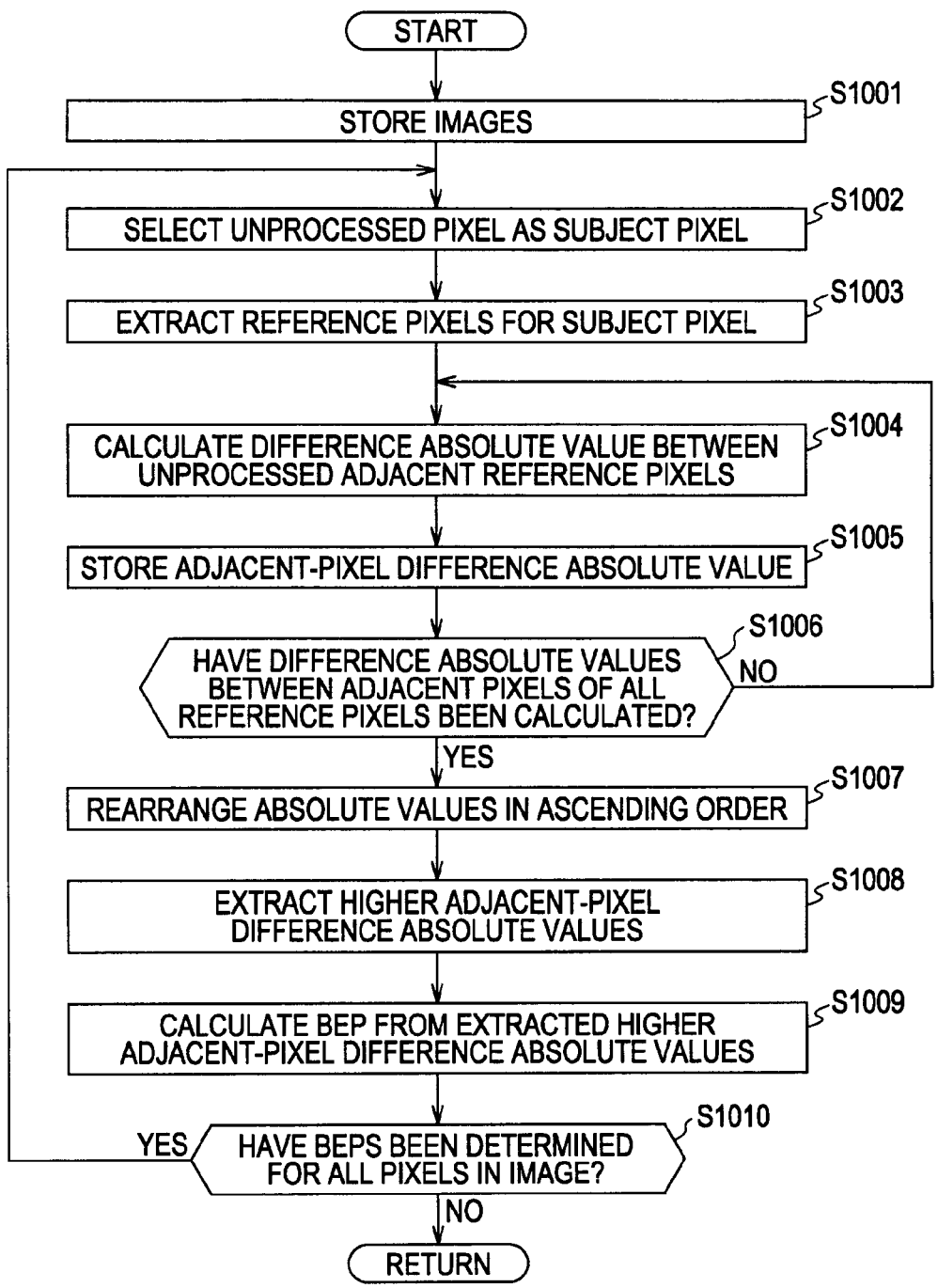
FIG. 40 is a flowchart illustrating BEP extraction processing performed by the BEP extracting portion shown in FIG. 39.

The BEP extraction processing performed by the BEP extracting portion 931 shown in FIG. 39 is described below with reference to the flowchart in FIG. 40.

In step S1001, the buffer 1101 temporarily stores HD images supplied from the output phase converter 112.

In step S1002, the reference-pixel extracting portion 1102 selects an unprocessed pixel from the buffer 1101 as the reference pixel. In step S1003, the reference-pixel extracting portion 1102 reads out reference pixels set for the subject pixel and supplies the reference pixels to the adjacent-pixel difference absolute value calculator 1103.

In step S1004, the adjacent-pixel difference absolute value calculator 1103 calculates the difference absolute value between unprocessed adjacent reference pixels (including the subject pixel), and supplies the calculated difference absolute value to the rearranging portion 1104.

In step S1005, the rearranging portion 1104 stores the adjacent-pixel difference pixel value supplied from the adjacent-pixel difference absolute value calculator 1103.

In step S1006, the adjacent-pixel difference absolute value calculator 1103 determines whether the difference absolute values between adjacent pixel values for all the reference pixels have been calculated. If it is determined in step S1006 that the difference absolute values have not been calculated for all the adjacent reference pixels, the process returns to step S1004.

Figure 41:
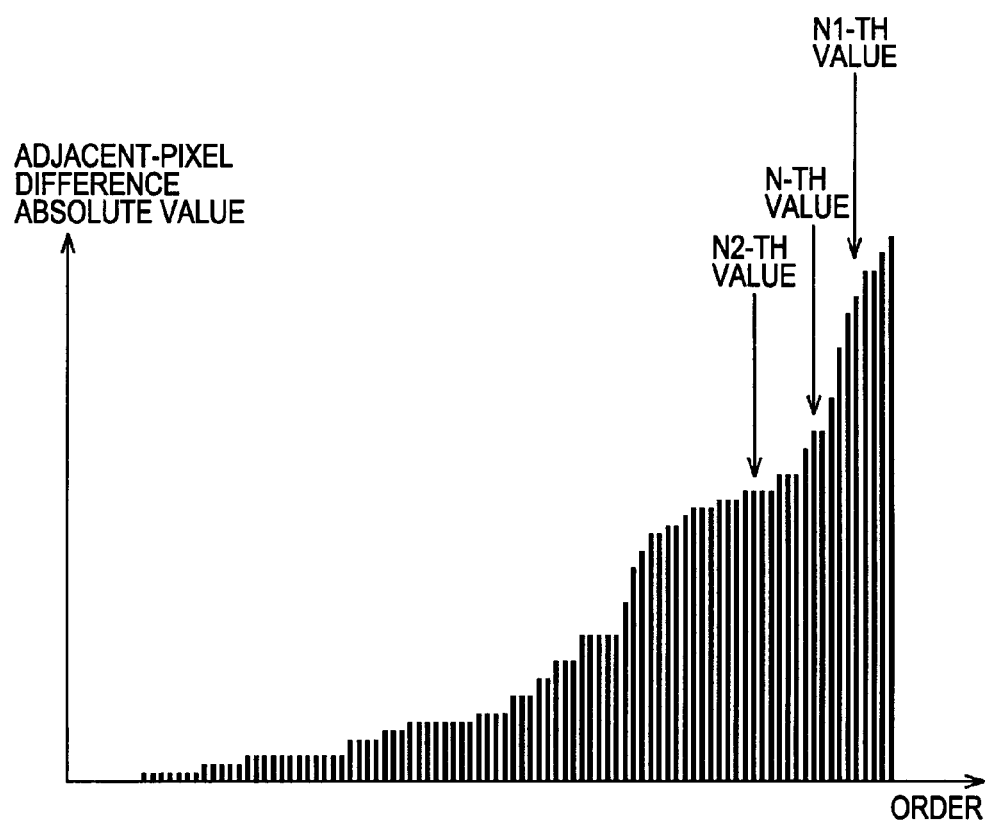
FIG. 41 illustrates BEP extraction processing performed by the BEP extracting portion shown in FIG. 39.

That is, steps S1004 through S1006 are repeated until the difference absolute values for all the adjacent reference pixels have been determined. If it is determined in step S1006 that the difference absolute values have been calculated for all the adjacent reference pixels, the process proceeds to step S1007. In step S1007, the rearranging portion 1104 rearranges the calculated adjacent-pixel difference absolute values in ascending order, and supplies the rearranged absolute values to the higher-level extracting portion 1105. For example, the rearranging portion 1104 rearranges the adjacent-pixel difference absolute values in ascending order, as shown in FIG. 41, and supplies the rearranged absolute values to the higher-level extracting portion 1105. In FIG. 41, the horizontal axis represents the order and the vertical axis indicates the adjacent-pixel difference absolute value.

In step S1008, the higher-level extracting portion 1105 extracts the higher N1-th through N2-th absolute values from the absolute values rearranged in ascending order, and supplies the higher N1-th through N2-th absolute values to the BEP calculator 1106. That is, in the case of FIG. 41, the higher N1-th through N2-th adjacent-pixel difference absolute values are extracted.

In step S1009, the BEP calculator 1106 calculates the average of the higher N1-th through N2-th adjacent-pixel difference absolute values as the BEP, and outputs the BEP to the feature synthesizer 933.

In step S1010, the reference-pixel extracting portion 1102 determines whether BEPs have been calculated for all the pixels of the image stored in the buffer 1101. If it is found in step S1010 that BEPs have not been calculated for all the pixels, the process returns to step S1002. That is, steps S1002 through S1010 are repeated until BEPs have been calculated for all the pixels. If it is found in step S1010 that BEPs have been determined for all the pixels, the BEP extraction processing is completed.

According to the above-described processing, the BEP representing the feature of an edge in a broad area of an image is determined. That is, the BEP is the average of the higher N1-th and N2-th adjacent-pixel difference absolute values, and a relatively large value of the adjacent-pixel difference absolute values of the reference pixels is extracted as the feature representing an edge in a broad range of the image.

In the above-described example, the average of the higher N1-th and N2-th absolute values is used as the BEP. It is sufficient, however, if the feature of a broad-range edge using adjacent-pixel difference absolute values of reference pixels is determined. Accordingly, instead of the average of higher absolute values, the product sum of weighted adjacent-pixel difference absolute values may be used. Alternatively, the N-th absolute value between the higher N1-th and N2-th absolute values may be directly used as the BEP, as shown in FIG. 41.

In the above-described example, as the BFP extraction processing discussed with reference to the flowchart in FIG. 28, the adjacent-pixel difference absolute value of each reference pixel is compared with the predetermined threshold th, and values larger than the threshold th are transformed into a predetermined value by a function, and the sum of the values of all the reference pixels is used as the BFP. It is sufficient, however, if a portion where the pixel value of the reference pixels changes very little is determined. Accordingly, the difference absolute values of adjacent reference pixels may be rearranged in ascending order, and the lower difference absolute values may be used as the BFP.

Figure 42:
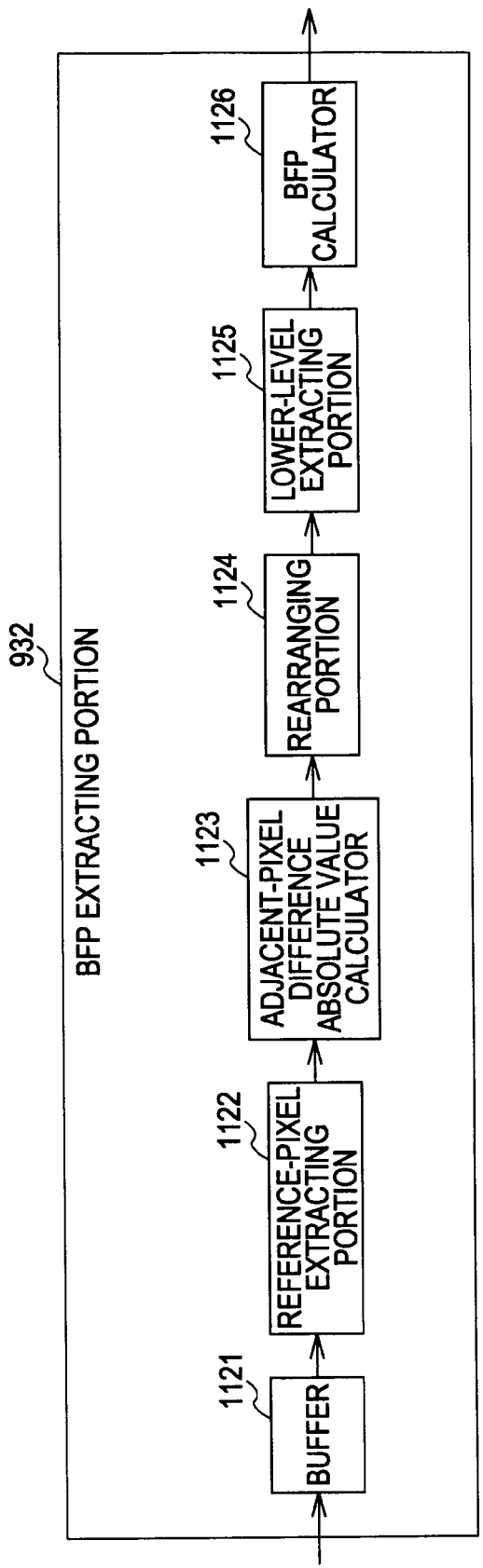
FIG. 42 is a block diagram illustrating another example of the configuration of the BFP extracting portion.

FIG. 42 illustrates the configuration of a BFP extraction portion that determines BFPs in this manner.

The BFP extracting portion 932 shown in FIG. 42 includes a buffer 1121, a reference-pixel extracting portion 1122, an adjacent-pixel difference absolute value calculator 1123, a rearranging portion 1124, a lower-level extracting portion 1125, and a BFP calculator 1126.

The buffer 1121, which is basically similar to the buffer 1031 shown in FIG. 22, temporarily stores HD images supplied from the output phase converter 112 and sequentially supplies the HD images to the reference-pixel extracting portion 1122 if necessary. The reference-pixel extracting portion 1122, which is basically similar to the reference-pixel extracting portion 1031 shown in FIG. 22, sequentially reads out reference pixels for each subject pixel and supplies the reference pixels to the adjacent-pixel difference absolute value calculator 1123.

The adjacent-pixel difference absolute value calculator 1123 determines the difference absolute values between vertically and horizontally adjacent reference pixels, and supplies the calculated difference absolute values to the rearranging portion 1124. The rearranging portion 1124 rearranges the difference absolute values supplied from the adjacent-pixel difference absolute value calculator 1123 in ascending order, and supplies the rearranged difference absolute values to the lower-level extracting portion 1125.

The lower-level extracting portion 1125 extracts the lower n1-th through n2-th values based on information concerning the adjacent-pixel difference absolute values rearranged in ascending order supplied from the rearranging portion 1104, and supplies the extracted lower n1-th through n2-th values to the BFP calculator 1126. The BFP calculator 1126 determines the average of the lower n1-th through n2-th values as the BFP based on the information concerning the rearranged adjacent-pixel difference absolute values supplied from the lower-level extracting portion 1125, and supplies the BFP to the feature synthesizer 933.

Figure 43:
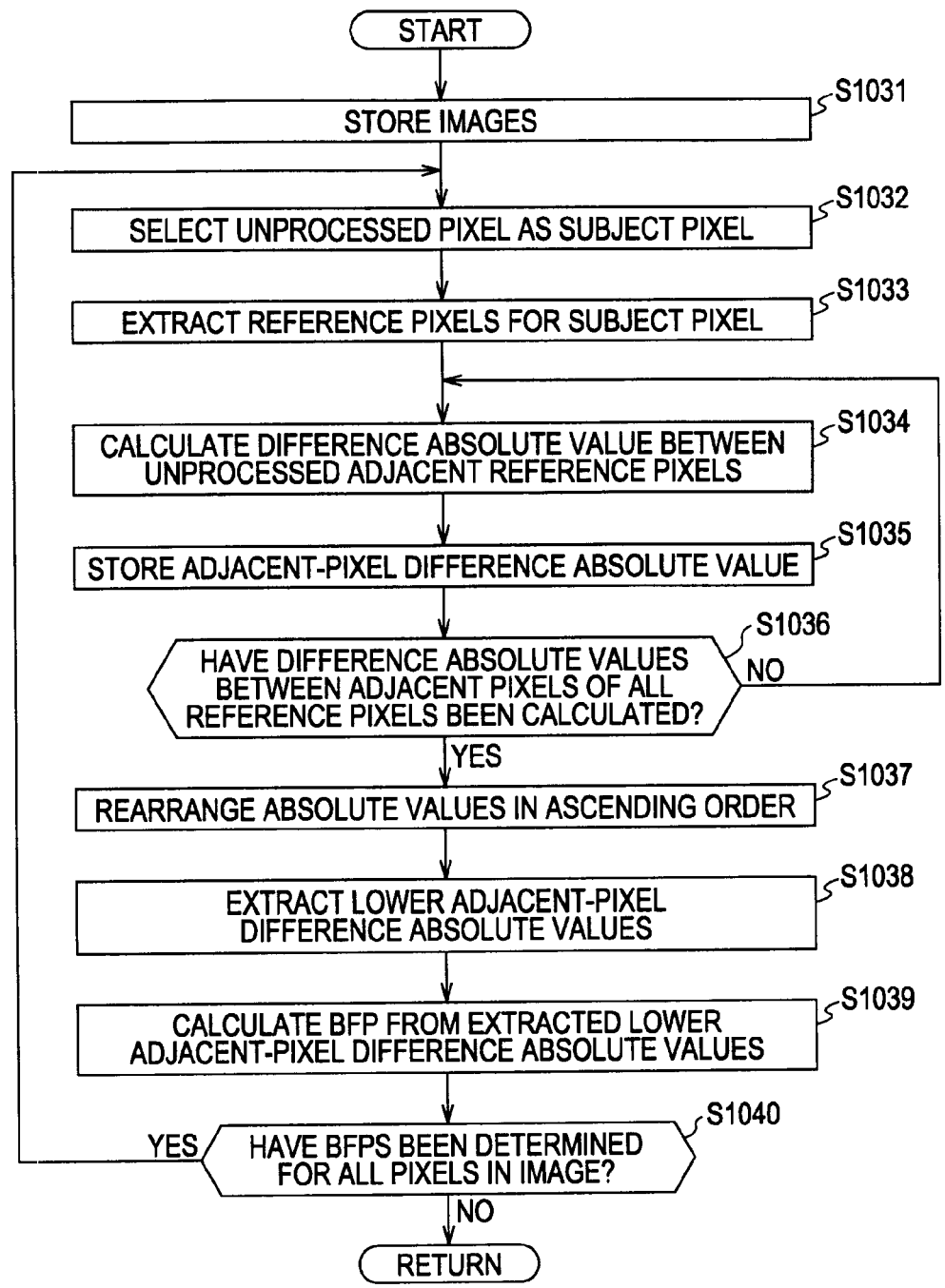
FIG. 43 is a flowchart illustrating BFP extraction processing performed by the BFP extracting portion shown in FIG. 42.

The BFP extraction processing performed by the BFP extracting portion 932 shown in FIG. 42 is described below with reference to the flowchart in FIG. 43.

In step S1031, the buffer 1121 temporarily stores HD images supplied from the output phase converter 112.

In step S1032, the reference-pixel extracting portion 1122 selects an unprocessed pixel from the buffer 1121 as the reference pixel. In step S1033, the reference-pixel extracting portion 1122 reads out reference pixels set for the subject pixel and supplies the reference pixels to the adjacent-pixel difference absolute value calculator 1123.

In step S1034, the adjacent-pixel difference absolute value calculator 1123 calculates the difference absolute value between unprocessed adjacent reference pixels (including the subject pixel), and supplies the calculated difference absolute value to the rearranging portion 1124.

In step S1035, the rearranging portion 1124 stores the adjacent-pixel difference pixel value supplied from the adjacent-pixel difference absolute value calculator 1123.

In step S1036, the adjacent-pixel difference absolute value calculator 1123 determines whether the difference absolute values between adjacent pixel values for all the reference pixels have been calculated. If it is determined in step S1036 that the difference absolute values have not been calculated for all the adjacent reference pixels, the process returns to step S1034.

Figure 44:
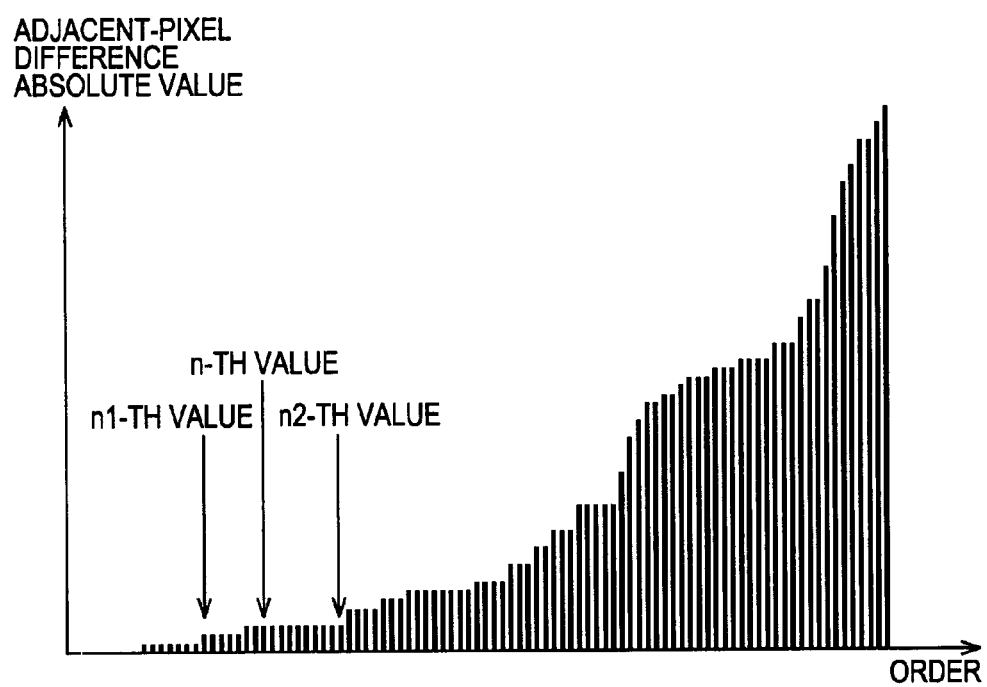
FIG. 44 illustrates BFP extraction processing performed by the BFP extracting portion shown in FIG. 42.

That is, steps S1034 through S1036 are repeated until the difference absolute values for all the adjacent reference pixels have been determined. If it is determined in step S1036 that the difference absolute values have been calculated for all the adjacent reference pixels, the process proceeds to step S1037. In step S1037, the rearranging portion 1124 rearranges the calculated adjacent-pixel difference absolute values in ascending order, and supplies the rearranged absolute values to the lower-level extracting portion 1125. For example, the rearranging portion 1124 rearranges the adjacent-pixel difference absolute values in ascending order, as shown in FIG. 44, and supplies the rearranged absolute values to the lower-level extracting portion 1125. In FIG. 44, the horizontal axis represents the order and the vertical axis indicates the adjacent-pixel difference absolute value.

In step S1038, the lower-level extracting portion 1125 extracts the lower n1-th through n2-th absolute values from the absolute values rearranged in ascending order, and supplies the lower n1-th through n2-th absolute values to the BFP calculator 1126. That is, in the case of FIG. 44, the lower n1-th through n2-th adjacent-pixel difference absolute values are extracted.

In step S1039, the BFP calculator 1126 calculates the average of the lower n1-th through n2-th adjacent-pixel difference absolute values as the BFP, and outputs the BFP to the feature synthesizer 933.

In step S1040, the reference-pixel extracting portion 1122 determines whether BFPs have been calculated for all the pixels of the image stored in the buffer 1121. If it is found in step S1040 that BFPs have not been calculated for all the pixels, the process returns to step S1032. That is, steps S1032 through S1040 are repeated until BFPs have been calculated for all the pixels. If it is found in step S1040 that BFPs have been determined for all the pixels, the BFP extraction processing is completed.

According to the above-described processing, the BFP representing the flatness of a flat portion in a broad area of an image is determined. That is, the BFP is the average of the lower n1-th and n2-th adjacent-pixel difference absolute values, and a relatively small value of the adjacent-pixel difference absolute values of the reference pixels is extracted as the feature representing a flat portion in a broad range of the image.

In the above-described example, the average of the lower n1-th and n2-th absolute values is used as the BFP. It is sufficient, however, if the feature in a broad range using adjacent-pixel difference absolute values of reference pixels is determined. Accordingly, instead of the average of lower absolute values, the product sum of weighted adjacent-pixel difference absolute values may be used. Alternatively, the n-th absolute value between the lower n1-th and n2-th absolute values may be directly used as the BFP, as shown in FIG. 44.

As described above, as in the PNDP extraction processing discussed with reference to the flowchart in FIG. 33, the PNDP is determined from the pixel-value dynamic range of a long tap contained in reference pixels. Alternatively, the pixel-value dynamic range of reference pixels may be used as the PNDP.

Figure 45:
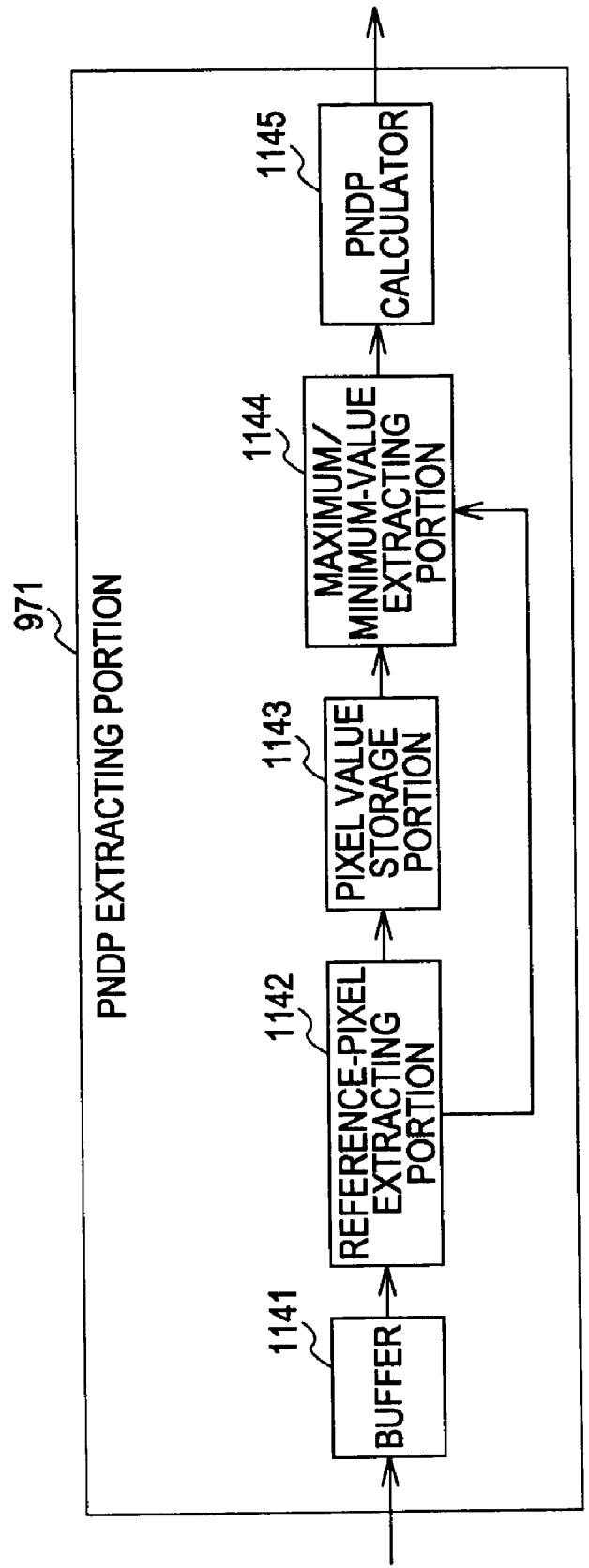
FIG. 45 is a block diagram illustrating another example of the configuration of the PNDP extracting portion.

FIG. 45 illustrates the configuration of a PDNP extracting portion that determines PNDPs in this manner.

The PNDP extracting portion 971 shown in FIG. 45 includes a buffer 1141, a reference-pixel extracting portion 1142, a pixel value storage portion 1143, a maximum/minimum-value extracting portion 1144, and a PNDP calculator 1145.

The buffer 1141 temporarily stores HD images supplied from the output phase converter 112, and sequentially supplies the HD images to the reference-pixel extracting portion 1142 if necessary. The reference-pixel extracting portion 1142 sequentially reads out reference pixels for each subject pixel, and stores them in the pixel value storage portion 1143.

The maximum/minimum-value extracting portion 1144 extracts the maximum value and the minimum value of the pixel values of all the reference pixels stored in the pixel value storage portion 1143 and supplies the maximum and minimum values to the PNDP calculator 1145.

The PNDP calculator 1145 determines the pixel-value dynamic range of the reference pixels by subtracting the minimum value from the maximum value of the pixel values of all the reference pixels supplied from the maximum/minimum-value extracting portion 1144, and outputs the dynamic range as the PNDP of the subject pixel.

Figure 46:
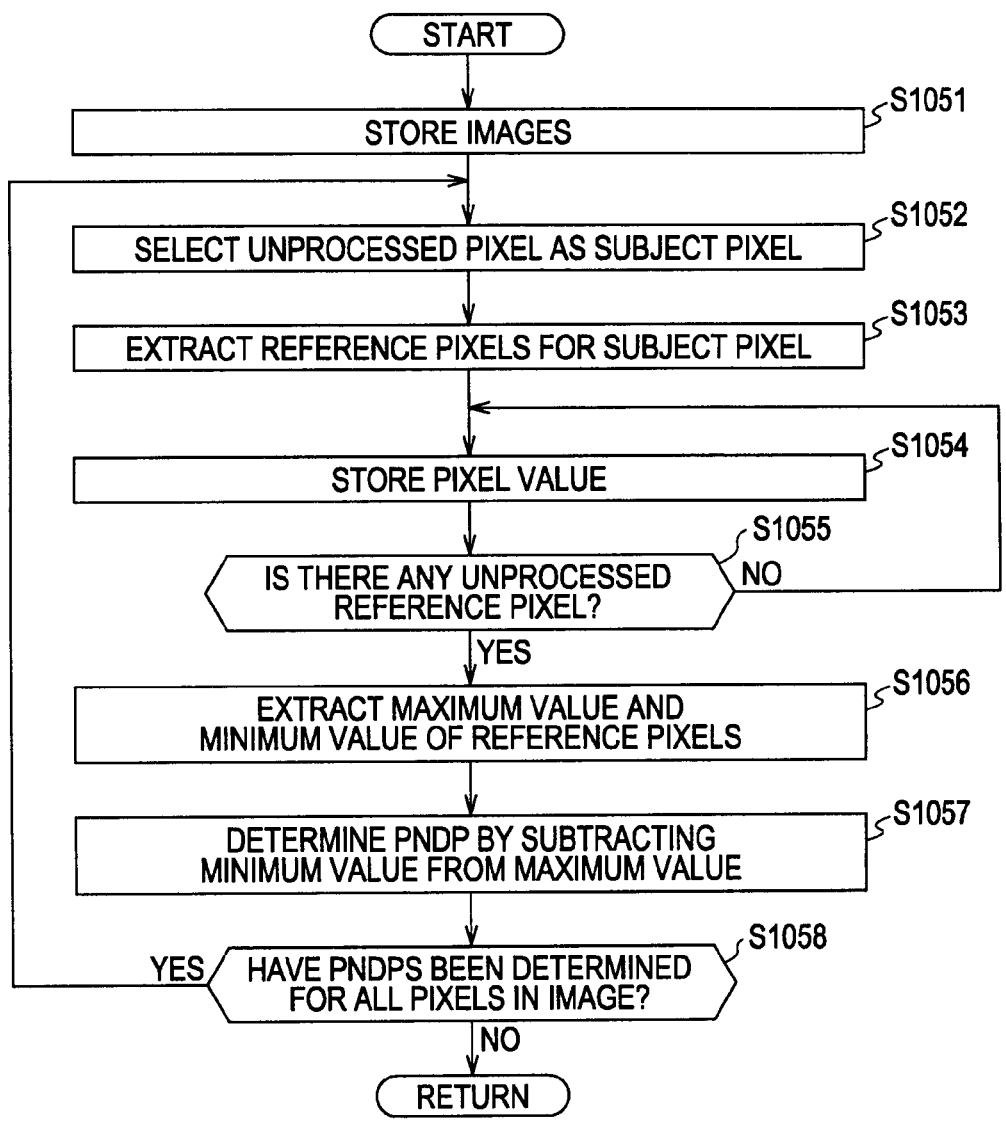
FIG. 46 is a flowchart illustrating PNDP extracting portion performed by the PNDP extracting portion shown in FIG. 45.

The PNDP extraction processing performed by the PNDP extracting portion 971 shown in FIG. 45 is described below with reference to the flowchart in FIG. 46.

In step S1051, the buffer 1141 temporarily stores HD images supplied from the output phase converter 112.

In step S1052, the reference-pixel extracting portion 1142 selects an unprocessed pixel from the buffer 1141 as the subject pixel. In step S1053, the reference-pixel extracting portion 1142 reads out reference pixels set for the subject pixel. In step S1054, the reference-pixel extracting portion 1142 stores the pixel value of the reference pixel in the pixel value storage portion 1143.

In step S1055, the reference-pixel extracting portion 1142 checks for an unprocessed pixel, i.e., whether the pixel values of all the reference pixels are stored in the pixel value storage portion 1143. If there is an unprocessed reference pixel, the process returns to step S1054. That is, steps S1054 and S1055 are repeated until all the reference pixels have been processed.

If it is determined in step S1055 that there is no unprocessed pixel, i.e., the pixel values of all the reference pixels are extracted and stored in the pixel value storage portion 1143, the process proceeds to step S1056. In step S1056, the reference-pixel extracting portion 1142 supplies information that all the reference pixels have been processed to the maximum/minimum-value extracting portion 1144. Upon receiving this information, the maximum/minimum-value extracting portion 1144 extracts the maximum value and the minimum value of the pixel values stored in the pixel value storage portion 1054, and supplies the extracted maximum and minimum values to the PNDP calculator 1145.

In step S1057, the PNDP calculator 1145 calculates the pixel-value dynamic range as the PDNP for the subject pixel by subtracting the minimum value from the maximum value of the pixel value supplied from the maximum/minimum-value extracting portion 1144, and supplies the PNDP to the feature synthesizer 933.

In step S1058, the reference-pixel extracting portion 1142 determines whether PNDPs have been calculated for all the pixels of the image stored in the buffer 1141. If it is found in step S1058 that PNDPs have not been calculated for all the pixels, the process returns to step S1052. That is, steps S1052 through S1058 are repeated until PNDPs have been determined for all the pixels of the image stored in the buffer 1141. If it is determined in step S1058 that PNDPs have been calculated for all the pixels, the PNDP extraction processing is completed.

According to the above-described processing, the PNDP representing the feature of an edge in a narrow area of an image is determined. That is, the PNDP represents the pixel-value dynamic range of the reference pixels for a subject pixel. Accordingly, the PNDP becomes greater if there is an edge in a narrow area containing the subject pixel, and conversely, the PNDP becomes smaller if there is no edge.

As in the SNDP extraction processing discussed with reference to the flowchart in FIG. 35, the minimum dynamic range of the pixel-value dynamic ranges of short taps is extracted as the SNDP. It is sufficient, however, if the feature reflects the characteristic of a flat portion. Accordingly, as in the BFP extracting portion 932 shown in FIG. 22, the difference absolute value between a reference pixel and a subject pixel may be transformed by a function, and the transformed value may be compared with a threshold in accordance with a weight determined from the path from the reference pixel to the subject pixel. The comparison results may then be added and the added value may be extracted as the SNDP.

Figure 47:
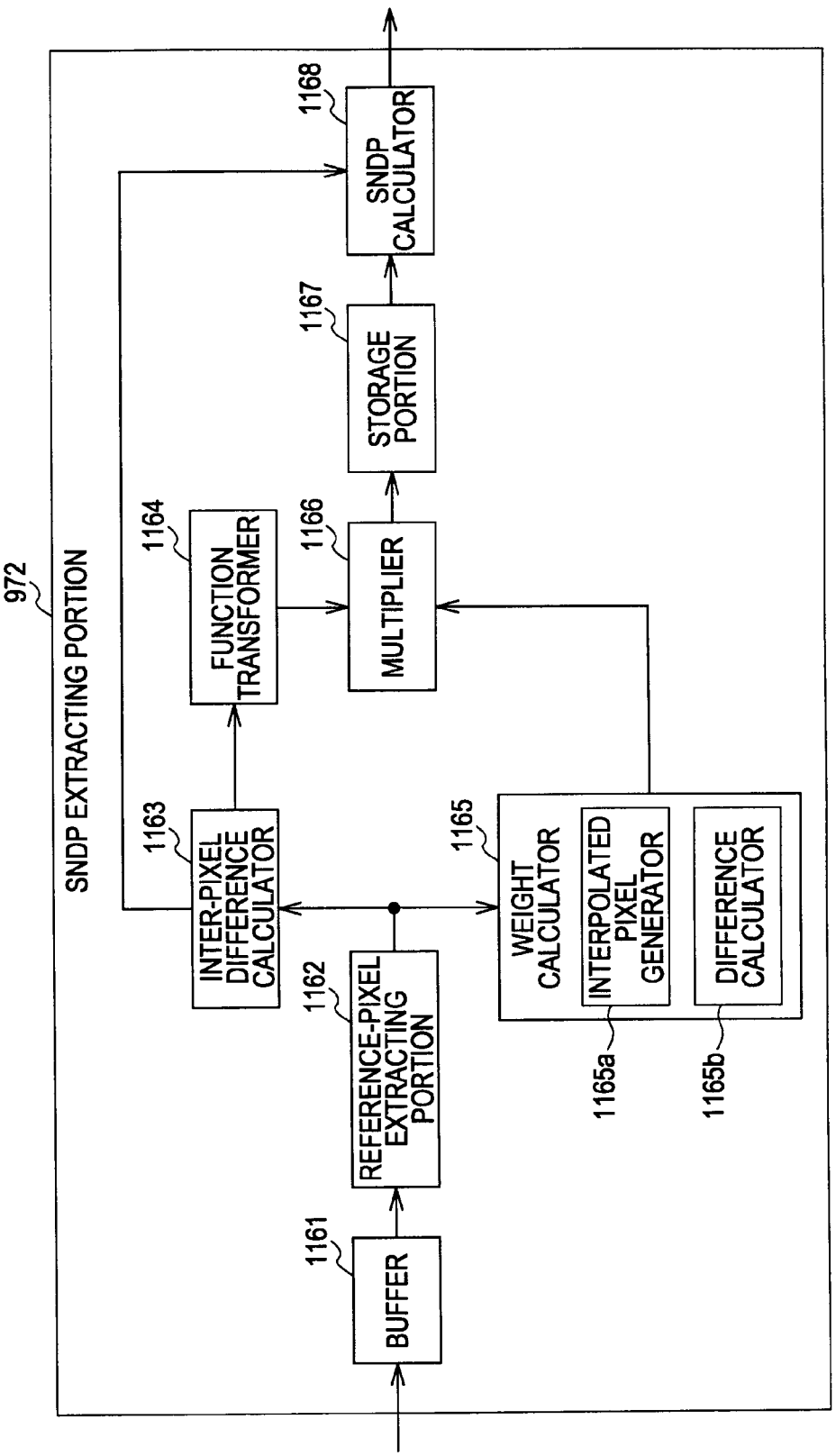
FIG. 47 is a block diagram illustrating another example of the configuration of an SNDP extracting portion.

FIG. 47 illustrates the configuration of an SNDP extracting portion that determines SNDPs in this manner.

The SNDP extracting portion 972 shown in FIG. 47 includes a buffer 1161, a reference-pixel extracting portion 1162, an inter-pixel difference calculator 1163, a function transformer 1164, a weight calculator 1165, a multiplier 1166, a storage portion 1167, and an SNDP calculator 1168.

The buffer 1161 temporarily stores HD images supplied from the output phase converter 112, and sequentially supplies the HD images to the reference-pixel extracting portion 1162 if necessary. The reference-pixel extracting portion 1162 sequentially reads out reference pixels for each subject pixel, and supplies the reference pixels to the inter-pixel difference calculator 1163 and the weight calculator 1165.

The inter-pixel difference calculator 1163 supplies the difference absolute value between the subject pixel and each of the reference pixels supplied from the reference-pixel extracting portion 1162 to the function transformer 1164. The function transformer 1164 transforms the inter-pixel difference absolute value supplied from the inter-pixel difference calculator 1163 by a predetermined function, and supplies the transformed value to the multiplier 1166.

The weight calculator 1165 includes an interpolated pixel generator 1165a and a difference calculator 1165b, and calculates, for each reference pixel supplied from the reference-pixel extracting portion 1162, a weight in accordance with the distance from the subject pixel, and supplies the calculated weight to the multiplier 1166. More specifically, the weight calculator 1165 controls the difference calculator 1165b to accumulate the difference absolute values between pixels located on the path from the reference pixel to the subject pixel to determine the weight $w_s$ based on the accumulation result. In this case, the weight calculator 1165 controls the interpolated pixel generator 1165a to generate pixels by interpolating the pixels located on the path from the reference pixel to the subject pixel if necessary.

The multiplier 1166 multiplies the inter-pixel difference absolute value transformed by the function supplied from the function transformer 1164 by the weight $w_s$ supplied from the weight calculator 1165, and stores the multiplication result in the storage portion 1167.

The SNDP calculator 1168 cumulatively adds the multiplication results stored in the storage portion 1167, and outputs the added value as the SNDP of the subject pixel.

Figure 48:
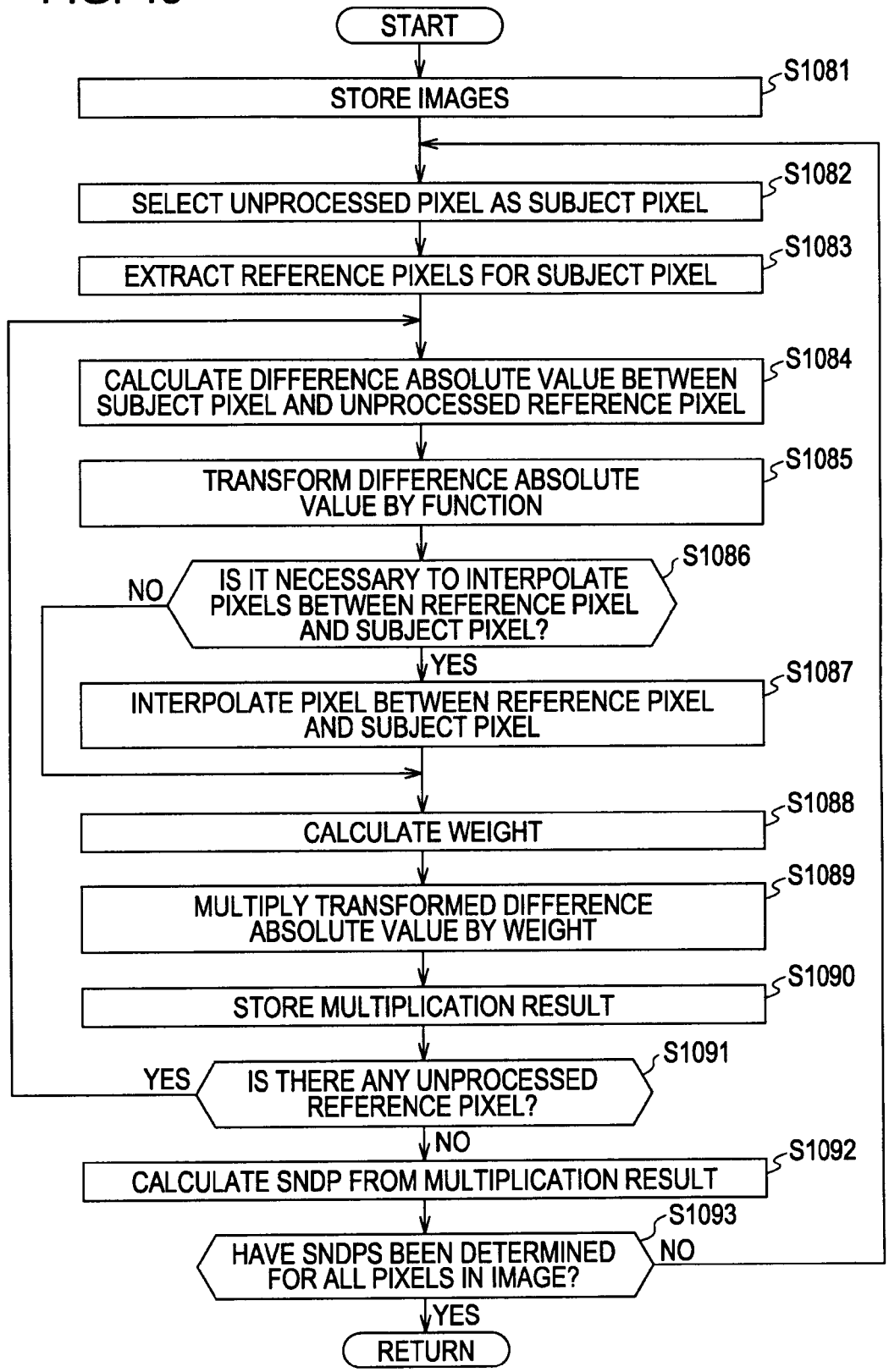
FIG. 48 is a flowchart illustrating SNDP extraction processing performed by the SNDP extracting portion shown in FIG. 47.

The SNDP extraction processing performed by the SNDP extracting portion 972 shown in FIG. 47 is described below with reference to the flowchart in FIG. 48.

In step S1081, the buffer 1161 temporarily stores HD images supplied from the output phase converter 112.

In step S1082, the reference-pixel extracting portion 1162 selects an unprocessed pixel from the buffer 1161 as the subject pixel. In step S1083, the reference-pixel extracting portion 1162 reads out reference pixels set for the subject pixel, and supplies the reference pixels to the inter-pixel difference calculator 1163 and the weight calculator 1165.

In step S1084, the inter-pixel difference calculator 1163 calculates the inter-pixel difference absolute value g between the subject pixel and an unprocessed reference pixel, and supplies the inter-pixel difference absolute value g to the function transformer 1164.

In step S1085, the function transformer 1164 transforms the inter-pixel difference absolute value g supplied from the inter-pixel difference calculator 1163 by a preset function F, and supplies the transformation result to the multiplier 1166. More specifically, the function transformer 1164 transforms the inter-pixel difference absolute value g by, for example, the function F(g) indicated by the solid line in FIG. 49, and outputs the transformation result to the multiplier 1166. According to the function F(g) shown in FIG. 49, the inter-pixel difference absolute value g is transformed into a greater value if it is smaller than or equal to a predetermined value, and is transformed into a smaller value if it is greater than the predetermined value. Accordingly, the inter-pixel difference absolute value g changes on the border of the predetermined value.

In step S1086, the weight calculator 1165 determines whether it is necessary to interpolate pixels between the subject pixel and the reference pixel. More specifically, if the subject pixel is P(0,0) and the reference pixel is P(2,4) indicated by the double circle in FIG. 50, it is necessary to interpolate pixels P(0.5,1) and P(1.5,3) between the subject pixel P(0,0) and the reference pixel P(2,4). The weight calculator 1165 thus determines that it is necessary to interpolate pixels, and then proceeds to step S1087.

Figure 50:
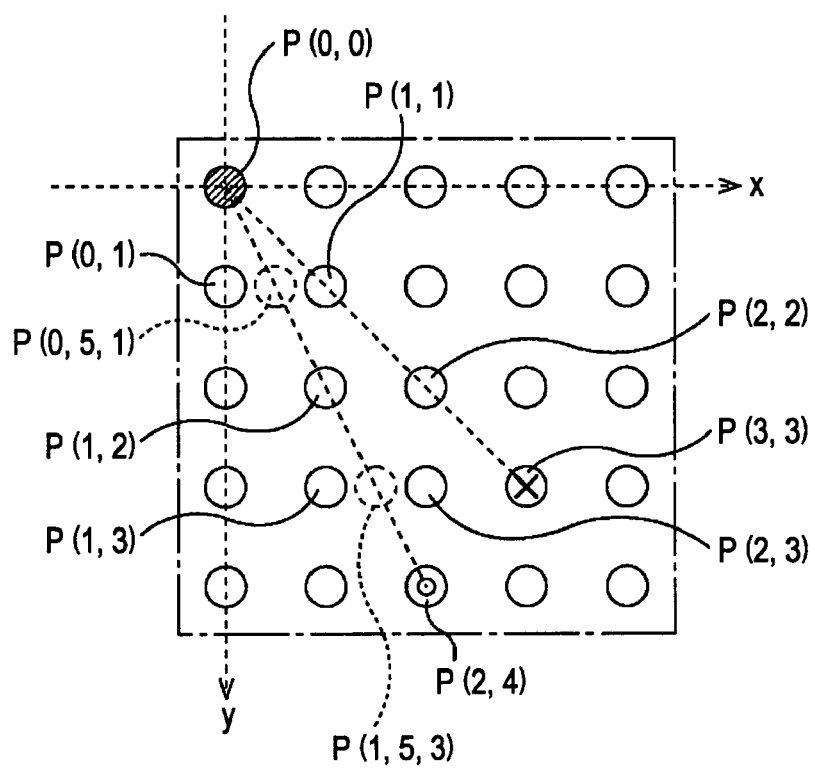
FIG. 50 illustrates pixels to be interpolated.

In step S1087, the weight calculator 1165 controls the interpolated pixel generator 1165a to generate pixels. For example, if the subject pixel is P(0,0) and the reference pixel is P(2,4), as shown in FIG. 50, the weight calculator 1165 determines the values of the pixels P(0.5,1) and P(1.5,3) as the averages of (P(0,1)+P(1,1))/2 and (P(1,3)+P(1,1))/2, respectively. Another approach to interpolating pixels may be taken. For example, weights may be applied to the reference pixels and the weighted values may be added.

If the subject pixel is P(0,0) and the reference pixel is P(3,3) indicated by the cross in FIG. 50, pixels P(1,1) and P(2,2) exist on the path between the subject pixel P(0,0) and the reference pixel P(3,3). Accordingly, the weight calculator 1165 determines in step S1086 that it is not necessary to interpolate pixels. The process then proceeds to step S1088 by skipping step S1087.

In step S1088, the weight calculator 1165 controls the difference calculator 1165b to calculate the sum D of the inter-pixel difference absolute values on the path between the subject pixel and the reference pixel to determine the weight $w_g=1-D/H$ (H is a constant), and then supplies the weight $w_g$ to the multiplier 1166. That is, in the case of the subject pixel P(0,0) and the reference pixel P(2,4) in FIG. 50, the difference calculator 1165b calculates the sum D|P(0,0)-P(0.5,1)|, |P(0.5,1)-P(1,2)|, |P(1,2)-P(1.5,3) |, and |P(1.5,3)-P(2,4)|. The weight calculator 1165 also calculates the weight $w_g=1-D/H$ and supplies the weight $w_g$ to the multiplier 1166. The weight $w_g$ may be set in association with a parameter, such as PNDP, for example, the weight $w_g=1-D/PNDP$ or $w_g=1-D/(\sqrt{PNDP})$.

In step S1089, the multiplier 1166 multiplies the inter-pixel difference absolute value g supplied from the function transformer 1164 by the weight $w_g$ supplied from the weight calculator 1165. In step S1090, the multiplier 1166 stores the multiplication result in the storage portion 1167.

In step S1091, the inter-pixel difference calculator 1163 checks for an unprocessed reference pixel. If there is an unprocessed pixel, the process returns to step S1084. That is, steps S1084 through S1091 are repeated until inter-pixel difference absolute values between the subject pixel and all the reference pixels are calculated.

If it is determined in step S1091 that there is no unprocessed reference pixel, the process proceeds to step S1092. In step S1092, the inter-pixel difference calculator 1163 supplies information that all the reference pixels have been processed to the SNDP calculator 1168. The SNDP calculator 1168 determines the sum of the multiplication results in the storage portion 1167, and outputs the sum as the SNDP.

In step S1093, the reference-pixel extracting portion 1162 determines whether SNDPs have been calculated for all the pixels of the image stored in the buffer 1161. If it is determined in step S1093 that SNDPs have not been calculated for all the pixels, the process returns to step S1082. That is, steps S1082 through S1093 are repeated until SNDPs have been determined for all the pixels of the image stored in the buffer 1161. If it is determined in step S1093 that SNDPs have been calculated for all the pixels, the SNDP extraction processing is completed.

According to the above-described processing, the SNDP representing the feature of a flat portion in a narrow range of an image is determined. That is, the SNDP becomes greater if a narrow range containing the subject pixel is more flat, and conversely, the SNDP becomes smaller if the narrow range containing the subject pixel is less flat, i.e., if it contains many edges.

Figure 49:
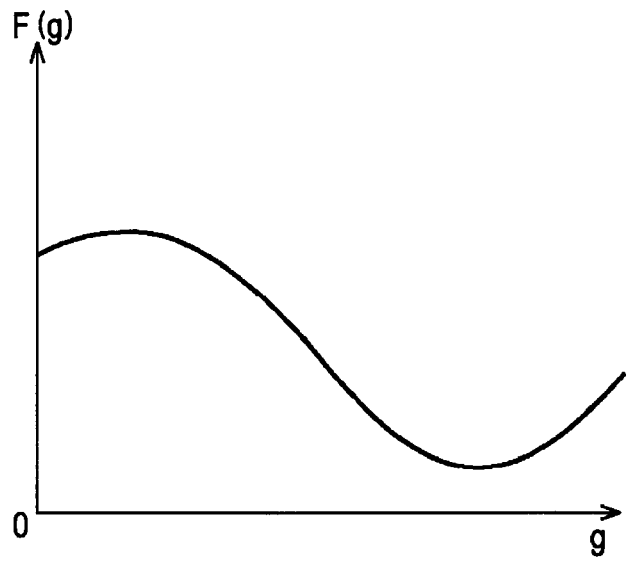
FIG. 49 illustrates transform function F.

As stated above, the transform function F may be the function shown in FIG. 49. Alternatively, it may be associated with PNDP. For example, if the inter-pixel difference absolute value g is greater than or equal to the threshold th11=PNDP/b11, the function F(g) may be expressed by F(g)=AA (AA is a constant). If the inter-pixel difference absolute value g is smaller than or equal to th2=PNDP/b12, the function F(g) may be expressed by F(g)=BB (BB is a constant). If the inter-pixel difference absolute value g is greater than the threshold th12=PNDP/b12 and smaller than the threshold th11=BEP/b11, the function may be expressed by F(g)=(BB−AA)·(g−th11)/(th12−th11)+AA. Since it is sufficient if the thresholds th11 and th12 reflect the characteristic of the PNDP, the thresholds th1 and th12 may be modified as follows: th11=(PNDP)$^2$/b11 and th12=(PNDP)$^2$/b12, respectively, or th11=($\sqrt{PNDP}$)/b11 and th12=($\sqrt{PNDP}$)/b12, respectively.

As described above, as shown in FIG. 1, the natural-image prediction unit 131 and the artificial-image prediction unit 132 independently perform prediction processing, and then, the processing results are combined based on the degree of artificiality Art generated by the natural-image/artificial-image determining unit 114. Alternatively, a natural image and an artificial image may be separated from each other in advance and may then be supplied to the natural-image prediction unit 131 and the artificial-image prediction unit 132, respectively.

Figure 51:
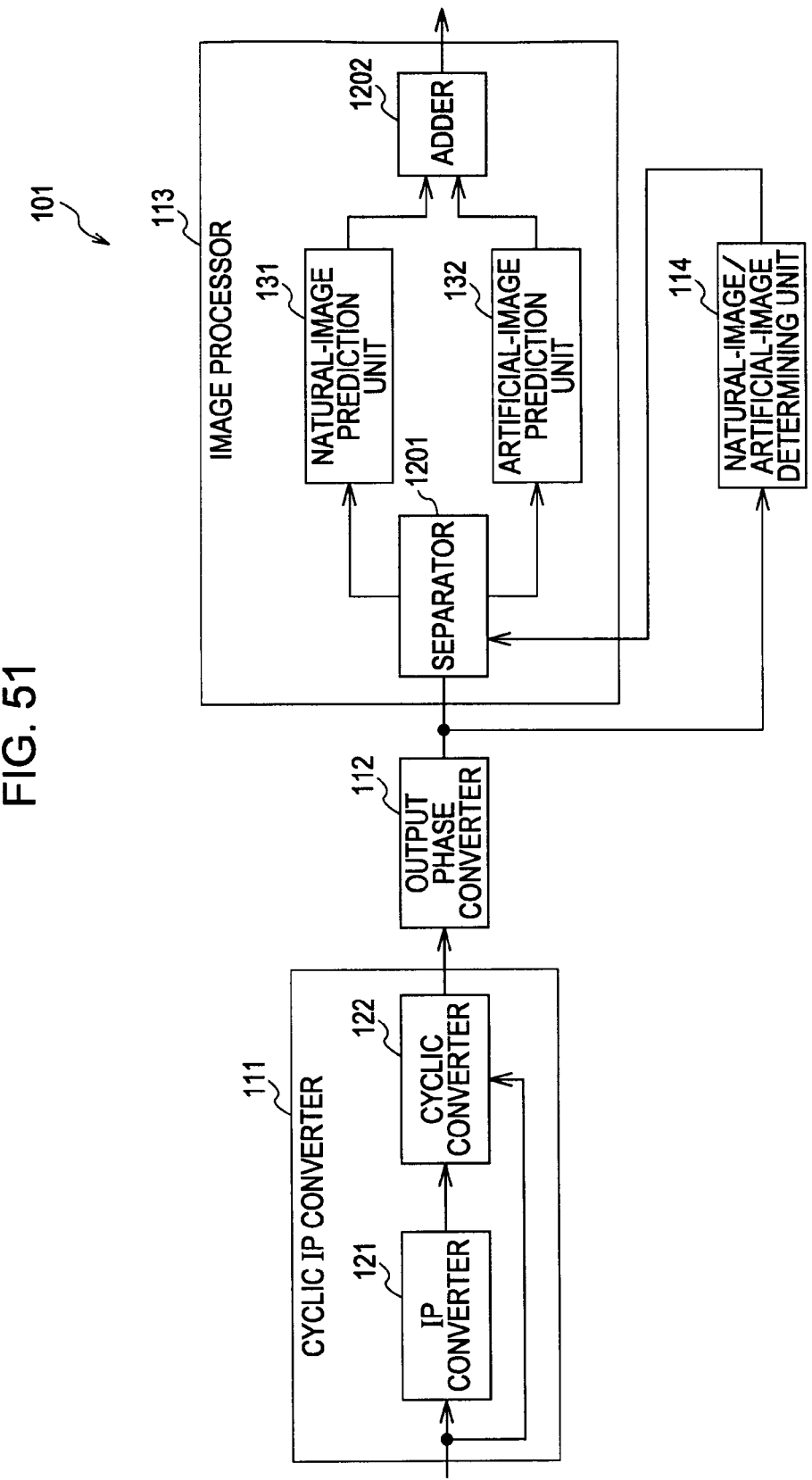
FIG. 51 illustrates another example of the configuration of an image conversion device.

FIG. 51 illustrates the configuration of an image conversion device that separates a natural image and an artificial image in advance. In FIG. 51, elements similar to those shown in FIG. 1 are designated with like reference numerals, and an explanation thereof is thus omitted.

The image conversion device 101 shown in FIG. 51 is different from the counterpart shown in FIG. 1 in that a separator 1201 is disposed at the stage subsequent to the output phase converter 112 and an adder 1202 is disposed at the stage after the natural-image prediction unit 131 and the artificial-image prediction unit 132.

The separator 1201 separates an HD image supplied from the output phase converter 112 into a natural image and an artificial image in units of pixels on the basis of the degree of artificiality Art supplied from the natural-image/artificial-image determining unit 114, and then supplies the separated natural image and artificial image to the natural-image prediction unit 131 and the artificial-image prediction unit 132, respectively.

The adder 1202 adds the pixels supplied from the natural-image prediction unit 131 to the pixels supplied from the artificial-image prediction unit 132 so that it relocates the high-quality pixels at the original positions, thereby reconstructing an image.

The image conversion processing performed by the image conversion device 101 shown in FIG. 51 is described below with reference to the flowchart in FIG. 52. Steps S1111, S1112, S1113, S1114, S1116, and S1117 in FIG. 52 are similar to steps S1, S2, S3, S6, S4, and S5, respectively, in FIG. 2, and an explanation thereof is thus omitted.

In step S1115, the separator 1201 separates the HD image supplied from the output phase converter 112 into a natural image and an artificial image in units of pixels on the basis of the degree of artificiality Art supplied from the natural-image/artificial-image determining unit 114, and then supplies the separated natural image and artificial image to the natural-image prediction unit 131 and the artificial-image prediction unit 132, respectively. More specifically, when the degree of artificiality is 1, the separator 1201 supplies the pixels to the artificial-image prediction unit 132. When the degree of artificiality is 0, the separator 1201 supplies the pixels to the natural-image prediction unit 131. When the degree of artificiality is greater than 0 and smaller than 1, the separator 1201 supplies, together with information concerning the degree of artificiality, the corresponding pixels to the natural-image prediction unit 131 and the artificial-image prediction unit 132. In this case, the separator 1201 supplies, together with the information concerning the separated pixels, the input image to the natural-image prediction unit 131 and the artificial-image prediction unit 132 for the sake of natural-image prediction processing and artificial-image prediction processing.

After the natural-image prediction processing and the artificial-image prediction processing are performed in steps S1116 and S1117, respectively, in step S1118, the adder 1202 adds the pixels supplied from the natural-image prediction unit 131 to the pixels supplied from the artificial-image prediction unit 132 to generate a high-quality image and outputs it. As stated above, when the degree of artificiality is greater than 0 and smaller than 1, the separator 1201 divides an image into natural-image pixels and artificial-image pixels on the basis of the degree of artificiality Art. In this case, the artificial-image pixels are multiplied by the degree of artificiality Art and the natural-image pixels are multiplied by the value obtained by subtracting the degree of artificiality Art from 1 (1−Art), and then, the resulting pixels are added, thereby generating an image.

According to the above-described processing, advantages similar to those achieved by the image conversion device 101 shown in FIG. 1 can be obtained. In the image conversion device 101 shown in FIG. 51, pixels to be supplied to the natural-image prediction unit 131 and the artificial-image prediction unit 132 are allocated in accordance with the degree of artificiality Art. Accordingly, the processing load imposed on the natural-image prediction unit 131 and the artificial-image prediction unit 132 can be reduced.

In the above-described example, the broad-range artificial image boundary L1 is located above the broad-range natural image boundary L2, as shown in FIG. 32. This positional relationship, however, may be reversed depending on the features represented by the BEP and BFP.

More specifically, it is now assumed that the difference dynamic range of reference pixels, the pixel-value dynamic range using reference pixels, or the higher-level difference absolute value of the difference absolute values of the adjacent reference pixels rearranged in ascending order is used as the BEP and that the adjacent-pixel difference absolute values of the reference pixels greater than the threshold th are transformed by the function and the sum of the resulting values for all the reference pixels is used as the BFP. In this case, if the BEP and BFP are plotted on the horizontal axis and the vertical axis, respectively, the broad-range artificial image boundary is positioned above the broad-range natural image boundary. Conversely, it is now assumed that the difference dynamic range of reference pixels, the pixel-value dynamic range using reference pixels, or the higher-level difference absolute value of the difference absolute values of the adjacent reference pixels rearranged in ascending order is used as the BEP and that the higher-level difference absolute value of the difference absolute values of the adjacent reference pixels rearranged in ascending order is used as the BFP. In this case, if the BEP and BFP are plotted on the horizontal axis and the vertical axis, respectively, the broad-range artificial image boundary is positioned below the broad-range natural image boundary.

The broad-range artificial image boundary L1 and the broad-range natural image boundary L2 may be changed by parameters used in performing image conversion processing, such as the resolution, noise, and zoom magnification, so that the broad-range degree of artificiality $Art_b$ can be increased or decreased.

Figure 53A:
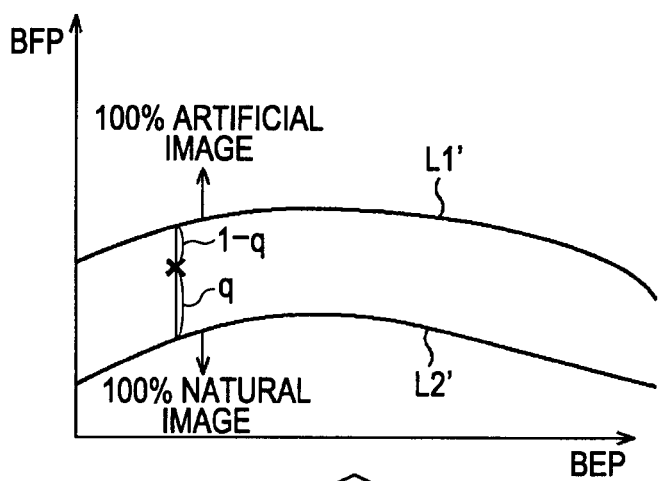
FIGS. 53A, 53B, and 53C illustrate broad-range artificial image boundaries and broad-range natural image boundaries.
Figure 53B:
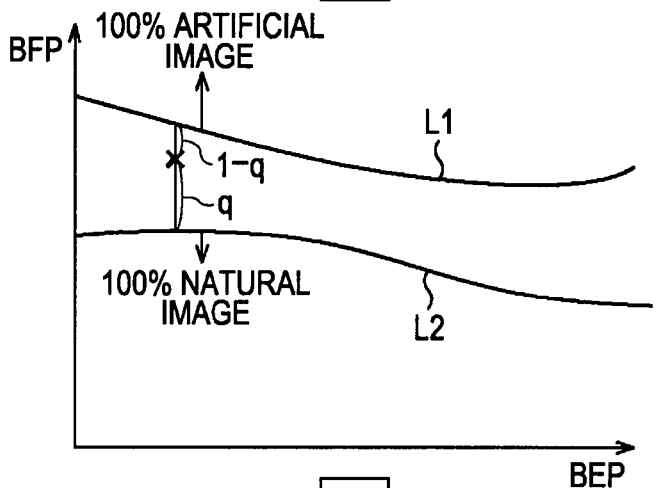
Figure 53C:
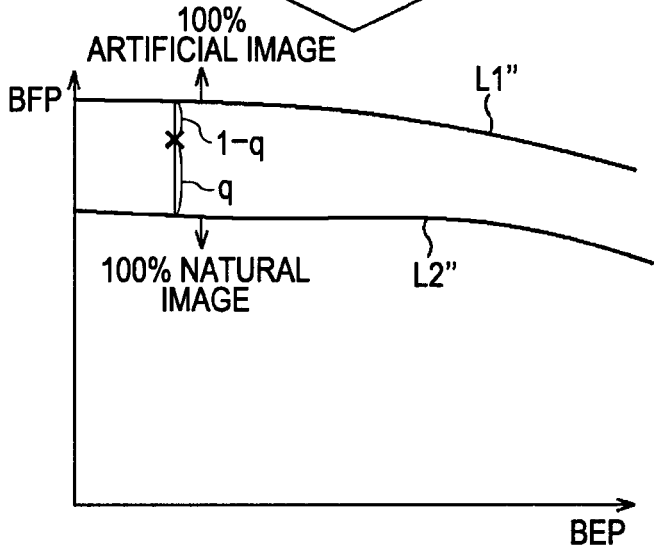

The broad-range artificial image boundary L1 and the broad-range natural image boundary L2 shown in FIG. 53B are the same as those shown in FIG. 32. In this case, if the resolution in image conversion processing is increased, the broad-range artificial image boundary L1' and the broad-range natural image boundary L2' are positioned, as shown in FIG. 53A, lower than the broad-range artificial image boundary L1 and the broad-range natural image boundary L2 shown in FIG. 53B. Accordingly, with the same broad-range feature, the broad-range degree of artificiality $Art_b$ becomes higher. On the other hand, if the resolution is decreased, the broad-range artificial image boundary L1" and the broad-range natural image boundary L2" are positioned, as shown in FIG. 53C, higher than the broad-range artificial image boundary L1 and the broad-range natural image boundary L2 shown in FIG. 53B. Accordingly, with the same broad-range feature, the broad-range degree of artificiality $Art_b$ becomes lower.

Similarly, the narrow-range natural image boundary L11 is located above the narrow-range artificial image boundary L12, as shown in FIG. 38. This positional relationship, however, may be reversed depending on the features represented by the PNDP and SNDP.

It is now assumed that the pixel-value dynamic range of reference pixels is used as the PNDP and that the sum of difference absolute values that are weighted in accordance with the path from each reference pixel to the subject pixel is used as the SNDP. In this case, if the SNDP and PNDP are plotted on the horizontal axis and the vertical axis, respectively, the narrow-range artificial image boundary L12 is positioned above the narrow-range natural image boundary L11. It is now assumed that the pixel-value dynamic range of a long tap is used as the PNDP and that the pixel-value dynamic range of short taps is used as the SNDP. In this case, if the SNDP and PNDP are plotted on the horizontal axis and the vertical axis, respectively, the narrow-range artificial image boundary L12 is positioned below the narrow-range natural image boundary L11.

The narrow-range natural image boundary L11 and the narrow-range artificial image boundary L12 may be changed by parameters used in performing image conversion processing, such as the resolution, noise, and zoom magnification, so that the narrow-range degree of artificiality $Art_n$ can be increased or decreased.

Figure 54A:
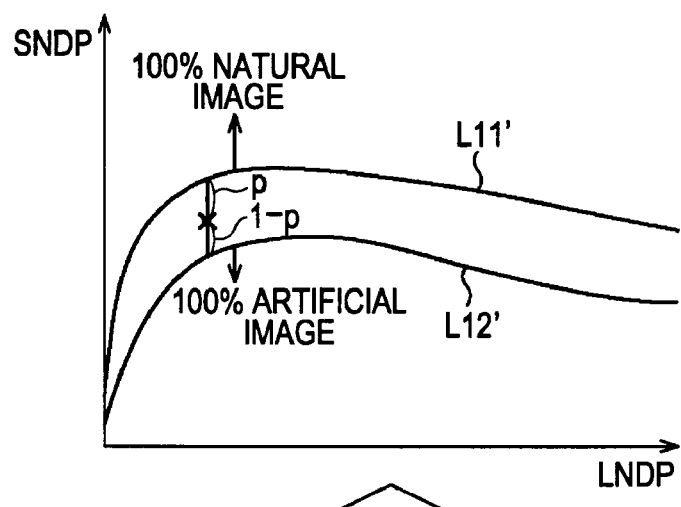
FIGS. 54A, 54B, and 54C illustrate narrow-range artificial image boundaries and narrow-range natural image boundaries.
Figure 54B:
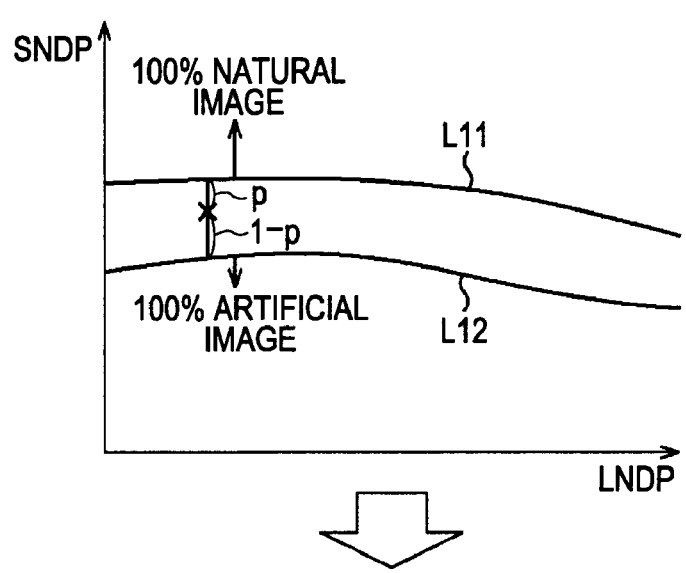
Figure 54C:
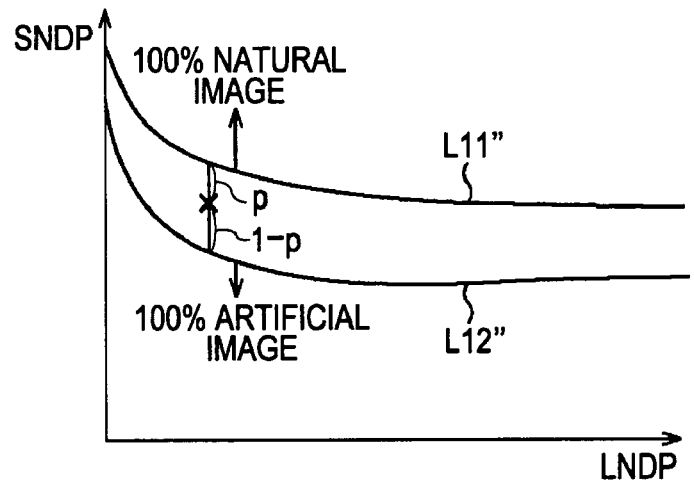

The narrow-range natural image boundary L11 and the narrow-range artificial image boundary L12 shown in FIG. 54B are the same as those shown in FIG. 38. In this case, if the noise in image conversion processing is increased, the narrow-range natural image boundary L11' and the narrow-range artificial image boundary L12' are positioned, as shown in FIG. 54A, lower than the narrow-range natural image boundary L11 and the narrow-range artificial image boundary L12 shown in FIG. 54B. Accordingly, with the same narrow-range feature, the narrow-range degree of artificiality $Art_n$ becomes higher. On the other hand, if the noise is decreased, the narrow-range natural image boundary L11" and the narrow-range artificial image boundary L12" are positioned, as shown in FIG. 54C, higher than the narrow-range natural image boundary L11 and the narrow-range artificial image boundary L12 shown in FIG. 54B. Accordingly, with the same narrow-range feature, the narrow-range degree of artificiality $Art_n$ becomes lower.

In the above-described example, the BEP and BFP are used as the broad-range features, while the PNDP and SNDP are used as the narrow-range features. However, parameters other than the BEP and BFP may be used as long as they can represent edge or flat portions in a broad range. The same applies to the PNDP and SNDP. Parameters other than the PNDP and SNDP may be used as long as they can represent thin lines, edges, points, flat portions in the vicinity of edges, or gradation in a narrow range. Additionally, in the above-described example, two types of features are used for representing each of the broad-range feature and narrow-range feature. Alternatively, more than two types of features may be used, in which case, instead of the two-dimensional artificial-image and natural-image boundaries shown in FIG. 32 or 38, the n-dimensional boundary lines or boundary planes based on the number n of features may be employed. However, basic operations in the n-dimensional space, such as determining whether a subject pixel belongs to a natural image or an artificial image or determining the ratio of the distance from the subject pixel to an artificial image boundary line or plane to that to a natural image boundary line or plane, are similar to the case where two types of features are employed.

As described above, the quality of an overall image can be enhanced by distinguishing, in units of pixels, natural image components and artificial image components contained in the image from each other and by performing optimal processing on each of the components.

The above-described series of processing operations may be executed by hardware or software. If software is used, a corresponding software program is installed from a recording medium into a computer built in dedicated hardware or a computer, such as a general-purpose computer, that can execute various functions by installing various programs therein.

FIG. 55 is a block diagram illustrating the configuration of a personal computer when the electrical internal configuration of the image conversion device 101 shown in FIG. 1 or 51 is implemented by software. A central processing unit (CPU) 2001 controls the overall operation of the personal computer. The CPU 2001 also executes a program stored in a read only memory (ROM) 2002 in response to an instruction input from an input unit 2006, such as a keyboard and a mouse, by a user via a bus 2004 and an input/output interface 2005. The CPU 2001 also loads, into a random access memory (RAM) 2003, a program read from a removable disk 2011, such as a magnetic disk, an optical disc, a magneto-optical (MO) disk, or a semiconductor memory, connected to a drive 2010, and installed into a storage unit 2008, and then executes the loaded program. With this configuration, the functions of the image conversion device 101 shown in FIG. 1 or 51 can be implemented by software. The CPU 2001 also controls a communication unit 2009 to communicate with an external source and sends and receives data.

The recording medium on which the program is recorded may be formed of a package medium, as shown in FIG. 55, which is distributed for providing the program to users separately from the computer, such as the removable medium 2011, including a magnetic disk (including flexible disk), an optical disc (including a compact disc read only memory (CD-ROM) and a digital versatile disk (DVD)), a MO disk (including a mini-disc (MD)), and a semiconductor memory. Alternatively, the recording medium may be formed of the ROM 2002 or a hard disk contained in the recording unit 2008, on which the program is recorded, which is provided to users while being built in the computer.

In this specification, steps forming the program recorded on the recording medium may be executed in chronological order described in the specification. Alternatively, they may be executed in parallel or individually.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
    broad-range feature extraction means for extracting broad-range features including a plurality of types of broad-range features from pixels located in a predetermined area in relation to a subject pixel of a first image;
    broad-range degree-of-artificiality calculation means for calculating, in a multidimensional space represented by the plurality of types of broad-range features included in the broad-range features extracted by the broad-range feature extraction means, from a positional relationship of the plurality of types of broad-range features according to a statistical distribution range of an artificial image, which exhibits a small number of grayscale levels and distinct edges, of the first image, a broad-range degree of artificiality representing a degree by which the plurality of types of broad-range features belong to the statistical distribution range of the artificial image;
    narrow-range feature extraction means for extracting narrow-range features including a plurality of types of narrow-range features from pixels located in the predetermined area in relation to the subject pixel of the first image;
    narrow-range degree-of-artificiality calculation means for calculating, in a multidimensional space represented by the plurality of types of narrow-range features included in the narrow-range features extracted by the narrow-range feature extraction means, from a positional relationship of the plurality of types of narrow-range features according to a statistical distribution range of the artificial image of the first image, a narrow-range degree of artificiality representing a degree by which the plurality of types of narrow-range features belong to the statistical distribution range of the artificial image; and
    degree-of-artificiality calculation means for calculating a degree of artificiality of the subject pixel by combining the broad-range degree of artificiality and the narrow-range degree of artificiality.

2. The image processing apparatus according to claim 1, further comprising:
    first prediction means for predicting, from the first image, a second image which is obtained by increasing the quality of the artificial image;
    second prediction means for predicting, from the first image, a third image which is obtained by increasing the quality of a natural image exhibiting a large number of grayscale levels and indistinct edges; and
    synthesizing means for combining the second image and the third image on the basis of the degree of artificiality.

3. The image processing apparatus according to claim 2, wherein the first prediction means includes
    first classification means for classifying pixels of the second image into first classes,
    first storage means for storing a first prediction coefficient for each of the first classes, the first prediction coefficient being obtained by conducting learning by using a plurality of artificial images, and
    first computation means for determining, from the first image, the second image having a higher quality than the first image by performing computation using the first image and the first prediction coefficients for the first classes into which the pixels of the second image are classified, and
wherein the second prediction means includes
    second classification means for classifying pixels of the third image into second classes,
    second storage means for storing a second prediction coefficient for each of the second classes, the second prediction coefficient being obtained by conducting learning by using a plurality of natural images, and
    second computation means for determining the third image from the first image by performing computation using the first image and the second prediction coefficients for the second classes into which the pixels of the third image are classified.

4. The image processing apparatus according to claim 1, wherein the broad-range degree-of-artificiality calculation means includes broad-range artificial-image distribution range storage means for storing the statistical distribution range of the artificial image of the first image in the multidimensional space represented by the plurality of types of broad-range features, and the broad-range degree-of-artificiality calculation means calculates the broad-range degree of artificiality from the positional relationship of the plurality of types of broad-range features extracted by the broad-range feature extraction means according to the statistical distribution range of the artificial image in the multidimensional space stored in the broad-range artificial-image distribution range storage means.

5. The image processing apparatus according to claim 1, wherein the narrow-range degree-of-artificiality calculation means includes narrow-range artificial-image distribution range storage means for storing the statistical distribution range of the artificial image of the first image in the multidimensional space represented by the plurality of types of narrow-range features, and the narrow-range degree-of-artificiality calculation means calculates the narrow-range degree of artificiality from the positional relationship of the plurality of types of narrow-range features extracted by the narrow-range feature extraction means according to the statistical distribution range of the artificial image in the multidimensional space stored in the narrow-range artificial-image distribution range storage means.

6. The image processing apparatus according to claim 1, wherein the broad-range feature extraction means includes
    edge feature extraction means for extracting a feature representing the presence of an edge from the pixels located in the predetermined area, and
    flat feature extraction means for extracting a feature representing the presence of a flat portion from the pixels located in the predetermined area.

7. The image processing apparatus according to claim 6, wherein the edge feature extraction means extracts, as the feature representing the presence of an edge, a difference dynamic range of the pixels located in the predetermined area by using a difference of pixel values between the subject pixel and each of the pixels located in the predetermined area.

8. The image processing apparatus according to claim 7, wherein the edge feature extraction means extracts, as the feature representing the presence of an edge, a difference dynamic range of the pixels located in the predetermined area by using a difference of the pixel values between the subject pixel and each of the pixels located in the predetermined area after applying a weight to the difference of the pixel values in accordance with a distance therebetween.

9. The image processing apparatus according to claim 6, wherein the edge feature extraction means extracts, as the feature representing the presence of an edge, a predetermined order of higher levels of difference absolute values between adjacent pixels of the pixels located in the predetermined area.

10. The image processing apparatus according to claim 6, wherein the edge feature extraction means extracts, as the feature representing the presence of an edge, the average of higher first through second levels of difference absolute values between adjacent pixels of the pixels located in the predetermined area or the sum of the higher first through second levels of the difference absolute values after applying a weight to each of the difference absolute values.

11. The image processing apparatus according to claim 6, wherein the flat feature extraction means extracts, as the feature representing the presence of a flat portion, the number of difference absolute values between adjacent pixels of the pixels located in the predetermined area which are smaller than or equal to a predetermined threshold.

12. The image processing apparatus according to claim 11, wherein the predetermined threshold is set based on the feature representing the presence of an edge.

13. The image processing apparatus according to claim 6, wherein the flat feature extraction means extracts, as the feature representing the presence of a flat portion, the sum of difference absolute values between adjacent pixels of the pixels located in the predetermined area after transforming the difference absolute values by a predetermined function.

14. The image processing apparatus according to claim 13, wherein the flat feature extraction means extracts, as the feature representing the presence of a flat portion, the sum of difference absolute values between the adjacent pixels of the pixels located in the predetermined area after transforming the difference absolute values by a predetermined function and after applying a weight to each of the transformed difference absolute values in accordance with a distance from the subject pixel to each of the pixels located in the predetermined area.

15. The image processing apparatus according to claim 13, wherein the predetermined function is a function associated with the feature representing the presence of an edge.

16. The image processing apparatus according to claim 6, wherein the flat feature extraction means extracts, as the feature representing the presence of a flat portion, a predetermined order of lower levels of difference absolute values between adjacent pixels of the pixels located in the predetermined area.

17. The image processing apparatus according to claim 6, wherein the flat feature extraction means extracts, as the feature representing the presence of a flat portion, the average of lower first through second levels of difference absolute values between adjacent pixels of the pixels located in the predetermined area or the sum of the lower first through second levels of the difference absolute values after applying a weight to each of the difference absolute values.

18. The image processing apparatus according to claim 1, wherein the narrow-range feature extraction means extracts, from the pixels located in the predetermined area, the narrow-range features including two types of features selected from features representing thin lines, edges, points, flat portions in the vicinity of edges, and gradation.

19. The image processing apparatus according to claim 18, wherein the narrow-range feature extraction means includes
    first narrow-range feature extraction means for extracting, as a first feature of the narrow-range features, a pixel-value dynamic range obtained by subtracting a minimum pixel value from a maximum pixel value of pixels located in a first area included in the predetermined area, and
    second narrow-range feature extraction means for extracting, as a second feature of the narrow-range features, a pixel-value dynamic range obtained by subtracting a minimum pixel value from a maximum pixel value of pixels located in a second area including the subject pixel and included in the first area.

20. The image processing apparatus according to claim 19, wherein the second narrow-range feature extraction means extracts, as the second feature, a minimum pixel-value dynamic range of pixel-value dynamic ranges obtained from a plurality of the second areas.

21. The image processing apparatus according to claim 19, wherein the first narrow-range feature extraction means extracts, as the first feature of the narrow-range features, a pixel-value dynamic range of the pixel values of the pixels located in the predetermined area, and wherein the second narrow-range feature extraction means extracts, as the second feature of the narrow-range features, the sum of difference absolute values between the subject pixel and the pixels located in the predetermined area after transforming the difference absolute values by a predetermined function and after applying a weight to each of the transformed difference absolute values.

22. The image processing apparatus according to claim 21, wherein the second narrow-range feature extraction means includes weight calculation means for calculating the weight in accordance with the sum of the difference absolute values between adjacent pixels of all the pixels located on a path from the subject pixel to the pixels located in the first area.

23. The image processing apparatus according to claim 21, wherein the predetermined function is a function associated with the first feature.

24. An image processing method comprising the steps of:
extracting broad-range features including a plurality of types of broad-range features from pixels located in a predetermined area in relation to a subject pixel of a first image;
calculating with a processor, in a multidimensional space represented by the plurality of types of broad-range features included in the extracted broad-range features, from a positional relationship of the plurality of types of broad-range features according to a statistical distribution range of an artificial image, which exhibits a small number of grayscale levels and distinct edges, of the first image, a broad-range degree of artificiality representing a degree by which the plurality of types of broad-range features belong to the statistical distribution range of the artificial image;
extracting narrow-range features including a plurality of types of narrow-range features from pixels located in the predetermined area in relation to the subject pixel of the first image;
calculating, in a multidimensional space represented by the plurality of types of narrow-range features included in the extracted narrow-range features, from a positional relationship of the plurality of types of narrow-range features according to a statistical distribution range of the artificial image of the first image, a narrow-range degree of artificiality representing a degree by which the plurality of types of narrow-range features belong to the statistical distribution range of the artificial image; and
calculating a degree of artificiality of the subject pixel by combining the broad-range degree of artificiality and the narrow-range degree of artificiality.

25. A non-transitory computer readable medium having recorded thereon a computer-readable program that when executed by a processor, performs steps comprising:
extracting broad-range features including a plurality of types of broad-range features from pixels located in a predetermined area in relation to a subject pixel of a first image;
calculating, in a multidimensional space represented by the plurality of types of broad-range features included in the extracted broad-range features, from a positional relationship of the plurality of types of broad-range features according to a statistical distribution range of an artificial image, which exhibits a small number of grayscale levels and distinct edges, of the first image, a broad-range degree of artificiality representing a degree by which the plurality of types of broad-range features belong to the statistical distribution range of the artificial image;
extracting narrow-range features including a plurality of types of narrow-range features from pixels located in the predetermined area in relation to the subject pixel of the first image;
calculating, in a multidimensional space represented by the plurality of types of narrow-range features included in the extracted narrow-range features, from a positional relationship of the plurality of types of narrow-range features according to a statistical distribution range of the artificial image of the first image, a narrow-range degree of artificiality representing a degree by which the plurality of types of narrow-range features belong to the statistical distribution range of the artificial image; and
calculating a degree of artificiality of the subject pixel by combining the broad-range degree of artificiality and the narrow-range degree of artificiality.

26. An image processing apparatus comprising:
a broad-range feature extraction unit configured to extract broad-range features including a plurality of types of broad-range features from pixels located in a predetermined area in relation to a subject pixel of a first image;
a broad-range degree-of-artificiality calculator configured to calculate, in a multidimensional space represented by the plurality of types of broad-range features included in the broad-range features extracted by the broad-range feature extraction unit, from a positional relationship of the plurality of types of broad-range features according to a statistical distribution range of an artificial image, which exhibits a small number of grayscale levels and distinct edges, of the first image, a broad-range degree of artificiality representing a degree by which the plurality of types of broad-range features belong to the statistical distribution range of the artificial image;
a narrow-range feature extraction unit configured to extract narrow-range features including a plurality of types of narrow-range features from pixels located in the predetermined area in relation to the subject pixel of the first image;
a narrow-range degree-of-artificiality calculator having a processor configured to calculate, in a multidimensional space represented by the plurality of types of narrow-range features included in the narrow-range features extracted by the narrow-range feature extraction unit, from a positional relationship of the plurality of types of narrow-range features according to a statistical distribution range of the artificial image of the first image, a narrow-range degree of artificiality representing a degree by which the plurality of types of narrow-range features belong to the statistical distribution range of the artificial image; and
a degree-of-artificiality calculator configured to calculate a degree of artificiality of the subject pixel by combining the broad-range degree of artificiality and the narrow-range degree of artificiality.

* * * * *